(12) United States Patent
Cohen et al.

(10) Patent No.: US 9,497,526 B2
(45) Date of Patent: Nov. 15, 2016

(54) SPEAKER APPARATUS AND METHODS USEFUL IN CONJUNCTION THEREWITH

(71) Applicant: AUDIO PIXELS LTD., Rehovot (IL)

(72) Inventors: Yuval Cohen, Rehovot (IL); Daniel Lewin, Ramat Hasharon (IL); Shay Kaplan, Givat Ela (IL); Alex Sromin, Ashdod (IL); Meir Ben Simon, Givat Ela (IL)

(73) Assignee: AUDIO PIXELS LTD., Rehovot (IL)

( * ) Notice: Subject to any disclaimer, the term of this patent is extended or adjusted under 35 U.S.C. 154(b) by 62 days.

(21) Appl. No.: 14/293,381

(22) Filed: Jun. 2, 2014

(65) Prior Publication Data

US 2014/0270274 A1 Sep. 18, 2014

Related U.S. Application Data

(63) Continuation of application No. 12/744,127, filed as application No. PCT/IL2008/001524 on Nov. 20, 2008, now Pat. No. 8,780,673.

(60) Provisional application No. 60/996,513, filed on Nov. 21, 2007.

(51) Int. Cl.
*H04R 3/12* (2006.01)
*H04R 1/00* (2006.01)
(Continued)

(52) U.S. Cl.
CPC .............. *H04R 1/005* (2013.01); *H02K 41/03* (2013.01); *H02N 13/00* (2013.01); *H04R 1/403* (2013.01); *H04R 3/12* (2013.01); *H02K 2201/18* (2013.01); *H04R 3/007* (2013.01);
(Continued)

(58) Field of Classification Search
CPC .. H02K 41/03; H02K 2201/18; H04R 1/005; H04R 3/12; H04R 2201/403; H04R 2460/03; H04R 1/403; H04R 3/007; H04R 2203/12; H02N 13/00; Y10T 29/49005
See application file for complete search history.

(56) References Cited

U.S. PATENT DOCUMENTS 4,131,363 A 12/1978 Shea et al.
4,194,095 A 3/1980 Doi et al.
(Continued)

FOREIGN PATENT DOCUMENTS

CN 1575037 2/2005
CN 1709587 12/2005
(Continued)

OTHER PUBLICATIONS

Hawksford, M., "Spatial Distribution of Distortion and Spectrally Shaped Quantization Noise on Digital Micro-Array Loudspeakers", Journal of Audio Engineering Society, vol. 55, No. 1/2, Jan./Feb. 2007.
Lagorce, L. K. and M. G. Allen, "Magnetic and Mechanical Properties of Micro-machined Strontium Ferrite/Polyimide Composites", IEEE Journal of Micro-electromechanical Systems, vol. 6, No. 4, Dec. 1977.
(Continued)

*Primary Examiner* — Daniel Pihulic
(74) *Attorney, Agent, or Firm* — Oliff PLC

(57) ABSTRACT

An actuation system for generating a physical effect, the system comprising at least one array of translating elements each constrained to travel alternately back and forth along a respective axis, toward first and second extreme positions respectively, in response to activation of first and second forces respectively; and a controller operative to use the first and second forces to selectably latch at least one subset of said translating elements into the first and second extreme positions respectively.

12 Claims, 44 Drawing Sheets

(51) Int. Cl.
*H02K 41/03* (2006.01)
*H02N 13/00* (2006.01)
*H04R 1/40* (2006.01)
*H04R 3/00* (2006.01)

(52) U.S. Cl.
CPC .... *H04R 2201/403* (2013.01); *H04R 2203/12* (2013.01); *H04R 2460/03* (2013.01); *Y10T 29/49005* (2015.01)

(56) References Cited

U.S. PATENT DOCUMENTS

| | | | |
|---|---|---|---|
| 4,337,379 | A | 6/1982 | Nakaya |
| 4,515,997 | A | 5/1985 | Stinger, Jr. |
| 5,046,101 | A | 9/1991 | Lovejoy |
| 5,517,570 | A | 5/1996 | Taylor |
| 5,574,792 | A | 11/1996 | Konno |
| 5,580,639 | A | 12/1996 | Togawa et al. |
| 5,953,200 | A | 9/1999 | Haley et al. |
| 6,094,116 | A | 7/2000 | Tai et al. |
| 6,125,189 | A | 9/2000 | Yasuno et al. |
| 6,289,106 | B1 | 9/2001 | Wong |
| 6,373,955 | B1 | 4/2002 | Hooley |
| 6,403,995 | B2 | 6/2002 | Thomas |
| 6,795,561 | B1 | 9/2004 | Bank |
| 6,959,096 | B2 | 10/2005 | Boone et al. |
| 6,963,654 | B2 | 11/2005 | Sotme et al. |
| 6,975,740 | B2 | 12/2005 | Rautio et al. |
| 7,016,186 | B2 | 3/2006 | Ueda et al. |
| 7,286,681 | B2 | 10/2007 | Gerkinsmeyer |
| 8,085,964 | B2 | 12/2011 | Cohen et al. |
| 8,126,163 | B2 | 2/2012 | Cohen et al. |
| 8,374,056 | B2 | 2/2013 | Cohen et al. |
| 8,457,338 | B2 | 6/2013 | Cohen et al. |
| 8,780,673 | B2 * | 7/2014 | Cohen ............... H02K 41/03 367/140 |
| 2001/0048123 | A1 | 12/2001 | Thomas |
| 2002/0073856 | A1 | 6/2002 | Davis et al. |
| 2002/0106093 | A1 | 8/2002 | Azima et al. |
| 2002/0151171 | A1 | 10/2002 | Furusawa |
| 2003/0068054 | A1 | 4/2003 | Sotme et al. |
| 2003/0129814 | A1 | 7/2003 | Mizukoshi |
| 2004/0021594 | A1 | 2/2004 | Melanson |
| 2004/0122543 | A1 | 6/2004 | Lee et al. |
| 2005/0008171 | A1 | 1/2005 | Hosoi et al. |
| 2005/0180577 | A1 | 8/2005 | Horbach |
| 2005/0207588 | A1 | 9/2005 | Biegelsen |
| 2005/0281419 | A1 | 12/2005 | Miyazaki et al. |
| 2006/0072765 | A1 | 4/2006 | Shibutani |
| 2006/0145059 | A1 | 7/2006 | Lee et al. |
| 2006/0255993 | A1 | 11/2006 | Miki et al. |
| 2010/0002900 | A1 | 1/2010 | Cohen et al. |
| 2010/0008521 | A1 | 1/2010 | Cohen et al. |
| 2010/0166242 | A1 | 7/2010 | Cohen et al. |
| 2010/0254550 | A1 | 10/2010 | Martin et al. |
| 2010/0316242 | A1 | 12/2010 | Cohen et al. |
| 2012/0076330 | A1 | 3/2012 | Cohen et al. |
| 2014/0270274 | A1 * | 9/2014 | Cohen ............... H02K 41/03 381/182 |
| 2015/0131840 | A1 * | 5/2015 | Cohen ............... H02K 41/03 381/384 |

FOREIGN PATENT DOCUMENTS

| | | |
|---|---|---|
| EP | 0 437 999 A2 | 12/1990 |
| EP | 1 063 866 A1 | 12/2000 |
| EP | 1 065 725 A2 | 1/2001 |
| EP | 1 206 160 A1 | 5/2002 |
| EP | 1 465 211 A2 | 10/2004 |
| EP | 1 653 614 A1 | 5/2006 |
| GB | 1 106 750 A | 4/1983 |
| GB | 2 393 601 A | 3/2004 |
| JP | A-51-120710 | 10/1976 |
| JP | 57-023387 | 2/1982 |
| JP | A-57-185790 | 11/1982 |
| JP | A-5-014992 | 1/1993 |
| JP | A-09-098092 | 4/1997 |
| JP | A-09-266599 | 10/1997 |
| JP | A-2001-016675 | 1/2001 |
| JP | A-2005-087929 | 4/2005 |
| JP | A-2006-319535 | 11/2006 |
| NL | 6613713 A | 4/1968 |
| WO | WO 84/00460 | 2/1984 |
| WO | WO 96/31086 | 10/1996 |
| WO | WO 98/24544 | 6/1998 |
| WO | WO 01/23104 A2 | 4/2001 |
| WO | WO 01/87458 A1 | 11/2001 |
| WO | 02/17127 A2 | 2/2002 |
| WO | 03/017717 A2 | 2/2003 |
| WO | WO 03/059005 A2 | 7/2003 |
| WO | WO 2007/135678 A2 | 11/2007 |
| WO | WO 2007/135679 A2 | 11/2007 |
| WO | WO 2007/135680 A1 | 11/2007 |
| WO | WO 2009/066290 A2 | 5/2009 |
| WO | 2011/111042 A1 | 9/2011 |
| WO | 2012070042 A1 | 5/2012 |

OTHER PUBLICATIONS

Lagorce, L. K., Brand, O. and M. G. Allen, "Magnetic micro actuators based on polymer magnets", IEEE Journal of Microelectromechanical Systems, vol. 8, No. 1, Mar. 1999.

BBE Sound, Inc., "DS48 Digital Speaker Processor", BBE Professional Products.

Diamond, A. M., et al. "Digital Sound Reconstruction using Arrays of CMOS-MEMS Microspeakers", Transducers, Solid-State Sensors, Actuators and Microsystems, 12th International Conference, Piscataway, NJ, US, IEEE, vol. 9, Jun. 9, 2003, p. 238-241.

Hawksford, M.O.J., "Smart Digital Loudspeaker Arrays", Journal of the Audio Engineering Society, New York, NY, US, vol. 51, No. 12, Dec. 2003, p. 1133-1162.

Huang, Y., et al., "Distortion and Directivity in a Digital Transducer Array Loudspeaker", Journal of the Audio Engineering Society, New York, NY, US, vol. 49, No. 5, May 2001, p. 337-352.

Meyer, D.G., "Digital Control of Loudspeaker Array Directivity", Journal of the Audio Engineering Society, New York, NY, US, vol. 32, No. 10, Oct. 1984, pp. 747-754.

Crocker, M.J., "Encyclopedia of Acoustics", Wiley-Interscience, Apr. 22, 1997.

Kinsler, L.E., et al., "Fundamentals of Acoustics".

Raichel, D.R., "The science and Applications of Acoustics".

Rossing, T. D., et al., "Principles of Vibration and Sound".

Fahy, F., "Foundations of Engineering Acoustics".

Neumann, J.J., Jr., "MEMS (Microelectromechanical Systems) Audio Devices-Dreams and Realities", Audio Engineering Society, Convention paper, Oct. 10-13, 2003.

Yamaha, "Multi-channel Surround Sound from a single component", Digital Sound Projections.

May 10, 2007 International Search Reports issued in PCT/IL2007/000622.

May 11, 2007 International Search Report issued in PCT/IL2007/000618.

Mar. 3, 2008 International Search Report issued in PCT/IL2007/000621.

Jun. 18, 2009 International Search Report issued in PCT/IL2008/001524.

Mar. 3, 2010 International Preliminary Report on Patentability issued in PCT/IL2008/001524.

Braun S., Oberhammer, J., Stemme, G. (2008). Row/column addressing scheme for large electrostatic actuator MEMS switch arrays and optimization of the operational reliability by statistical analysis. Microelectromechanical Systems, Journal of, 17(5), 1104-1113.

Schreier, R., & Temes, G.C. (2005). Understanding delta-sigma data converters (vol. 74). Piscataway, NJ: IEEE press.

* cited by examiner

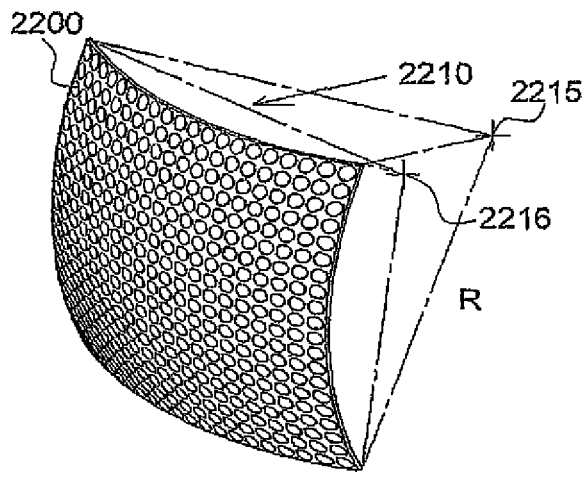
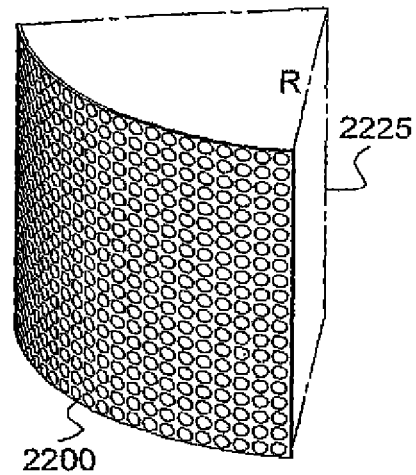
Fig. 3A
Fig. 3B
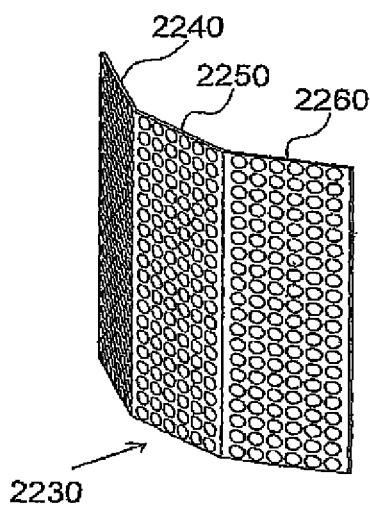
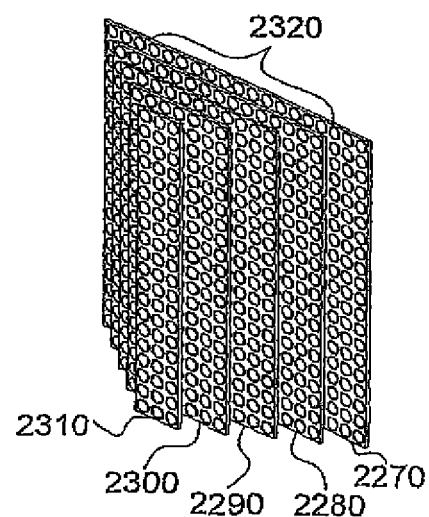
Fig. 3C
Fig. 3D

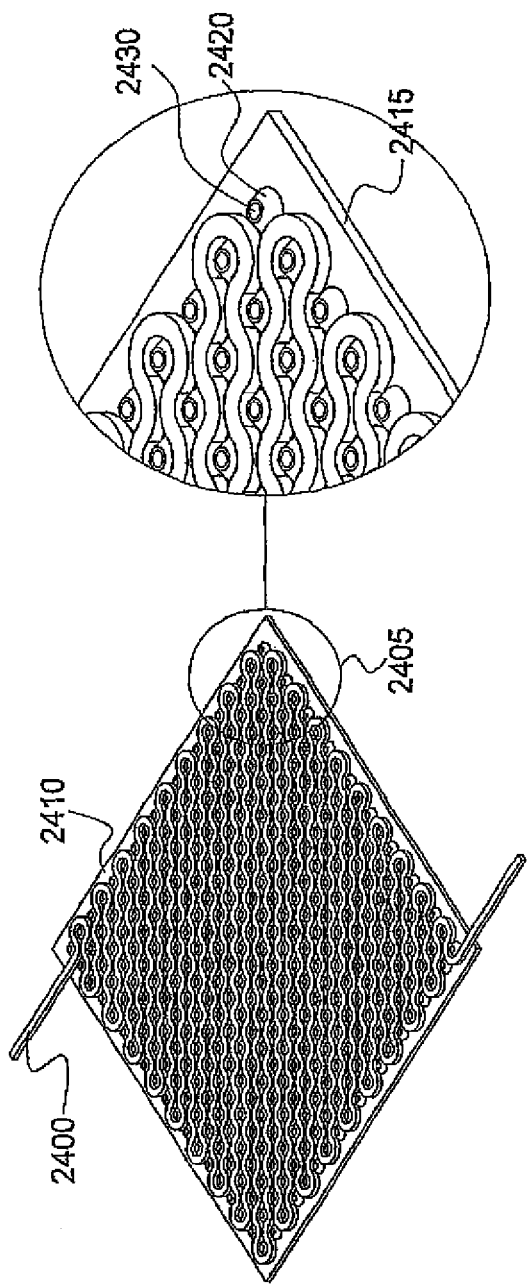

| T | S | R | Q | P | O | N | M | L | K | J | I | H | G | F | E | D | C | B | A |
|---|---|---|---|---|---|---|---|---|---|---|---|---|---|---|---|---|---|---|---|
|399|379|359|339|319|299|279|259|239|219|199|179|159|139|119|99|79|59|39|19|
|397|377|357|337|317|297|277|257|237|217|197|177|157|137|117|97|77|57|37|17|
|395|375|355|335|315|295|275|255|235|215|195|175|155|135|115|95|75|55|35|15|
|393|373|353|333|313|293|273|253|233|213|193|173|153|133|113|93|73|53|33|13|
|391|371|351|331|311|291|271|251|231|211|191|171|151|131|111|91|71|51|31|11|
|389|369|349|329|309|289|269|249|229|209|189|169|149|129|109|89|69|49|29|9|
|387|367|347|327|307|287|267|247|227|207|187|167|147|127|107|87|67|47|27|7|
|385|365|345|325|305|285|265|245|225|205|185|165|145|125|105|85|65|45|25|5|
|383|363|343|323|303|283|263|243|223|203|183|163|143|123|103|83|63|43|23|3|
|381|361|341|321|301|281|261|241|221|201|181|161|141|121|101|81|61|41|21|1|
|382|362|342|322|302|282|262|242|222|202|182|162|142|122|102|82|62|42|22|2|
|384|364|344|324|304|284|264|244|224|204|184|164|144|124|104|84|64|44|24|4|
|386|366|346|326|306|286|266|246|226|206|186|166|146|126|106|86|66|46|26|6|
|388|368|348|328|308|288|268|248|228|208|188|168|148|128|108|88|68|48|28|8|
|390|370|350|330|310|290|270|250|230|210|190|170|150|130|110|90|70|50|30|10|
|392|372|352|332|312|292|272|252|232|212|192|172|152|132|112|92|72|52|32|12|
|394|374|354|334|314|294|274|254|234|214|194|174|154|134|114|94|74|54|34|14|
|396|376|356|336|316|296|276|256|236|216|196|176|156|136|116|96|76|56|36|16|
|398|378|358|338|318|298|278|258|238|218|198|178|158|138|118|98|78|58|38|18|
|400|380|360|340|320|300|280|260|240|220|200|180|160|140|120|100|80|60|40|20|

| 73 | 65 | 57 | 49 | 41 | 33 | 25 | 17 | 9  | 1 |
|----|----|----|----|----|----|----|----|----|---|
| 77 | 69 | 61 | 53 | 45 | 37 | 29 | 21 | 13 | 5 |
| 75 | 67 | 59 | 51 | 43 | 35 | 27 | 19 | 11 | 3 |
| 79 | 71 | 63 | 55 | 47 | 39 | 31 | 23 | 15 | 7 |
| 74 | 66 | 58 | 50 | 42 | 34 | 26 | 18 | 10 | 2 |
| 78 | 70 | 62 | 54 | 46 | 38 | 30 | 22 | 14 | 6 |
| 76 | 68 | 60 | 52 | 44 | 36 | 28 | 20 | 12 | 4 |
| 80 | 72 | 64 | 56 | 48 | 40 | 32 | 24 | 16 | 8 |

*Fig. 12A*

| 7 |
|---|
| 5 |
| 3 |
| 1 |
| 2 |
| 4 |
| 6 |
| 8 |

*Fig. 12B*

| 79 | 71 | 63 | 55 | 47 | 39 | 31 | 23 | 15 | 7 |
|----|----|----|----|----|----|----|----|----|---|
| 77 | 69 | 61 | 53 | 45 | 37 | 29 | 21 | 13 | 5 |
| 75 | 67 | 59 | 51 | 43 | 35 | 27 | 19 | 11 | 3 |
| 73 | 65 | 57 | 49 | 41 | 33 | 25 | 17 | 9  | 1 |
| 74 | 66 | 58 | 50 | 42 | 34 | 26 | 18 | 10 | 2 |
| 76 | 68 | 60 | 52 | 44 | 36 | 28 | 20 | 12 | 4 |
| 78 | 70 | 62 | 54 | 46 | 38 | 30 | 22 | 14 | 6 |
| 80 | 72 | 64 | 56 | 48 | 40 | 32 | 24 | 16 | 8 |

*Fig. 12C*

SPEAKER APPARATUS AND METHODS USEFUL IN CONJUNCTION THEREWITH

REFERENCE TO CO-PENDING APPLICATIONS

This is a Continuation application of application Ser. No. 12/744,127 "Digital Speaker Apparatus" filed May 21, 2010. Priority is claimed from U.S. provisional application No. 60/996,513, entitled "Improved Speaker Apparatus And Methods Useful In Conjunction Therewith" and filed 21 Nov. 2007.

Reference is hereby additionally made to the following applications: U.S. Provisional Application 60/802,126 filed 22 May 2006 and entitled "Apparatus for Generating Pressure", U.S. Provisional Application 60/872,488 filed 4 Dec. 2006 and entitled "Volume Control", U.S. Provisional Application 60/907,450 filed 2 Apr. 2007 and entitled "Apparatus for Generating Pressure and Methods of Manufacture Thereof", U.S. Provisional Application 60/924,203 filed 3 May 2007 and entitled "Apparatus and Methods for Generating Pressure Waves", U.S. Provisional Application 60/996,513 filed 21 Nov. 2007 and entitled "Improved Speaker Apparatus and Methods Useful in Conjunction Therewith", PCT/IL2007/000618 filed 21 May 2007 and entitled "Direct Digital Speaker Apparatus Having a Desired Directivity Pattern", PCT/IL2007/000621 filed 21 May 2007 and entitled "Volume and Tone Control in Direct Digital Speakers", PCT/IL2007/000622 filed 21 May 2007 and entitled "Apparatus and Methods for Generating Pressure Waves"; PCT/IL2007/000623 filed 21 May 2007 and entitled "Arrays of current bearing elements useful for generating pressure waves"; and PCT/IL2007/000624 filed 21 May 2007 and entitled "Apparatus for Generating Pressure and Methods of Manufacture Thereof".

FIELD OF THE INVENTION

The present invention relates generally to actuators and specifically inter alia to speakers.

BACKGROUND OF THE INVENTION

The state of the art for actuators comprising an array of micro actuators is believed to be represented by the following, all of which are US patent documents unless otherwise indicated:

2002/0106093: The Abstract, FIGS. 1-42 and paragraphs 0009, 0023, and 0028 show electromagnetic radiation, actuators and transducers and electrostatic devices.

U.S. Pat. No. 6,373,955: The Abstract and column 4, line 34-column 5, line 55 show an array of transducers.

JP 2001016675: The Abstract shows an array of acoustic output transducers.

U.S. Pat. No. 6,963,654: The Abstract, FIGS. 1-3, 7-9 and column 7, line 41-column 8, line 54 show the transducer operation based on an electromagnetic force.

U.S. Pat. No. 6,125,189: The Abstract; FIGS. 1-4 and column 4, line 1-column 5, line 46, show an electro-acoustic transducing unit including electrostatic driving.

WO 8400460: The Abstract shows an electromagnetic-acoustic transducer having an array of magnets.

U.S. Pat. No. 4,337,379: The Abstract; column 3, lines 28-40, and FIGS. 4, 9 show electromagnetic forces.

U.S. Pat. No. 4,515,997: The Abstract and column 4, lines 16-20, show volume level.

U.S. Pat. No. 6,795,561: Column 7, lines 18-20, shows an array of micro actuators.

U.S. Pat. No. 5,517,570: The Abstract shows mapping aural phenomena to discrete, addressable sound pixels.

JP 57185790: The Abstract shows eliminating the need for a D/A converter.

JP 51120710: The Abstract shows a digital speaker system which does not require any D-A converter.

JP 09266599: The Abstract shows directly applying the digital signal to a speaker.

U.S. Pat. No. 6,959,096: The Abstract and column 4, lines 50-63 show a plurality of transducers arranged within an array.

Methods for manufacturing polymer magnets are described in the following publications:

Lagorce, L. K. and M. G. Allen, "Magnetic and Mechanical Properties of Micro-machined Strontium Ferrite/Polyimide Composites", IEEE Journal of Micro-electromechanical Systems, 6(4), December 1997; and Lagorce, L. K., Brand, O. and M. G. Allen, "Magnetic micro actuators based on polymer magnets", IEEE Journal of Micro-electromechanical Systems, 8(1), March 1999.

U.S. Pat. No. 4,337,379 to Nakaya describes a planar electrodynamics electro-acoustic transducer including, in FIG. 4A, a coil-like structure.

U.S. Pat. No. 6,963,654 to Sotme et al describes a diaphragm, flat-type acoustic transducer and flat-type diaphragm. The Sotme system includes, in FIG. 7, a coil-like structure.

Semiconductor digital loudspeaker arrays are known, such as those described in United States Patent document 20010048123, U.S. Pat. No. 6,403,995 to David Thomas, assigned to Texas Instruments and issued 11 Jun. 2002, U.S. Pat. No. 4,194,095 to Sony, U.S. Pat. No. 4,515,997 to Walter Stinger, and Diamond Brett M., et al, "Digital sound reconstruction using array of CMOS-MEMS micro-speakers", Transducers '03, The $12^{th}$ International Conference on Solid State Sensors, Actuators and Microsystems, Boston, Jun. 8-12, 2003; and such as BBE's DS48 Digital Loudspeaker Management System.

YSP 1000 is an example of a phased array speaker manufactured by Yamaha. Acoustical waveguides are known and may be designed using the principles described in conventional texts on acoustics such as, for example, Encyclopedia of Acoustics by Malcolm J. Crocker, Wiley-Inter-science; Apr. 22, 1997; Fundamentals of Acoustics by Lawrence E. Kinsler; The Science and Applications of Acoustics by Daniel R. Raichel; Principles of Vibration and Sound by Thomas D. Rossing; and Foundations of Engineering Acoustics by Frank J. Fahy.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide an improved speaker.

There is thus provided, in accordance with an embodiment of the present invention, an actuation method for generating a physical effect, at least one attribute of which corresponds to at least one characteristic of a digital input signal sampled periodically in accordance with a clock, the method comprising providing at least one array of moving elements each constrained to travel alternately back and forth along a respective axis in response to an electromagnetic force operative upon the array when the array is in the presence of an alternating magnetic field, initially bringing the array of moving elements into at least one latching position and subsequently reducing the magnitude of the electromagnetic force, selectively latching at least one subset of the moving elements in at least one latching position thereby to prevent individual moving elements from responding to the electromagnetic force, receiving the clock and, accordingly, controlling application of the electromagnetic force to the array of moving elements, and receiving the digital input signal and controlling the latching accordingly.

Further in accordance with an embodiment of the present invention, the magnitude of the electromagnetic force is reduced to zero once the array of moving elements has been brought into the at least one latching position.

Still further in accordance with an embodiment of the present invention, the magnitude of the electromagnetic force is reduced to a level greater than zero once the array of moving elements has been brought into the at least one latching position.

Also provided, in accordance with another embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including an array of moving elements, wherein each individual moving element is responsive to alternating magnetic fields and is constrained to travel alternately back and forth along a respective axis responsive to an electromagnetic force operative thereupon when in the presence of an alternating magnetic field; at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly wherein the magnetic field control system is operative to reduce the magnitude of the electromagnetic force once the array of moving elements has initially been brought into the at least one latching position.

Further provided, in accordance with another embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including an array of moving elements, wherein each individual moving element is responsive to alternating magnetic fields and is constrained to travel alternately back and forth along a respective axis responsive to an electromagnetic force operative upon the array when the array is in the presence of an alternating magnetic field; at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly, wherein the array comprises a set of moving elements which has a surface configuration more complex than a single plane.

Further in accordance with an embodiment of the present invention, the surface configuration comprises a curved surface portion.

Still further in accordance with an embodiment of the present invention, the curved surface portion comprises a portion of a sphere.

Additionally in accordance with an embodiment of the present invention, the curved surface portion comprises a portion of a cylinder.

Also in accordance with an embodiment of the present invention, the surface configuration comprises a plurality of planar portions.

Yet further in accordance with an embodiment of the present invention, the plurality of planar portions together form a piecewise planar portion.

Additionally in accordance with an embodiment of the present invention, the plurality of planar portions are stacked one on top of another.

Also provided, in accordance with an embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including an array of moving elements, wherein each individual moving element includes at least one magnet responsive to alternating magnetic fields and is constrained to travel alternately back and forth along a respective axis responsive to an electromagnetic force operative upon the array when the array is in the presence of an alternating magnetic field; a magnetic field generator coiled around individual moving elements in the array of moving elements so as to generate the alternating magnetic field, the magnets in the moving elements being translatably disposed at specific horizontal locations above the coiled magnetic field generator; at least one ferromagnetic element disposed under the magnetic field generator and sticking up through the magnetic field generator at least at one horizontal location disposed below the magnets; at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly.

Further in accordance with an embodiment of the present invention, the ferromagnetic element comprises a planar portion on which are defined a plurality of apertured upstanding members, each of which upstanding members protrudes through the magnetic field generator at a horizontal location disposed below a magnet included in an individual moving element within the array of moving elements, each of the upstanding members defining an air passage through which sound waves, generated by the individual moving element, may propagate.

Still further in accordance with an embodiment of the present invention, at least some of the upstanding members comprise truncated cones.

Also provided, in accordance with an embodiment of the present invention, is an actuation method for generating a physical effect, at least one attribute of which corresponds to at least one characteristic of a digital input signal sampled periodically in accordance with a clock, the method comprising providing at least one array of moving elements each constrained to travel alternately back and forth along a respective axis in response to an electromagnetic force operative upon the array when the array is in the presence of an alternating magnetic field; selectively latching at least one subset of the moving elements in at least one latching position thereby to prevent individual moving elements from responding to the electromagnetic force; receiving the clock and, accordingly, controlling application of the electromagnetic force to the array of moving elements; and receiving the digital input signal and controlling the latching step accordingly wherein the latching occurs in accordance with a timing pattern introducing delays for the moving elements in the array so as to achieve sound having a predetermined directivity pattern which differs from a natural directivity pattern which would have occurred if all moving elements in the array were to operate synchronously.

Still further in accordance with an embodiment of the present invention, the predetermined directivity pattern comprises a omni-directional pattern defining a sphere having a center point and wherein the delay comprises the following quotient for each moving element P in the array:

$$\text{delay} = \frac{r_2}{c},$$

where $r_2$=distance between the center point and moving element P and c is the velocity of sound through the medium in which the speaker is operating.

Additionally in accordance with an embodiment of the present invention, the predetermined directivity pattern comprises a cylindrical pattern defining a cylinder having a cylinder axis and wherein the delay comprises the following quotient for each moving element P in the array:

$$\text{delay} = \frac{r_1}{c},$$

where $r_1$=distance between the cylinder axis and the pressure-producing element P and c is the velocity of sound through the medium in which the speaker is operating.

Additionally in accordance with an embodiment of the present invention, the predetermined directivity pattern comprises a uni-directional pattern defining a beam having a planar wave front and a wave propagation direction and wherein the delay comprises the following quotient for each moving element P in the array:

$$\text{delay} = \frac{r_3}{c},$$

where $r_3$=distance between a pre-determined plane, lying behind the surface of the pressure-producing elements and parallel to the planar wave front and normal to the wave propagation direction, and the pressure-producing element P and c is the velocity of sound through the medium in which the speaker is operating.

Yet further provided, in accordance with yet another embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including a first array of moving elements, wherein each individual moving element is responsive to alternating magnetic fields and is constrained to travel alternately back and forth along a respective axis responsive to an electromagnetic force operative thereupon when in the presence of an alternating magnetic field; a waveguide guiding sound-waves generated by the array so as to achieve a desired directivity pattern; at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly, including temporally staggering motion of individual moving elements so as to achieve the desired directivity pattern by reducing interference between moving elements.

Further in accordance with an embodiment of the present invention, the waveguide intersects the array thereby to define a waveguide-array intersection and wherein the latch controller is operative to temporally stagger motion of individual moving elements in the array such that individual moving elements move in order of their respective distances from the waveguide-array intersection.

Still further in accordance with an embodiment of the present invention, the waveguide comprises a second array of moving elements which together with the first array serves as a waveguide for sound waves produced by both arrays.

Also provided, in accordance with another embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including a first array of moving elements, wherein each individual moving element is responsive to alternating magnetic fields and is constrained to travel alternately back and forth along a respective axis responsive to an electromagnetic force operative thereupon when in the presence of an alternating magnetic field; a waveguide comprising a second array of moving elements guiding sound-waves generated by the arrays so as to achieve a desired directivity pattern; at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly.

Additionally in accordance with an embodiment of the present invention, the waveguide intersects the array.

Further in accordance with an embodiment of the present invention, the waveguide has a surface area and the array has a planar main surface and most of the waveguide's surface area is parallel to the main surface.

Also provided, in accordance with another embodiment of the present invention, is actuator apparatus for generating a physical effect, at least one attribute of which corresponds to at least one characteristic of a digital input signal sampled periodically in accordance with a clock, the apparatus comprising at least one actuator device, each actuating device including an array of moving elements, wherein each individual moving element is responsive to alternating magnetic fields and is constrained to travel alternately back and forth along a respective axis responsive to an electromagnetic force operative thereupon when in the presence of an alternating magnetic field, thereby to define an amplitude of motion, the amplitude of motion being less than an amplitude value c derived assuming (a) a desired total sound pressure level implying a desired pressure P produced by each moving element and (b) an application-specific oscillation frequency $f_s$ and using the following conventional formula to derive the amplitude value from the pressure P and the oscillation frequency:

$$P = \frac{\sqrt{2} \cdot \pi \cdot \rho \cdot S \cdot \varepsilon \cdot f_s^2}{2 \cdot R_0} \quad (1)$$

where ρ is the medium density, S is the piston surface area, ∈ is the motion amplitude (peak to peak) of an individual moving element, and $R_0$ is the distance from the source, at least one latch operative to selectively latch at least one subset of the moving elements in at least one latching position thereby to prevent the individual moving elements from responding to the electromagnetic force; a magnetic field control system operative to receive the clock and, accordingly, to control application of the electromagnetic force to the array of moving elements; and a latch controller operative to receive the digital input signal and to control the at least one latch accordingly.

Further in accordance with an embodiment of the present invention, the amplitude of motion is less than the amplitude value ∈.

Still further in accordance with an embodiment of the present invention, those moving elements closest to the intersection move first.

Also provided, in accordance with another embodiment of the present invention, is a method for employing actuator apparatus to generate a physical effect, at least one attribute of which corresponds to at least one characteristic of a digital input signal sampled periodically in accordance with a clock, the method comprising providing actuator apparatus comprising at least one actuator device, each actuating device including an array of moving elements, wherein each individual moving element is responsive to alternating magnetic fields and is constrained to travel alternately back and forth along a respective axis responsive to an electromagnetic force operative thereupon when in the presence of an alternating magnetic field, at least one latch operative to selectively latch at least one subset of the moving elements in at least one latching position thereby to prevent the individual moving elements from responding to the electromagnetic force, a magnetic field control system operative to receive the clock and, accordingly, to control application of the electromagnetic force to the array of moving elements; and a latch controller operative to receive the digital input signal and to control the at least one latch accordingly; generating electrostatic force between at least an individual one of the moving elements and the at least one latch, the individual moving element having at least one moving element surface, the latch having at least one latch surface facing the moving element surface; and providing a dielectric layer and applying the dielectric layer to at least an individual one of the surfaces. Said providing may also include additional treatment to at least partly prevent charge trapping in the dielectric layer.

Still further in accordance with an embodiment of the present invention, the electrostatic force is generated by applying voltage generated by a voltage supply having positive and negative poles, the providing and applying comprises connecting the negative pole of the voltage supply to the individual surface to which the dielectric layer has been applied, and connecting the positive pole to a surface facing the individual surface.

Still further in accordance with an embodiment of the present invention, the providing and applying comprises connecting the positive pole of the voltage supply to the individual surface to which the dielectric layer has been applied, and connecting the negative pole to a surface facing the individual surface.

Further in accordance with an embodiment of the present invention, charge trapping is prevented by coating the dielectric layer with a thin conductive layer.

Still further in accordance with an embodiment of the present invention, each moving element P in the array operates with a delay comprising the following quotient:

$$\text{delay} = \frac{d}{c},$$

where d=distance between the intersection and the pressure-producing element P and c is the velocity of sound through the medium in which the apparatus is operating.

Also provided in accordance with an embodiment of the present invention, is an actuation method for generating a physical effect, at least one attribute of which corresponds to at least one characteristic of a digital input signal sampled periodically in accordance with a clock, the method comprising providing at least one array of moving elements each constrained to travel alternately back and forth along a respective axis in response to an electromagnetic force operative upon the array when the array is in the presence of an alternating magnetic field, thereby to generate a sound wave, and a waveguide intersecting the at least one array thereby to define an elongate array-waveguide intersection location, and operative to guide the sound wave to achieve a pre-determined directivity pattern, selectively latching at least one subset of the moving elements in at least one latching position thereby to prevent individual moving elements from responding to the electromagnetic force; receiving the clock and, accordingly, controlling application of the electromagnetic force to the array of moving elements; and receiving the digital input signal and controlling the latching accordingly, wherein the latching comprises repeatedly selecting a current subset of moving elements to be latched into an individual extreme position, including determining the size of the subset and determining the members of the current subset by selecting from among those moving elements not currently in the individual extreme position, a set of moving elements which are closest to the intersection location.

Further in accordance with an embodiment of the present invention, a LUT is used to perform the repeated selection, the LUT storing, for each position within the array, an ordinal number associated with the position and selected such that the distance of the position from the intersection location is a function of the position.

Still further in accordance with an embodiment of the present invention, the elongate intersection location defining a plurality of rows, into which the moving elements are partitioned, the rows being disposed parallel to the intersection location, and wherein the set of moving elements closest to the intersection location is selected, from among all moving elements of a given closeness to the intersection location, by preferring those moving elements which are close to a mid-axis bisecting the rows.

Also provided, in accordance with an embodiment of the present invention, is an actuation method for generating a physical effect, the method comprising providing at least one array of translating elements each constrained to travel alternately back and forth along a respective axis, toward first and second extreme positions respectively, in response to activation of first and second forces respectively; and using the first and second forces to selectably latch at least one subset of the translating elements into the first and second extreme positions respectively.

Further in accordance with an embodiment of the present invention, the first and second forces on each individual translating element are generated by at least one voltage applied between the individual translating element and at least one respective electrode relative to which the translating element is traveling.

Still further in accordance with an embodiment of the present invention, at least one translating element is operative to initially approach the first extreme position; and is subsequently operative to travel, alternately, from the first extreme position to the second extreme position, and from the second extreme position back to the first extreme position.

Additionally in accordance with an embodiment of the present invention, while the individual translating element initially approaches the first extreme position, the first force comprises an at least almost periodical force having a first period and activated in accordance with a first temporal schedule and the second force is an at least almost periodical force having a second period identical to the first period, the second force being activated during the second period in accordance with a second temporal schedule which is identical to, but shifted by half a period relative to, the first temporal schedule.

Further in accordance with an embodiment of the present invention, the first temporal schedule includes a first half period interval and a second half period interval and wherein, during the first half period interval, the first force is low in magnitude relative to its magnitude during the second half period interval.

Still further in accordance with an embodiment of the present invention, the voltage has a first magnitude as the individual translating element leaves the second extreme position and begins to travel toward the first extreme position and has a second magnitude, smaller than the first magnitude, once the translating element has already reached the first extreme position and the voltage is merely serving to latch the translating element into the first extreme position.

Also provided, in accordance with an embodiment of the present invention, is multi-layer actuator apparatus comprising a first layer, at least a portion of which is conductive; at least one second operational layer, at least at portion of which is conductive, having formed therewithin: a plurality of operational units actuated by applying voltage between conductive portions of the first and second layers; and at least one cut-out portion isolating at least one subset of the plurality of operational units from all operational units outside of the subset other than a connecting channel which connects the subset of the plurality of operational units to all operational units outside of the subset, thereby to define a fuse.

Further in accordance with an embodiment of the present invention, the first force on each individual translating element is generated by a first voltage applied between the individual translating element and a first electrode disposed at the first extreme position and wherein the second force on each individual translating element is generated by a second voltage applied between the individual translating element and a second electrode disposed at the second extreme position.

Still further in accordance with an embodiment of the present invention, even when an individual translating element is neither latched to the first extreme position nor traveling toward it, the first voltage is not uniformly zero, thereby to expedite subsequent increase of the first voltage to a higher level when the individual translating element embarks on travel toward the first extreme position.

Additionally in accordance with an embodiment of the present invention, during at least a portion of time in which at least one individual translating element is latched to the first extreme position, the second voltage is not less than the first voltage, thereby to expedite subsequent increase of the second voltage to a higher level when the individual translating element embarks on travel toward the second extreme position.

Also provided, in accordance with an embodiment of the present invention, is a latch controller comprising electronic circuitry that transfers electric charge from at least one first electrode at least one second electrode thus increasing the power efficiency of the system.

Still further in accordance with an embodiment of the present invention, the latch controller also comprises at least one charge storage device capable of receiving charge from at least one electrode.

Still further in accordance with an embodiment of the present invention, the charge storage device is capable of transferring charge to at least one electrode.

Also provided, in accordance with an embodiment of the present invention, is an actuation system for generating a physical effect, the system comprising at least one array of translating elements each constrained to travel alternately back and forth along a respective axis, toward first and second extreme positions respectively, in response to activation of first and second forces respectively; and a controller operative to use the first and second forces to selectably latch at least one subset of the translating elements into the first and second extreme positions respectively.

Further in accordance with an embodiment of the present invention, the system also comprises a first layer, at least a portion of which is conductive; and the array is formed within at least one second operational layer, at least a portion of which is conductive, having formed therewithin a plurality of operational units, each including at least one translating element and actuated by applying voltage between conductive portions of the first and second layers; and at least one cut-out portion isolating at least one subset of the plurality of operational units from all operational units outside of the subset other than a connecting channel which connects the subset of the plurality of operational units to all operational units outside of the subset, thereby to define a fuse.

Still further in accordance with an embodiment of the present invention, the first and second forces comprise electro-static forces.

Also provided, in accordance with an embodiment of the present invention, is an actuation system comprising at least one array of elastically translating elements, each constrained to travel, in response to a force operative thereupon, along a respective axis, from a first extreme position, to a second extreme position, thereby to define a first half of a temporal phase, and, upon reaching the second extreme position, to return to the first extreme position, thereby to define a second half of a temporal phase; and a latching device providing only two operative states for each individual elastically translating element from among the array of elastically translating elements: a first state in which the individual elastically translating element is latched into only one of the first and second extreme positions; and a second state in which the individual elastically translating element is free.

Further in accordance with an embodiment of the present invention, the system also comprises a first layer, at least a portion of which is conductive; and wherein the array is formed within at least one second operational layer, at least at portion of which is conductive, having formed therewithin a plurality of operational units, each including at least one translating element and actuated by applying voltage between conductive portions of the first and second layers; and at least one cut-out portion isolating at least one subset of the plurality of operational units from all operational units outside of the subset other than a connecting channel which connects the subset of the plurality of operational units to all operational units outside of the subset, thereby to define a fuse.

Further in accordance with an embodiment of the present invention, the system also comprises a controller operative to cause a force to operate, during a time period including at least one temporal phase, on at least one pair of adjacent elastically translating elements including first and second elastically translating elements, the force operating alternately, with a delay of half a phase, on the first and second elements.

Still further in accordance with an embodiment of the present invention, the controller is operative to cause an elastic force to operate on the at least one pair by unlatching the at least one pair.

Additionally in accordance with an embodiment of the present invention, at least one attribute of the physical effect corresponds to at least one characteristic of a digital input signal sampled periodically in accordance with a clock, and application of at least one force to the array of translating elements is controlled at least partly according to the clock and latching is controlled at least partly according to the digital input signal.

Further in accordance with an embodiment of the present invention, the attribute comprises at least one of the following attributes: intensity; and pitch.

Still further in accordance with an embodiment of the present invention, the first and second forces on each individual translating element are generated by at least one voltage applied between the individual translating element and at least one respective electrode relative to which the translating element is traveling.

Also provided, in accordance with an embodiment of the present invention, is a method for manufacturing an actuation system for generating a physical effect, the method comprising providing at least one array of translating elements each constrained to travel alternately back and forth along a respective axis, toward first and second extreme positions respectively, in response to activation of first and second forces respectively; and providing a controller operative to use the first and second forces to selectably latch at least one subset of the translating elements into the first and second extreme positions respectively.

Also provided, in accordance with an embodiment of the present invention, is a method for manufacturing an actuation system, the method comprising providing at least one array of elastically translating elements, each constrained to travel, in response to a force operative thereupon, along a respective axis, from a first extreme position, to a second extreme position, thereby to define a first half of a temporal phase, and, upon reaching the second extreme position, to return to the first extreme position, thereby to define a second half of a temporal phase; and providing a latching device providing only two operative states for each individual elastically translating element from among the array of elastically translating elements: a first state in which the individual elastically translating element is latched into only one of the first and second extreme positions; and a second state in which the individual elastically translating element is free.

Additionally provided, in accordance with an embodiment of the present invention, is a method for manufacturing multi-layer actuator apparatus, the method comprising providing a first layer, at least a portion of which is conductive; and providing at least one second operational layer, at least at portion of which is conductive, having formed therewithin a plurality of operational units actuated by applying voltage between conductive portions of the first and second layers; and at least one cut-out portion isolating at least one subset of the plurality of operational units from all operational units outside of the subset other than a connecting channel which connects the subset of the plurality of operational units to all operational units outside of the subset, thereby to define a fuse.

Regarding terminology used herein:

Array: This term is intended to include any set of moving elements whose axes are preferably disposed in mutually parallel orientation and flush with one another so as to define a surface which may be planar or curved.

Above, Below: It is appreciated that the terms "above" and "below" and the like are used herein assuming that, as illustrated by way of example, the direction of motion of the moving elements is up and down however this need not be the case and alternatively the moving elements may move along any desired axis such as a horizontal axis.

Actuator: This term is intended to include transducers and other devices for inter-conversion of energy forms. When the term transducers is used, this is merely by way of example and it is intended to refer to all suitable actuators such as speakers, including loudspeakers.

Actuator element: This term is intended to include any "column" of components which, typically in conjunction with many other such columns, forms an actuator, each column typically including a moving element, a pair of latches or "latching elements" therefore, each latching element including one or more electrodes and insulative spacing material separating the moving element from the latches.

Coil: It is appreciated that the alternating electromagnetic force applied to the array of moving elements in accordance with certain embodiments of the present invention may be generated by an alternating electric current oriented to produce a magnetic field gradient which is co-linear to the desired axes of motion of the moving elements. This electric current may comprise current flowing through a suitably oriented conductive coil or conductive element of any other suitable configuration. The term "coil" is used throughout the present specification as an example however it is appreciated that there is no intention to limit the invention which is intended to include all apparatus for applying an alternating electromagnetic force e.g. as described above. When "coil" is used to indicate a conductor, it is appreciated that the conductor may have any suitable configuration such as a circle or other closed figure or substantial portion thereof and is not intended to be limited to configurations having multiple turns.

Channels, also termed "holes" or "tunnels": Although these are illustrated as being cylindrical merely by way of example, this need not be the case.

Electrode: An electro-static latch. Includes either the bottom or top electro-static latch which latches its corresponding moving element by virtue of its being oppositely charged such that each latch and its moving element constitute a pair of oppositely charged electrodes.

Flexure: at least one flexible element on which an object is mounted, imparting at least one degree of freedom of motion to that object, for example, one or more flexible thin or small elements peripheral to and typically integrally formed e.g. from a single sheet of material, with a central portion on which another object may or may not be mounted, thereby to impart at least one degree of freedom of motion to the central portion and objects mounted thereupon.

Latch, latching layer, latching mechanism: This term is intended to include any device for selectively locking one or more moving elements into a fixed position. Typically, "top" and "bottom" latching layers are provided, which may be side by side and need not be one atop the other, and each latching layer includes one or many latching mechanisms which may or may not correspond in number to the number of moving elements to be latched. The term "latch pair" is a pair of latches for an individual moving element e.g. including a top latch and a bottom latch, which may be side by side and need not be one atop the other.

Moving elements: These are intended to include any moving elements each constrained to travel alternately back and forth along an axis in response to an alternating electromagnetic force applied thereto. Moving elements are also termed herein "micro-speakers", "pixels", "micro-actuators", "membranes" (individually or collectively) and "pistons".

Spacers, also termed "space maintainers": Include any element or elements mechanically maintaining the respective positions of the electrodes and moving elements. The term "direct digital speaker" is used herein to include speakers that accept a digital signal and translate the signal into sound waves without the use of a separate digital to analog converter. Such speakers may sometimes include an analog to digital converter as to allow them to translate analog signals instead or in addition to digital signals. Such speakers may include DDS (Direct Digital Speakers), DDL (Direct Digital Loudspeakers), DSR (Digital Sound Reconstruction) speakers, digital uniform loudspeaker arrays, matrix speakers, and MEMS speakers. The term "direct digital speaker" as used herein is intended to include speaker apparatus having a multiplicity of pressure-producing elements, which generate pressure either by virtue of their motion e.g. as specifically described herein or by heating and cooling the medium in which they reside, e.g. air, or by accelerating the medium in which they reside e.g. by ionizing the medium and providing a potential difference along an axis, or by operating as valves to selectively tap reservoirs of medium e.g. air, pressurized differently from the surrounding environment. The number of operating pressure producing elements (i.e. elements which are operating to generate pressure) is typically a monotonically increasing function of, e.g. proportional to the intensity of the input signal, if analog, or to the digitally encoded intensity of the input signal, if digital.

The term "clock" used herein refers to the time duration associated with a single interval of the system clock.

The term "directivity pattern" as used herein refers to the pattern of the spatial distribution of the acoustic energy generated by speaker apparatus.

BRIEF DESCRIPTION OF THE DRAWINGS

Certain embodiments of the present invention are illustrated in the following drawings:

FIGS. 3A-3D are examples of moving element array configurations constructed and operative in accordance with certain embodiments of the present invention.

FIG. 4 is a perspective view of an improved coil layer apparatus having a ferromagnetic element protruding through a magnetic field generator coiled about the moving elements in accordance with certain embodiments of the invention.

FIG. 5A is an enlarged view of a detail of FIG. 4.

FIG. 11 is an example of a look-up table useful in performing the moving element determination step in the flowchart of FIG. 21, for speakers constructed and operative in accordance with an embodiment of the present invention which include a waveguide.

FIGS. 12A-12C are matrices useful in constructing LUTs for speakers which include a waveguide.

DETAILED DESCRIPTION OF CERTAIN EMBODIMENTS

According to certain embodiments of the invention, power may be conserved by turning off, or reducing the current through, the electro-magnetic field generator at a suitable point in time e.g. after completion of an initialization sequence provided in accordance with certain embodiments of the present invention and described below with reference to FIG. 17D. The electro-magnetic field generator is typically turned off, or the current therethrough reduced, at the point where all moving elements have been latched into one of their typically two extreme positions, typically half of the moving elements being latched into each of the two positions. This is possible since the system operates in resonance and has a high Q factor such that the electro-magnetic field is typically not necessary or hardly necessary in order to ensure that the moving element is latched into a new, opposite extreme position each time it is released.

Figure 1:
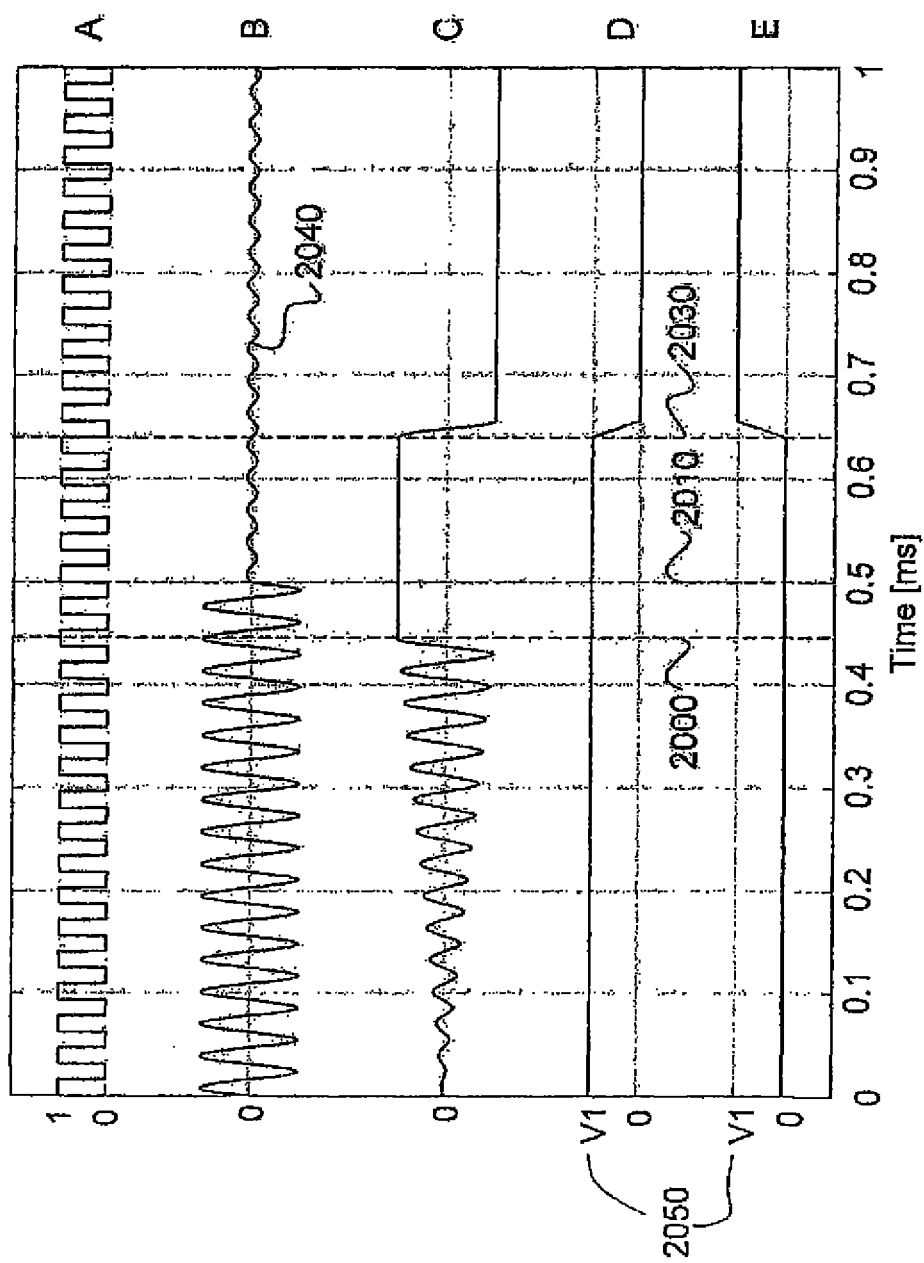
FIG. 1 shows graphs of system timing according to an embodiment in which power down of the magnetic field generator is provided after completion of the initialization sequence illustrated in FIG. 17D.
Figure 2:
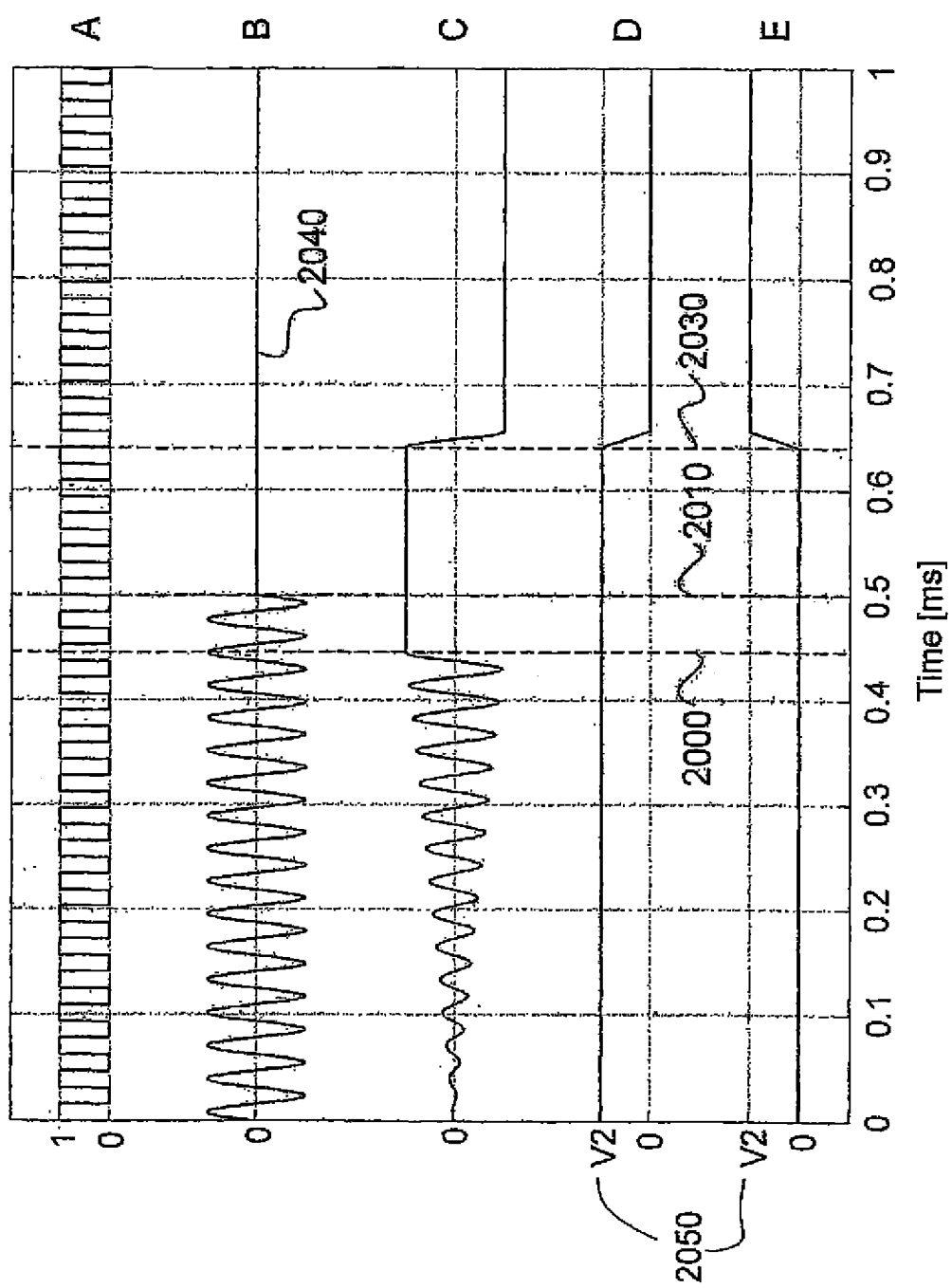
FIG. 2 shows graphs of system timing according to an embodiment in which power off is provided of the magnetic field generator after completion of the initialization sequence described in FIG. 17D.

FIG. 1 illustrates system timing graphs including a graph A depicting the system clock, a graph B depicting a suitable power graph for the electro-magnetic field generator, graph C depicting the vertical displacement of an individual moving element assuming the power graph of B, assuming that the moving element is moving into a top latching position, and assuming that after approximately 6.5 millisec, the moving element is released from its top latching position at which point it begins to move toward its bottom latching position. Graphs D and E depict the voltage levels of the top and bottom latches respectively. As is apparent especially from Graph C, due to resonance, the amplitude of the moving element's periodic motion increases over time until, after approximately 4.5 millisec, it reaches an amplitude sufficient for it to be electro-statically latched into its top latching position. After a suitable interval such as 0.5 millisec, the electro-magnetic field generator can be powered down as shown in FIG. 1, or even powered off as shown in FIG. 2. Typically, the powering-down or -off is compensated by increasing the latching voltage. The increase in latching voltage and decrease in electro-magnetic generator power may be selected to as to minimize power while still enabling latching to take place.

FIG. 2 is similar to FIG. 1 except that the electro-magnetic field generator is powered off rather than being powered down as in FIG. 1. As is apparent by comparing Graphs D and E in FIGS. 1 and 2, the fact that the generator is powered off rather than down is compensated for by slightly increasing the latching voltage, e.g., in the illustrated example, $V_1$ shown in FIG. 1 is lower than $V_2$ shown in FIG. 2.

As described above, according to certain embodiments, a set of moving elements is provided whose axes are typically substantially parallel and flush with one another so as to define a surface which may or may not be planar. Each moving element is associated with other components such as latches, coils and spacer layers, together forming a column. FIGS. 3A-3D illustrate four exemplary sets of columns respectively, only the top surfaces 2200 of which are visible. As shown, in FIG. 3A, the surfaces 2200 define a main surface 2210 curved along two axes which may for example comprise a portion of a spherical surface defined about a center point 2215 and having a radius R. In FIG. 3B, the surfaces 2200 define a main surface 2220 curved about a single axis 2225; the main surface may for example comprise a portion of a cylindrical surface. In FIG. 3C, the surfaces 2200 define a main surface 2230 which is piecewise planar in that it comprises a plurality of connected planes (three planes, 2240, 2250 and 2260, in the illustrated example). In FIG. 3D the surfaces 2200 define a plurality of stacked surfaces (5 surfaces 2270, 2280, 2290, 2300 and 2310 in the illustrated example). Since the columns in obstructed surfaces or portions of surfaces are effectively inoperative, the stacked surfaces typically are of sequentially diminishing sizes as shown. It is appreciated that the obstructed portions of the surfaces other than the top surface 2310 may or may not be formed with actual columns, so, for example, the columns in portion 2320 of bottom surface 2270 may be omitted.

The configurations of FIGS. 3A-3D generate a respective variety of directivity characteristics. For example, the configuration of FIG. 3A generates omni-directional directivity. More specifically, if the top surfaces 2200 of the columns were to define a complete spherical surface, the directivity achieved would be wholly omni-directional; if the top surfaces define only a portion of the spherical surface as shown, the directivity achieved is partial i.e. a corresponding portion of omni-directionality is achieved. Specifically, good performance is achieved, other than fade, in a "natural good performance area" comprising a portion of the imaginary sphere delineated by the main surface 2210 and the set of radii connecting the perimeter of the main surface 2210 to the center 2215. It is appreciated that it is possible to achieve, by employing suitable temporal staggering of the operation of the moving elements, good performance even outside the "natural good performance area". For example, if it may be desired to achieve good performance in a "synthetic good performance area" comprising a portion of an imaginary sphere delineated by the main surface 2210 and the set of line segments connecting the main surface 2210 to an imaginary point 2216, different from the real center 2215 of the main surface. It is further appreciated that it is possible to achieve, by employing suitable temporal staggering of the operation of the moving elements, good performance at an area smaller than the "natural good performance area", by placing the imaginary point 2216 at a distance from the surface 2210 which exceeds the distance of the real center 2215 from the surface 2210.

Similarly, the configuration of FIG. 3B generates cylindrical directivity. More specifically, if the top surfaces 2200 of the columns were to define a complete cylindrical surface, the directivity achieved would be wholly cylindrical, i.e. a "natural good performance area" would be achieved, other than fade, in an area located in-between the two planes that form the top and bottom of the cylinder; if the surfaces 2220 define only a portion of the cylindrical surface as shown, the directivity achieved is partial i.e. a corresponding portion of cylindrical directionality is achieved. Specifically, good performance is achieved, other than fade, in a "natural good performance area" comprising a portion of the imaginary cylinder delineated by the main surface 2220 and the set of normals connecting the perimeter of the main surface 2210 to the axis 2225. It is appreciated that it is possible to achieve, by suitable temporal staggering of the operation of the moving elements, good performance in an area larger or smaller than the "natural good performance area" of the portion-cylindrical array of FIG. 3B. For example, it may be desired to achieve good performance in a "synthetic good performance area" comprising a portion of an imaginary cylinder delineated by the main surface 2220 and the set of shortest line segments connecting the main surface 2210 to an imaginary axis, different from the real axis 2225.

Referring again to FIG. 3B, if the axis 2225 is vertical then the directivity generated is horizontal, wholly or partially, hence suitable for applications in which it is desired to generate sound only at a specific vertical location e.g. within a certain floor in a multi-level facility. The configuration of FIGS. 3C and 3D are respectively similar to FIG. 3B in effect however are easier to manufacture and/or stronger in certain applications.

Figure 5B:
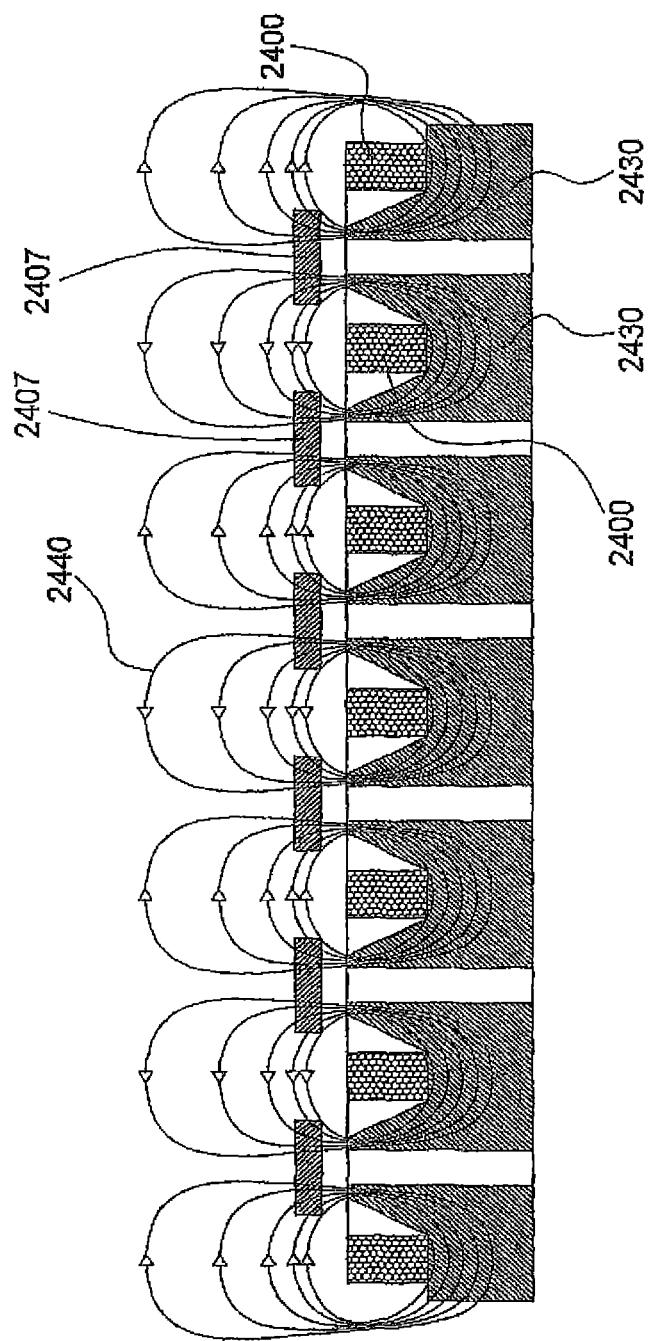
FIG. 5B is a cross-sectional view of the apparatus of FIG. 4, also showing magnets.

FIG. 4 is a perspective view of an improved coil layer apparatus 2400; FIG. 5A is a detail of FIG. 4 as indicated by bubble 2405. FIG. 5B is a cross-section of the apparatus of FIG. 5A also showing magnets 2407 translatably disposed at specific horizontal locations above the coil layer. In the embodiment of FIGS. 4-5B, at least one magnetic field conductor layer 2410 formed e.g. of a ferromagnetic material is provided, preferably disposed under the coil 2400 and also sticking up through the coil at least at the horizontal locations disposed below the magnets 2407. For example, in the illustrated embodiment, the ferro-magnetic layer 2410 may comprise a planar portion 2415 in which is defined an array of apertured upstanding members 2420 such as apertured truncated cones 2420 disposed under each magnet 2407. Each upstanding member 2420 defines an air passage 2430 through which sound waves generated by the moving elements associated with the magnets 2407, may propagate. It is appreciated that the ferromagnetic material used to build the ferromagnetic layer 2410 may, in certain embodiments, be an electric insulator or a poorly conducting material such as Ferrite, Amorphous Ferrum, Kovar or Iron Powder, so as to reduce the generation of induced currents in the layer. This structure is operative to enhance the magnetic field, by virtue of provision of a ferromagnetic material, rather than air, through which the principal magnetic field lines 2440 pass as best seen in FIG. 5B. This structure is also operative to increase the gradient of the magnetic field across the magnet thus achieving a stronger force for a given current across the coil. Finally, this structure reduces cross-talk between adjacent magnets i.e. reduces the influence that one magnet has on adjacent magnets by diminishing the magnetic field generated by each magnet at the locations occupied by other magnets.

It is appreciated that in certain embodiments, more than one ferromagnetic material layer and in some embodiments more than one coil layer may be provided, e.g. one on each side of the layer of moving elements.

Figure 6:
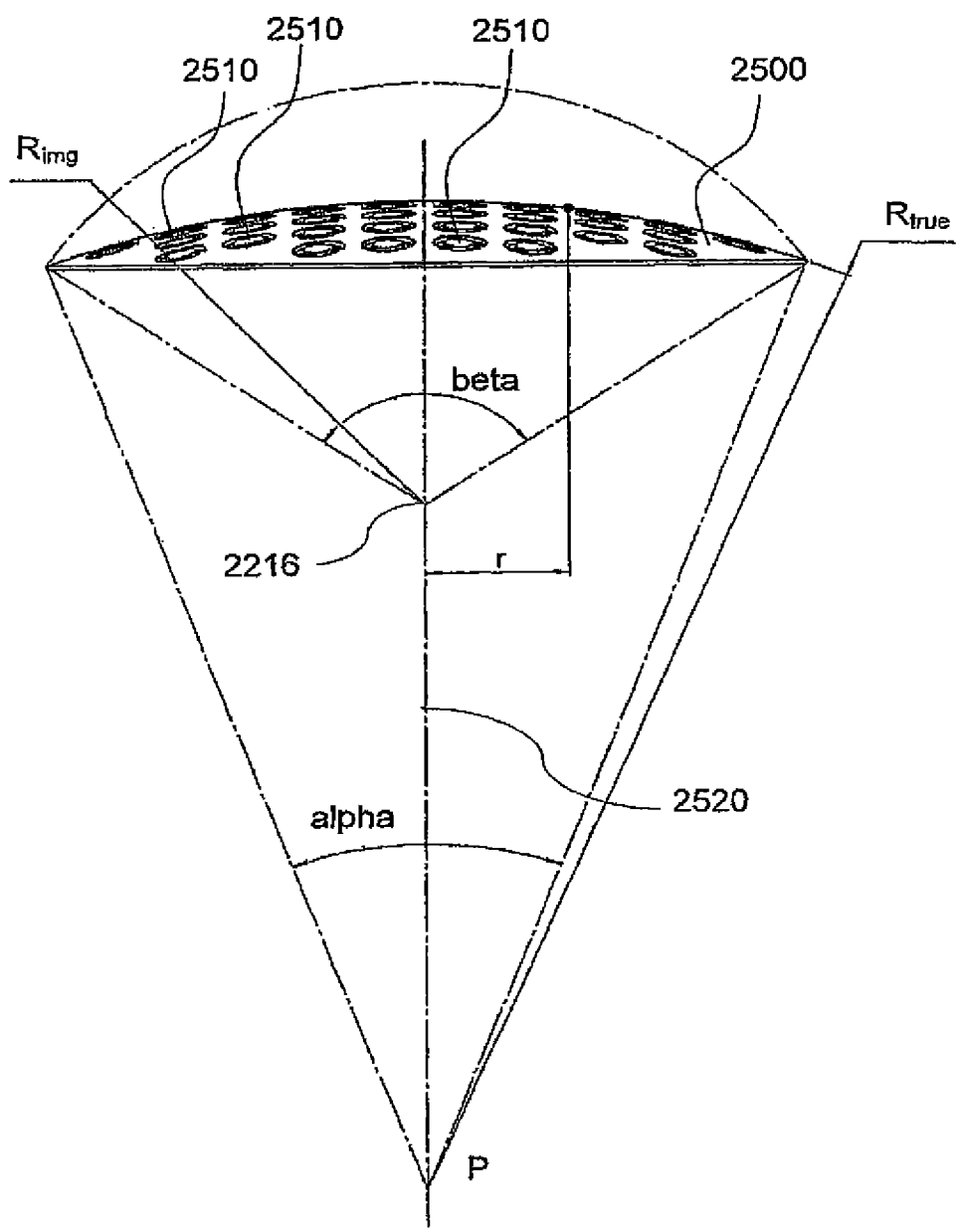
FIG. 6 illustrates an array of moving elements having a circular segment configuration which may be used, in conjunction with a suitable temporal schedule for moving element operation, to generate an omni-directional synthetic directivity pattern having a radius which differs from the radius of the circular segment.
Figures 7A, 7B:
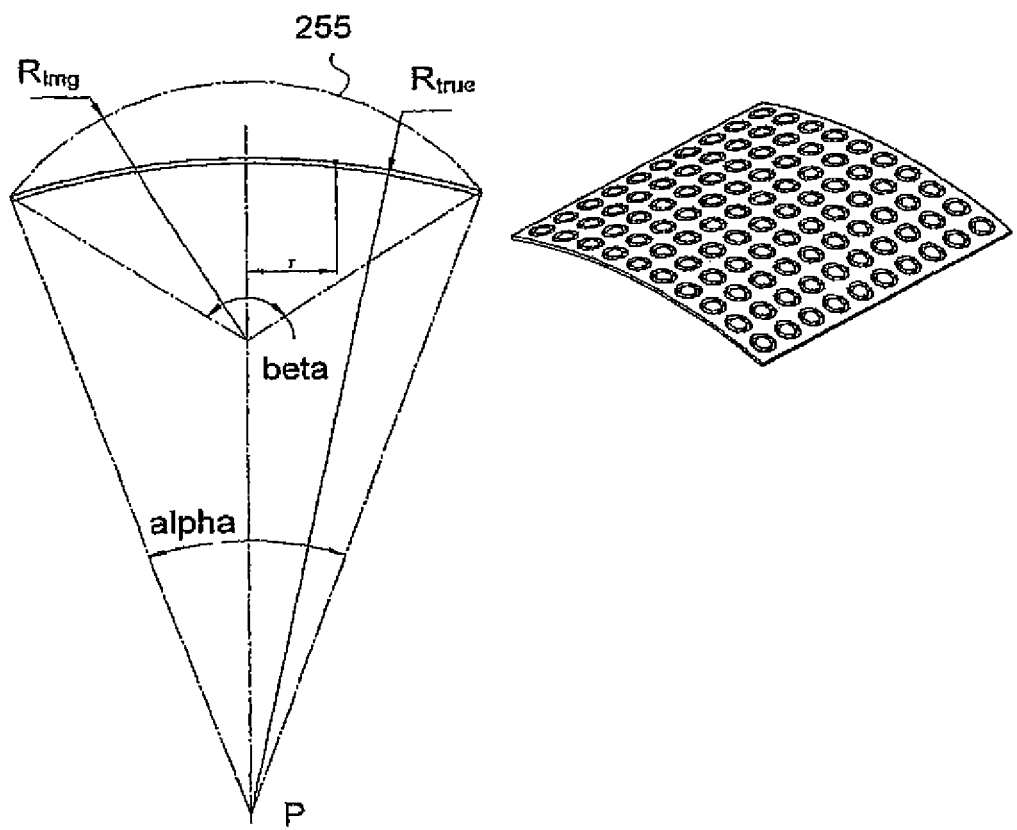
FIGS. 7A and 7B are cross-sectional and isometric illustrations, respectively, of an array of moving elements having a cylindrical segment configuration which may be used, in conjunction with a suitable temporal schedule for moving element operation, to generate a cylindrical synthetic directivity pattern having a radius which differs from the radius of the cylindrical segment.
Figure 8:
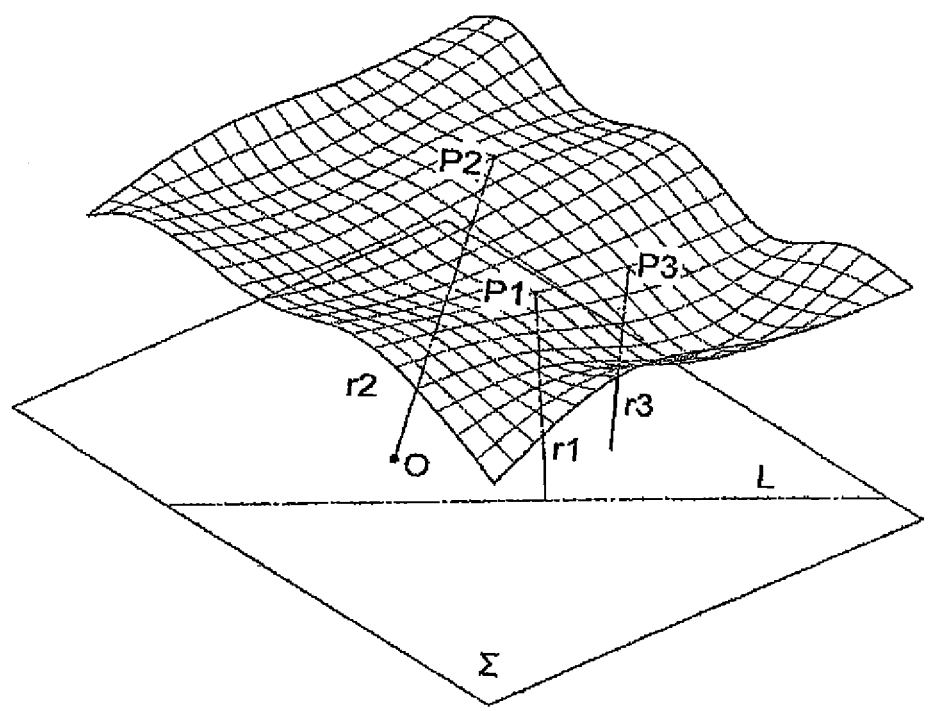
FIG. 8 is an isometric illustration of an array of moving elements having an arbitrary configuration which may be used, in conjunction with a suitable temporal schedule for moving element operation, to generate a variety of directivity patterns which differ from the natural directivity pattern of the array.

Reference is now made to FIGS. 6-8 which illustrate examples of methods for using delay patterns for staggered activation of the moving elements, thereby to achieve a particular, synthetic, directivity pattern, such as an omni-directional (spherical), cylindrical, uni-directional (beam) or poly-directional (plurality of beams) pattern, which differs from the directivity pattern naturally produced by regular speaker apparatuses being used to generate sound. This latter directivity pattern is referred to herein as the "natural" directivity pattern of the speaker apparatus. As described above, the natural directivity pattern of speaker apparatus provided in accordance with certain embodiments of the present invention typically depends on the geometrical configuration of the array of moving elements. In the example of FIG. 6, a synthetic directivity pattern comprising an omni-directionalomni-directional pattern with radius $R_{img}$, is achieved using speaker apparatus whose natural directivity pattern comprises an omni-directional pattern with radius $R_{true}$. In the example of FIGS. 7A-7B, a synthetic directivity pattern comprising a cylindrical pattern with radius $R_{img}$, is achieved using speaker apparatus whose natural directivity pattern comprises a cylindrical pattern with radius $R_{true}$.

Specifically, FIG. 6 relates to an array 2500 having a spherical segment configuration of radius $R_{true}$ having a cross-sectional coverage angle α, that corresponds to a spherical coverage angle $$\Omega_{true} = 2\pi \sin^2 \frac{\alpha}{4} \left(2 - \sin^2 \frac{\alpha}{4}\right).$$

To provide a synthetic spherical pattern having a radius $R_{img}$ and a cross-sectional coverage angle $$\beta = 4\arcsin\left(\frac{R_{true}}{R_{img}} \sin \frac{\alpha}{4}\right)$$

which corresponds to spherical coverage angle $$\Omega_{img} = 2\pi \sin^2 \frac{\beta}{4} \left(2 - \sin^2 \frac{\beta}{4}\right),$$

a timing pattern may be used by the latching mechanism associated with the array 2500, which introduces delays such that each pressure-producing element (also termed herein "moving element") 2510 arrives at its, say, upper extreme position with a delay, as computed below, relative to an arbitrary temporal reference point. As shown, the delay assigned to each pressure producing element 2510 typically depends on the distance r between that element and the axis of symmetry 2520 of the entire array 2500 of pressure producing elements. In particular, the delay assigned to an individual pressure producing element whose distance from the axis of symmetry is r, may be as follows:

$$\text{delay} = \frac{\sqrt{\left(R_{img} - R_{true} + \sqrt{R_{true}^2 - r^2}\right)^2 + r^2}}{c},$$

where r=distance between the symmetry axis passing the focal point P and the individual pressure-producing element, c=the speed of sound through the medium in which the speaker is operating, radius $R_{true}$ is the true (hardware) radius of the spherical surface, and $R_{img}$ is the imaged radius of the synthetic spherical pattern.

If $R_{img}=R_{true}$, the required delay vs. r distribution is $$\text{delay} = \frac{\sqrt{\left(R_{true} - R_{true} + \sqrt{R_{true}^2 - r^2}\right)^2 + r^2}}{c} = \frac{R_{true}}{c} = const$$

which means that no temporal staggering of the motion of the moving elements is required.

FIGS. 7A and 7B are cross-sectional and isometric illustrations, respectively, of an array having a cylindrical segment configuration of radius $R_{true}$, a cross-sectional coverage angle α, and an synthetic directivity pattern with cross-section coverage angle β. Typically, the latching mechanism introduces a suitable (positive or zero) delay for each individual pressure-producing element, using the formula:

$$\text{delay} = \frac{\sqrt{\left(R_{img} - R_{true} + \sqrt{R_{true}^2 - r^2}\right)^2 + r^2}}{c},$$

where r=distance between the symmetry plane and the individual pressure-producing element, c=the speed of sound through the medium in which the speaker is operating, radius $R_{true}$ is the true (hardware) radius of the cylindrical surface and $R_{img}$ is the imaged radius of the synthetic cylindrical surface. It is appreciated that if it is desired to achieve $R_{img}=R_{true}$, the required delay vs. r distribution is $$\text{delay} = \frac{\sqrt{\left(R_{true} - R_{true} + \sqrt{R_{true}^2 - r^2}\right)^2 + r^2}}{c} = \frac{R_{true}}{c} = const$$

which means that all moving elements may move synchronously. If the imaged coverage angle of the synthetic cylindrical pattern is β and the true coverage angle is α the imaged pattern radius is $$R_{img} = R_{true} \frac{\sin(\alpha/4)}{\sin(\beta/4)}$$

while the required delay vs. r distribution is not constant as evident from the above delay equation.

Another example of using a particular array of moving elements having a natural directivity pattern, to achieve a synthetic pattern which differs from the natural directivity pattern, is when an array comprising a portion of a spherical surface, defining a symmetry axis, is used to achieve a uni-directional directivity pattern directed in parallel to the symmetry axis. According to this embodiment, a suitable delay (positive or zero) is introduced, via the latching mechanism, for each individual pressure-producing element, using the formula:

$$\text{delay} = \frac{R_{true} - \sqrt{R_{true}^2 - r^2}}{c},$$

where r=distance between the symmetry axis passing the focal point and the individual pressure-producing element, c=the speed of sound through the medium in which the speaker is operating.

Yet another example of using a particular array of moving elements having a natural directivity pattern, to achieve a synthetic pattern which differs from the natural directivity pattern, is when an array comprising a portion of a cylindrical surface defining a symmetry axis, is used to achieve a uni-directional directivity pattern directed in parallel to the symmetry axis and normally to the cylindrical surface. According to this embodiment, a suitable delay is provided for each individual one of the pressure-producing elements, using the formula:

$$\text{delay} = \frac{R_{true} - \sqrt{R_{true}^2 - r^2}}{c},$$

where r=distance between the symmetry axis and the individual pressure-producing element, c=the speed of sound through the medium in which the speaker is operating.

More generally delay formulae for each of the moving elements, as a function of the position of the moving element, may be as follows:

The following is a delay formula which may be employed when an array of moving elements of arbitrary configuration is used to obtain a synthetic spherical pattern:

$$\text{delay} = \frac{r_2}{c},$$

for each individual pressure producing element P2 at a distance r2 from the focal point O (the sphere center)

The following is a delay formula which may be employed when an array of moving elements of arbitrary configuration is used to obtain a synthetic cylindrical pattern:

$$\text{delay} = \frac{r_1}{c},$$

for an individual pressure producing element $P_2$ at a distance $r_1$ from the focal line L (the cylinder axis).

The following is a delay formula which may be employed when an array of moving to elements of arbitrary configuration is used to obtain a beam (planar wave) pattern:

$$\text{delay} = \frac{r_3}{c},$$

for an individual pressure producing element $P_2$ at a distance $r_3$ from a plane $\Sigma$ which is parallel to the planar wave front (and normal to the wave propagation direction). FIG. 8 illustrates an arbitrary array of pressure-generating elements to create any propagation pattern (spherical, cylindrical or planar/beam); each small square images a pressure-producing element. Plane $\Sigma$ is a selected one of the wave-fronts of a planar wave to be generated. The value r3 is the distance between plane $\Sigma$ and a moving element location P3.

L is the focal line (the cylinder axis) of a cylindrical wave to be generated within the brackets of implementations of the cylindrical pattern. The value r1 is the distance between this axis and a point P1 at which a pressure-producing element is disposed. O is the focus (the sphere axis) of a cylindrical wave to be generated within the brackets of implementations of the spherical pattern. The value r2 is the distance between this center and any point P2 at which a pressure-producing element is disposed.

Figure 9A:
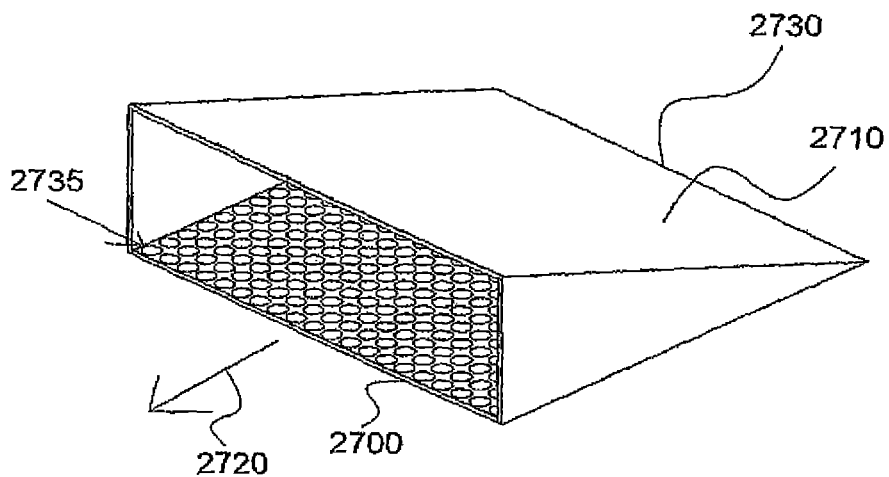
FIGS. 9A and 9B are isometric and cross-sectional illustrations, respectively, of an array of moving elements and associated waveguide, constructed and operative in accordance with a first embodiment of the present invention.
Figure 9B:
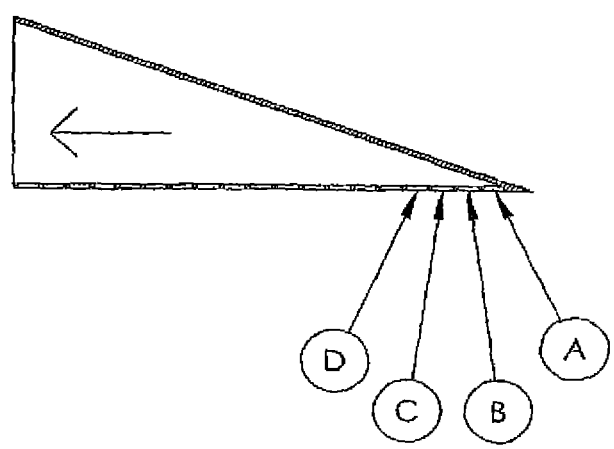

Reference is now made to FIGS. 9A and 9B which are respective isometric and cross-sectional views of speaker apparatus constructed and operative in accordance with certain embodiments of the present invention and including an array 2700 of moving elements e.g. in accordance with any of the embodiments shown and described herein, and a waveguide 2710 associated therewith intended to change the directivity of sound produced by the array 2700 of moving elements, e.g. because the geometry of the application mandates a particular orientation for the array, resulting in a natural directivity which does not happen to comply with the requirements of the application. For example, in cellular telephones it may be desired to provide a planar array arranged parallel to the flat front surface of the phone, however, it may be desired to provide a beam of sound emanating from the side of the phone. The particular waveguide 2710 illustrated in FIGS. 9A-9B is intended to provide a beam of uni-directional sound directed in a direction indicated by arrow 2720. As shown, the waveguide 2710 plane intersects array 2700 thereby to define a waveguide-array intersection axis 2730.

It is appreciated that the relatively small number of moving elements in the apparatus of FIG. 9A is shown merely for simplicity; the array 2700 may include any suitable number of moving elements such as thousands of moving elements.

Preferably, the array of moving elements includes latches associated with a latch controller as described in detail herein. However, in this embodiment, the latch controller is operative to control at least one latch so as to temporally staggering motion of individual moving elements thereby to achieve a desired directivity pattern, e.g. as indicated by arrow 2720 in the illustrated embodiment, by reducing interference between moving elements. Typically, the latch controller is operative to temporally stagger motion of individual moving elements in the array such that individual moving elements move in order of their respective distances from the waveguide-array intersection. In the illustrated embodiment, the array of moving elements includes rows A, B, C, D, . . . which are increasingly distant from the intersection axis 2730 and the latch controller may control the latches for each of these rows so as to introduce a delay $\Delta t$ between adjacent rows, starting from row A and continuing until the row 2735 most distant from the intersection axis 2730 is reached (i.e. between rows A and B, B and C, C and D, etc.). Delay $\Delta t$ typically equals d/c where d is the distance between adjacent rows and c is the velocity of sound through the medium in which the speaker is operating.

Figure 10A:
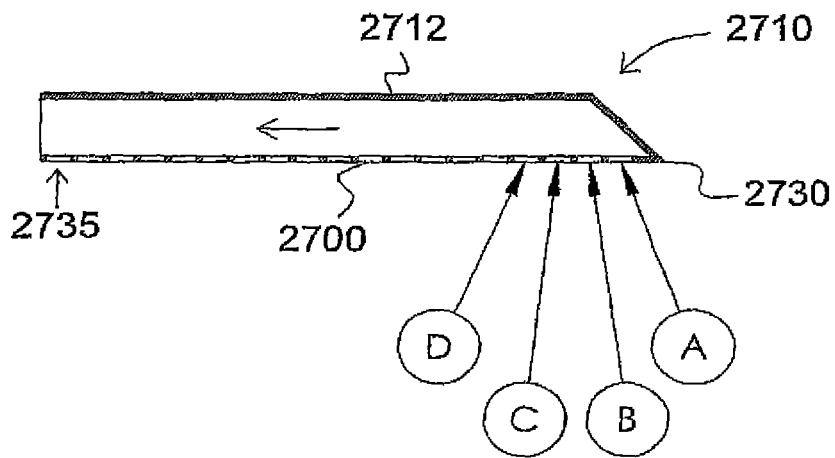
FIG. 10A is a cross-sectional illustration of an array of moving elements and associated waveguide, constructed and operative in accordance with a second embodiment of the present invention.
Figure 10B:
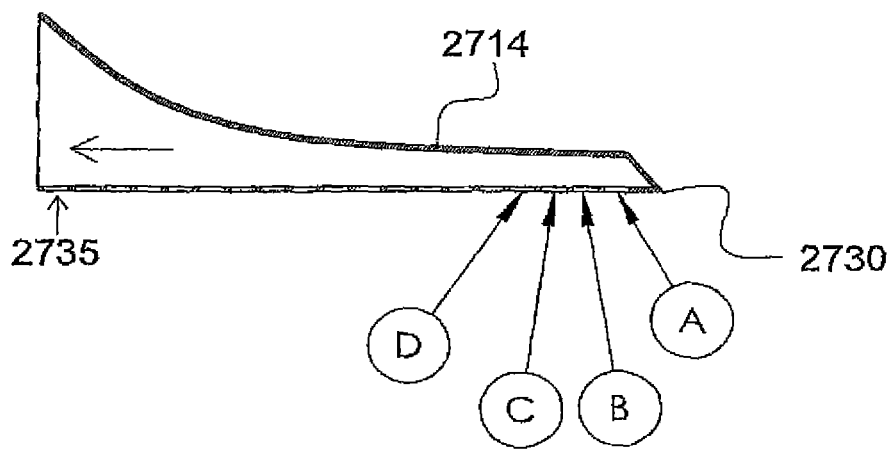
FIG. 10B is a cross-sectional illustration of an array of moving elements and associated waveguide, constructed and operative in accordance with a third embodiment of the present invention.

The waveguide may have a variety of configurations e.g. as shown in FIGS. 9B, 10A and 10B respectively. A particular advantage of the apparatus of FIG. 10A is that the main surface 2735 of the waveguide is parallel to the array 2700 thereby providing compactness.

Figure 10C:
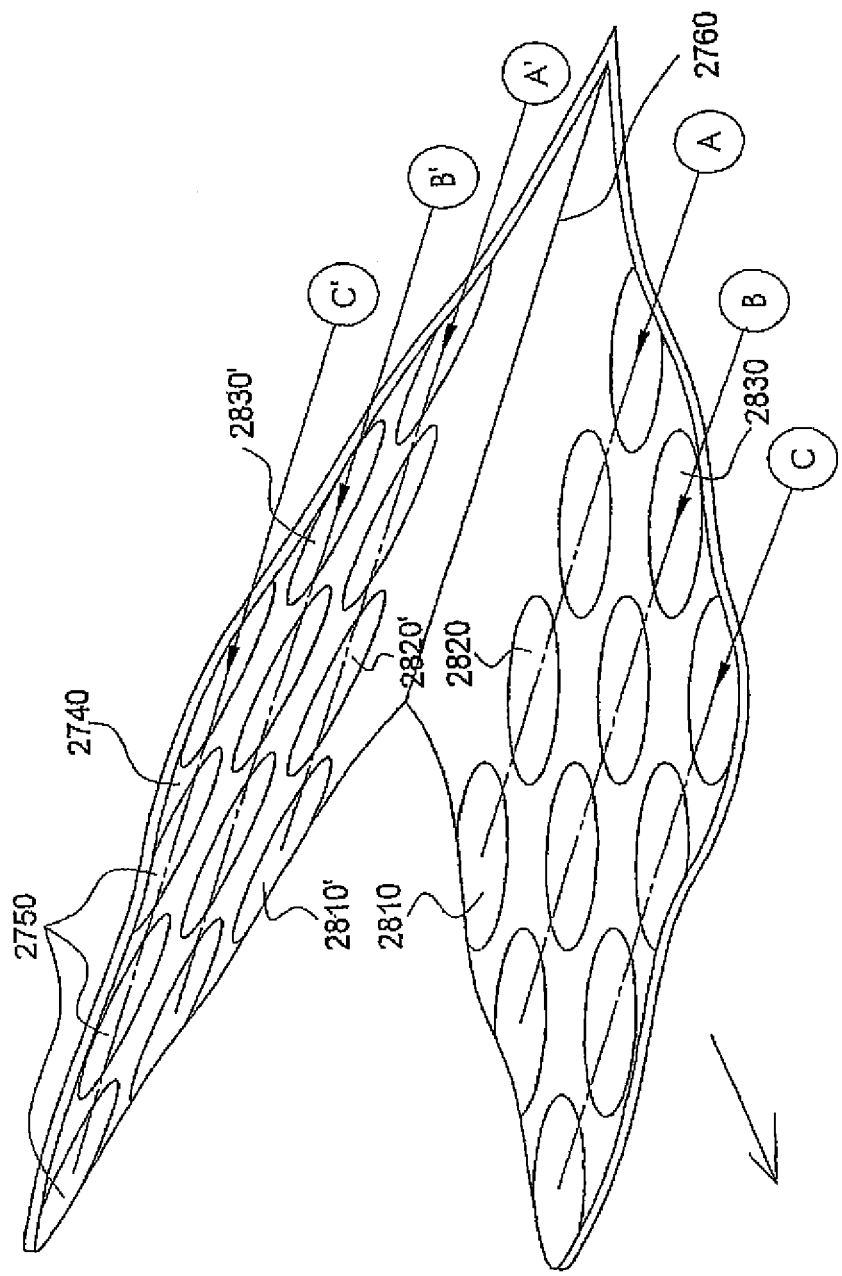
FIG. 10C is an isometric illustration of a pair of arrays of moving elements together serving also as a waveguide, constructed and operative in accordance with a fourth embodiment of the present invention.

According to one embodiment of the present invention, as shown in FIG. 10C, the waveguide may itself comprise a pair of typically intersecting arrays 2700 and 2740 of moving elements 2750 which together serve a waveguide for the waves produced by both arrays 2700 and 2740. It is appreciated that the second array of moving elements 2740 need not be planar as shown in FIG. 10C and may instead have any suitable configuration such as but not limited to those of the waveguides 2712 and 2714 of FIGS. 10A and 10B respectively. Latch control for the second array may be the same, mutatis mutandis, as for the first array; the latch controller may control the latches for each of rows A', B', C', . . . of the second array 2740 so as to introduce a delay $\Delta t$ between adjacent rows, starting from row A and continuing until the row most distant from the intersection axis 2760 is reached (i.e. between rows A' and B', B' and C', C' and D', etc.).

Figure 21:
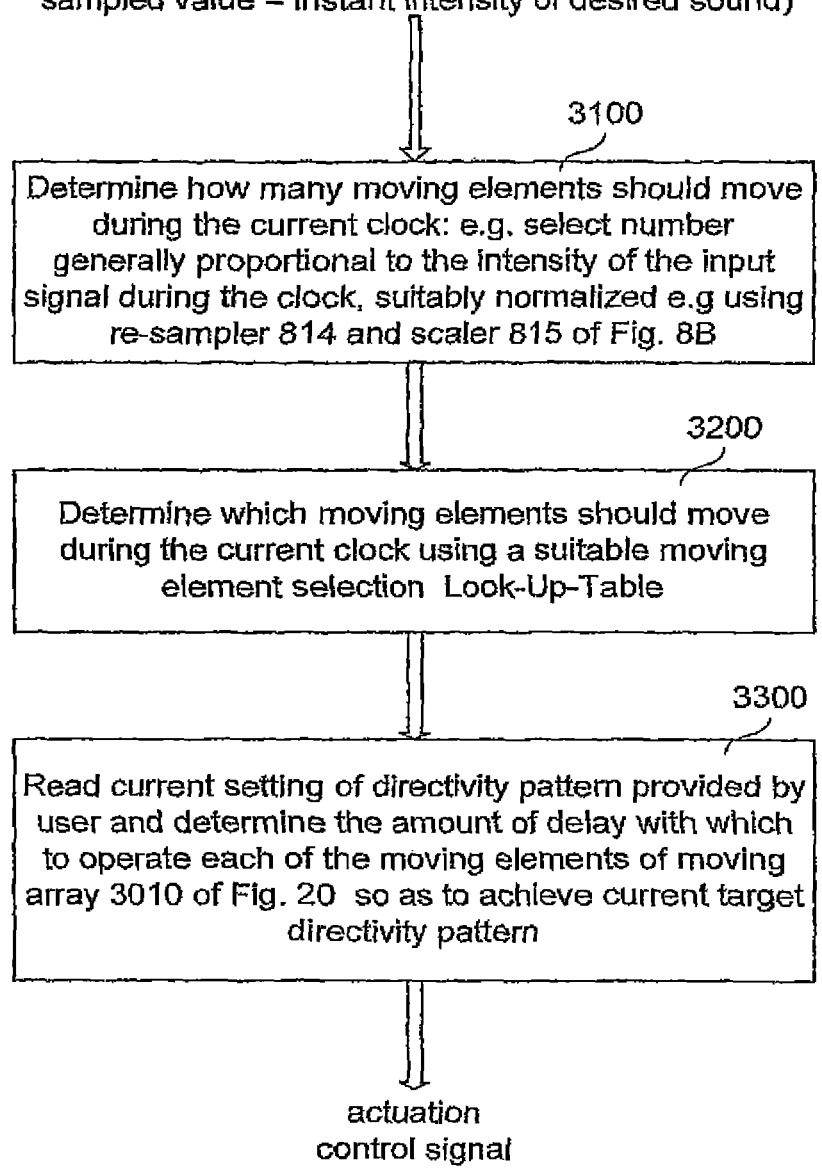
FIG. 21 is a simplified flowchart illustration of per-clock operation of the moving element constraint controller 3050 of FIG. 20, in accordance with certain embodiments of the present invention.

The method of operation of FIG. 21 is generally suitable for speaker systems whose moving element arrays are in accordance with those shown and described in FIGS. 1-10C herein. When a waveguide is provided e.g. as described herein with reference to FIGS. 9A-10C, the LUT to be used in step 3200 of FIG. 21 is typically constructed and operative to take the presence of the waveguide into account. One suitable LUT is provided in FIG. 11, for an array which includes 20×20 moving elements. The LUT is used to determine an order of operation of the moving elements in the array by assigning ordinal numbers to each moving element in the array as shown and selecting sets of moving elements to be operated in ascending order of ordinal number. Specifically in the event that the latch controller determines that N moving elements are to be moved from a first extreme latching position, e.g. the bottom position, to a second extreme latching position, e.g. top position, the selected elements are the N elements from among those currently in the bottom latching position whose respective ordinal numbers in the LUT are smallest.

In the event that the latch controller determines that M moving elements are to be moved back from a second extreme latching position to the first extreme latching position, the selected elements are similarly those M elements from among those currently in the second extreme latching position whose respective ordinal numbers in the LUT are smallest.

More specifically, operating the array typically comprises lifting operations (moving from the bottom latching position to the top latching position) and dropping operations (moving from the top latching position to the bottom latching position). In a typical example, a sequence of sets of moving elements, including N1, N2, N3 moving elements respectively as computed in step 3100 of FIG. 21, are lifted, followed by dropping operations of sets of M1, M2, M3 moving elements. In this example, assuming that the initial state of the array is such that all the moving elements are in their bottom latching position, then N1+N2+N3 must be equal or greater than M1+M2+M3 or else more elements are to be dropped than are at the top position after the lifting stages are finished.

According to certain embodiments of the present invention, the first set of moving elements to be lifted includes those moving elements numbered 1, . . . N1, the second set includes those moving elements numbered N1+1, . . .

N1+N2, the third set includes those moving elements N1+N2+1, . . . N1+N2+N3. At the end of this stage, elements numbered 1 . . . N1+N2+N3 are latched at the top latching position and the rest are latched at the bottom. The first dropping operation includes the set of moving elements numbered 1 . . . M1 (after which elements M1+1 . . . N1+N2+N3 are in their top positions and the rest are in their bottom positions), the second set includes those moving elements numbered M1+1, . . . M1+M2, the third set includes those moving elements M1+M2+1, . . . , M1+M2+ M3. At the end of this stage, elements numbered 1 . . . M1+M2+M3 are latched into their bottom latching positions, elements M1+M2+M3+1 . . . N1+N2+N3 are latched into their top positions and elements numbered N1+N2+ N3+1 and above are latched in their bottom positions.

As shown, generally, the LUT is constructed such that moving elements close to row A, the row closest to the intersection between waveguide and array, tend to be operated before moving elements which are further from row A. Also, at least for arrays of moving elements which are relatively wide compared to the wavelength associated with the system sampling rate, each set of moving elements selected for operation is selected so as to prefer moving elements close to a mid-axis 2800 bisecting the rows A, B, C, . . . or A', B', C' of FIGS. 10A-10C over moving elements which are further from the mid-axis.

It is appreciated that the moving elements in such a set may, if disposed in different rows (e.g. A, B, C of FIGS. 10A-10C), operate not synchronously but rather after delays corresponding to their respective distances from a row such as row A. If, for example, N moving elements comprising a currently operating set are disposed at lines C, D and E, the distance between adjacent lines equals d, $\Delta t = d/c$ (c being the velocity of sound in the medium in which the speaker is disposed) and the operation instruction is issued at time t, then the elements of rows C, D and E may be caused to operate at times $(t+2\times\Delta t)$, $(t+3\times\Delta t)$ and $(t+4\times\Delta t)$ respectively. Only elements disposed at line A are caused to operate immediately upon issuance of the operation instruction or, more precisely, as soon thereafter as the internal hardware and software latency allows.

A method for building a LUT for a speaker which includes a waveguide is now described. The method typically includes the following steps, performed in a suitable order such as the following:
Determine the wavelength of a sonic wave that has a frequency equal to the sampling rate (clock) of the system, using: where:

$$\lambda = \frac{f_s}{C}$$

λ—The wavelength [m] fs—Sampling rate [Hz] C—Velocity of sound [m/s]. For air at STD, C≈340 m/s Define the primary axis of the array as the axis along which the sound propagates. Determine whether the array is narrow or wide, and use either the narrow array method or the wide array method below, accordingly. For example, a suitable criterion for making this determination is that if the width, i.e. the dimension perpendicular to the primary axis, i.e. the length of rows A, B, C, . . . , of the array, is equal or smaller than λ, the "narrow array" method described hereafter may be used. Otherwise the "wide array" method may be used.

Assuming the array has N×M elements, where each column of the array (e.g. A,B,C,D of FIG. 9B) has N elements and there are M columns in total, draw a LUT of M rows and N columns e.g. as shown in FIG. 11. The first column (A) holds elements (1) . . . (N). The second column (B) elements are (N+1) . . . (2×N). The third (C) column elements are (2×N+1) . . . (3×N) etc. The last column holds elements [(M−1)×N+1] . . . (M×N). In general, the $i^{th}$ column holds elements [(i−1)×N+1] . . . [i×N]. The order of the elements within each column is determined is by either the "narrow array" or "wide array" methods described below.

Narrow Array method: In narrow arrays, the ordering of the N elements of each column is believed to be of little importance. So, in certain embodiments random ordering may be used. In another embodiment "bit-reversal" order may be used. The following example shows "bit-reversal" ordering for a case wherein N equals 8 and M equals 10:
Write number 0 . . . (N−1) in binary form:
001
010
011
100
101
110
111
Reverse the order of the bits in each row:
000
100
010
110
001
101
011
111
Convert back to decimal and add 1:
1
5
3
7
2
6
4
8
Copy and results to all the columns in the array. To the second column add 8. To the third column add 16. To the fourth column add 24 and so on and so forth. In general add (i−1)*8 to the $i^{th}$ column as shown in FIG. 12A.

Wide Array method: In one possible embodiment, the elements in each column are ordered according to their distance from the center of the column (the cell closest to N/2). In the following example, N equals 8 and M equals 10. The following steps may be performed, e.g. in the following order:
Write the number 1 in the 4th cell of the column. The rest of the numbers 2 . . . 8 are written in ascending order on both sides of the 4th cell, e.g. as shown in FIG. 12B. Copy and results to all the columns in the array. To the second column add 8. To the third column add 16. To the fourth column add 24 and so on and so forth. In general add (i−1)*8 to the ith column e.g. as shown in FIG. 12C.

The LUTs, and methods for constructed LUTs, shown and described herein, are suitable for performing step 3200 of FIG. 21 although they are not intended to be limiting. In the case of the embodiment of FIG. 10C, a separate LUT is built for each of the two arrays shown (the first array having rows A, B, C and the second array having rows A', B', C'). The LUT for the first array having rows A, B, C . . . may be as in FIG. 11 or may be constructed using the methods shown and described above. The LUT for the second array having rows A', B', C', . . . is typically such that each moving element in the second array operates simultaneously with the moving element facing it in the first array. So, for example, moving element 2810' may operate simultaneously with moving element 2810, moving element 2820' may operate simultaneously with moving element 2820, and moving element 2830' may operate simultaneously with moving element 2830.

It is appreciated that the LUTs shown and described herein are only one possible implementation of a predetermined moving element selection criterion. Alternatively, any other suitable implementation of a particular moving element selection criterion, such as but not limited to those described herein or implied from the context of the LUTs described herein may be employed, such as an algorithmic implementation.

According to certain embodiments of the present invention, and unexpectedly, the amplitude of the moving elements used in any of the systems shown and described herein, may be much less, e.g. an order of magnitude less, than that predicted by conventional acoustic formulae. Specifically, the conventional formula for computing pressure produced by a vibrating piston in an infinite baffle is:

$$P = \frac{\sqrt{2} \cdot \pi \cdot \rho \cdot S \cdot \varepsilon \cdot f_s^2}{2 \cdot R_0} \quad (1)$$

Where:
P—The pressure produced by the piston [Pascal]
$\rho$—The medium density (for air, $\rho$=1.2 at ATP) [KG/m3]
S—The piston surface area [m2]
$\varepsilon$—The motion amplitude (peak to peak) of the piston [m]
$f_s$—The oscillation frequency [Hz]
$R_0$—The distance from the source [m]

If an array of moving elements, each including a piston, is provided, the total pressure produced equals to the sum of the pressures produced by all the elements. If they are all identical then the maximal pressure producible by the array is:

$$P_T = P \cdot N \quad (2)$$

Where:
$P_T$—The total pressure produced by the array [Pascal]
N—The number of elements in the array Typically, in the speaker apparatus shown and described herein, less than all the elements are working all the time. To compute the pressure produced at a frequency different from the sampling rate, the following equation may be used:

$$P_f = P_T \cdot \frac{f}{f_s} \quad (3)$$

To compute the SPL (Sound Pressure Level), the following formula may be used:

$$SPL = 20 \cdot \log_{10}\left(\frac{P_T}{P_0}\right) \quad (4)$$

Where:
SPL—The sound pressure level [dBSPL]
$P_0$—The reference 0 dB pressure [Pascal]—typically 20 μPa Three examples of application-specific speakers are described herein. Example 1 employs the following parameters:
d—The moving element diameter is 450μ
$\varepsilon$—The moving element peak-to-peak amplitude is 150μ
$f_s$—The operating sampling frequency is 32000 Hz
f—The speaker is assumed to work in a telecom application where the bandwidth is 300 Hz-3.5 KHz. The SPL of the array of moving elements increases with frequency so if sufficient loudness is assured at the lowest frequency of interest, adequate SPL at the entire working bandwidth is guaranteed. Hence, in this example f is 300 Hz
N—The number of elements in the array is 1000
$R_0$—The reference distance is 1 m Hence, the area of each element is:

$$S = \pi \cdot \left(\frac{d}{2}\right)^2 = \pi \cdot \left(\frac{450 \cdot 10^{-6}}{2}\right)^2 = 1.59 \cdot 10^{-7}_{m^2}$$

The pressure produced by each element is:

$$P = \frac{\sqrt{2} \cdot \pi \cdot 1.2 \cdot 1.59 \cdot 10^{-7} \cdot 150 \cdot 10^{-6} \cdot 32000^2}{2 \cdot 1} = 0.065_{Pa} \quad (1)$$

The total pressure of the array is therefore:

$$P_T = 0.065 \cdot 1000 = 65 P_a \quad (2)$$

The pressure produced at the lowest frequency of interest is therefore:

$$P_f = 65 \cdot \frac{300}{32000} = 0.61_{Pa} \quad (3)$$

And the SPL is therefore:

$$SPL = 20 \cdot \log_{10}\left(\frac{0.61}{20 \cdot 10^{-6}}\right) = 89.6_{dB_{SPL}} \quad (4)$$

This matches the design criteria for this speaker which was 90 dB

An experiment was performed to investigate these parameter values. Moving elements with the following parameters were constructed:
d—The moving element diameter is 450μ
$\varepsilon$—The moving element peak-to-peak amplitude is 100μ
$f_s$—The operating sampling frequency is 32000 Hz
$R_0$—The reference distance is 1 m The expected pressure of these elements was:

$$P = \frac{\sqrt{2} \cdot \pi \cdot 1.2 \cdot 1.59 \cdot 10^{-7} \cdot 100 \cdot 10^{-6} \cdot 32000^2}{2 \cdot 1} = 0.043_{Pa} \quad (1)$$

However, measurements of these elements in the course of the experiment indicated that in fact, they produced pressure levels of 0.4 Pa-0.5 Pa or about 10 times the expected pressure. In view of the unexpectedly increased SPL, it was possible to reduce the amplitude ∈ to 10% of its original value or 10μ. Repeated measurements showed pressure levels of 0.04 Pa-0.05 Pa which are suitable for the target application.

When a moving element and an electrode, provided in accordance with certain embodiments of the present invention, are latched by applying voltage, termed herein "latching voltage", therebetween, the latching force may gradually decrease e.g. due to charge trapping effects. In order to maintain effective latching, the latching voltage is typically gradually increased over time so as to maintain a desired level of latching force.

The electrode layer may be coated with a thin layer of dielectric (insulator), e.g. Silicon Nitride or Sapphire. The negative pole of a power supply may be connected to the moving element and the positive pole to the electrode. Voltage is then applied to charge the two elements. Typically, when the moving element and the electrode are in close proximity, the strength of the electrostatic field between their surfaces is so strong it rips (ionizes) the molecules trapped in the small air gaps between those surfaces. The released electrons accelerate towards the positive electrode. They hit the dielectric material at velocities and energy levels sufficiently high such that some of them penetrate and sink into the dielectric material. Due to the non-conducting nature of the dielectric material, the penetrating electrons become trapped in the dielectric, masking some of the positive charge of the electrode with their own negative charge, thus reducing the attracting latching force between the electrode and the moving element. This process may be difficult to reverse as dielectrics, being insulators, do not allow electrons to travel freely through them. This problem may be avoided by reversing the polarity of the applied voltage such that the positive pole is connected to the moving element and the negative to the electrode. The accelerated electrons then impinge upon the moving element and not the dielectric and since the moving element is conductive (or coated with a conductor) the excess charge can be easily dissipated and absorbed by the power supply.

It is appreciated that the dielectric layer may be applied to the surface of the moving element rather than to that of the electrode, in which case the positive pole of the voltage is connected to the electrode and the negative to the moving element.

There are also techniques known in the art that can overcome charge trapping. One example is coating the dielectric layer with a thin conductive layer. This layer dissipates the charge applied by impacting electrons. Since this conductor is in contact with the moving element, it short cuts the excess electrons to the moving element.

The technical field of the invention includes that of a digital transducer array of long-stroke electromechanical micro actuators constructed using fabrication materials and techniques to produce low cost devices for a wide variety of applications, such as audio speakers, biomedical dispensing applications, medical and industrial sensing systems, optical switching, light reflection for display systems and any other application that requires or can derive benefit from longer-travel actuation and/or the displacement of greater volumes of fluid e.g. air or liquid relative to the transducer size.

Certain embodiments of the present invention seeks to provide a transducer structure, a digital control mechanism and various fabrication techniques to create transducer arrays with a number, N, of micro actuators. The array is typically constructed out of a structure of typically three primary layers which in certain embodiments would comprise of a membrane layer fabricated out of a material of particular low-fatigue properties that has typically been layered on both sides with particular polar aligned magnetic coatings and etched with a number, N, of unique "serpentine like" shapes, so as to enable portions of the membrane bidirectional linear freedom of movement (the actuator). The bidirectional linear travel of each moving section of the membrane is confined within a chamber (actuator channels) naturally formed typically by sandwiching the membrane layer between two mirror image support structures constructed out of dielectric, Silicon, Polymer or any other like insulating substrate, are typically fabricated with N precisely sized through holes equal in number to the N serpentine etchings of the membrane and typically precisely positioned in a pattern which precisely aligns each through hole with each serpentine etching of the membrane. Further affixed to the outer surfaces of both the top and bottom layers of the support structure are, typically, conductive overhanging surfaces such as conductive rings or discs ("addressable electrodes"), which serve to attract and hold each actuator as it reaches its end of stroke typically by applying electrostatic charge.

A device constructed and operative in accordance with certain embodiments of the present invention is now described.

Figure 14:
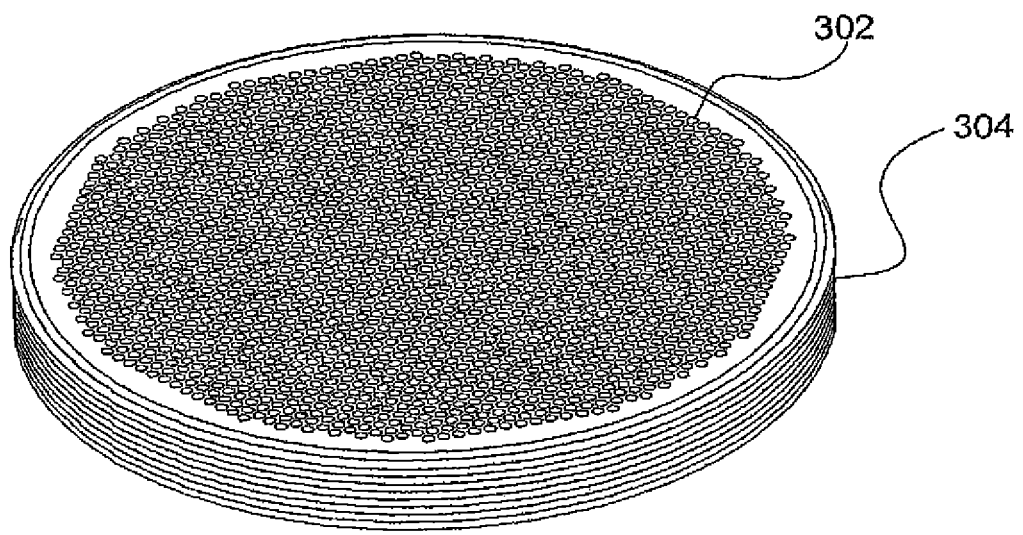
FIG. 14 is an isometric view of a skewed array of moving elements each constrained to travel alternately back and forth along a respective axis in response to an alternating electromagnetic force applied to the array of moving elements by a coil wrapped around the array.

FIG. 14 is a perspective view of one suitable embodiment of the present invention.

Figure 15:
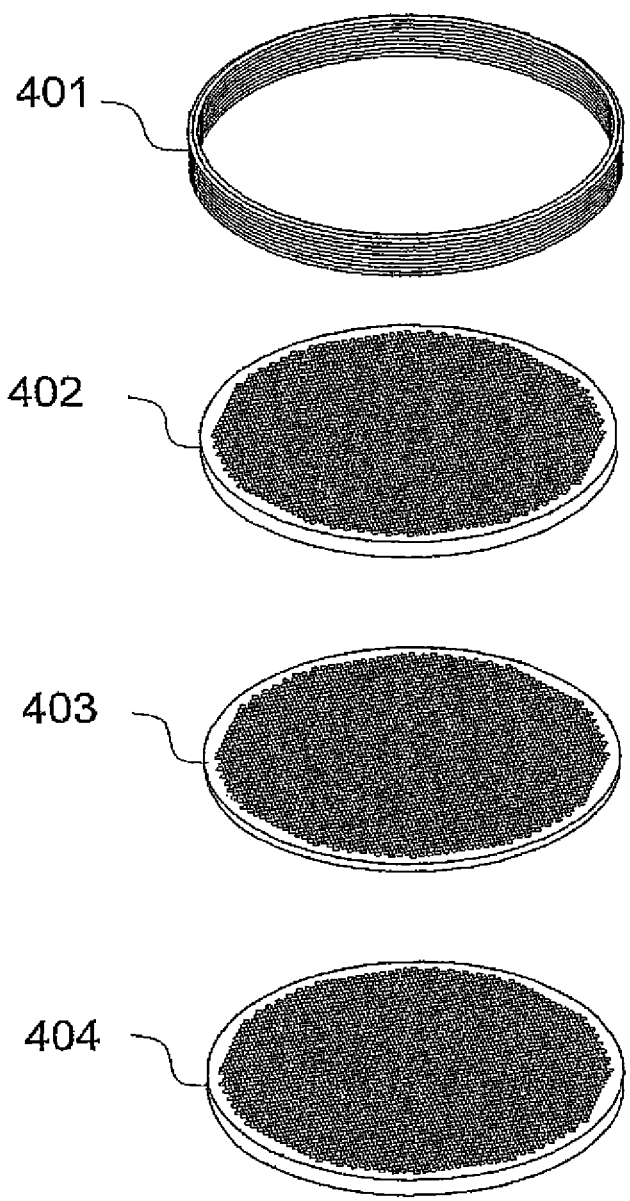
FIG. 15 is an exploded view of an actuator device including an array of moving elements each constrained to travel alternately back and forth along a respective axis in response to an alternating electromagnetic force applied to the array of moving elements by a coil, and a latch, formed as a layer, operative to selectively latch at least one subset of the moving elements in at least one latching position thereby to prevent the individual moving elements from responding to the electromagnetic force.

FIG. 15 is an exploded view of a device constructed and operative in accordance with certain embodiments of the present invention.

Figure 16:
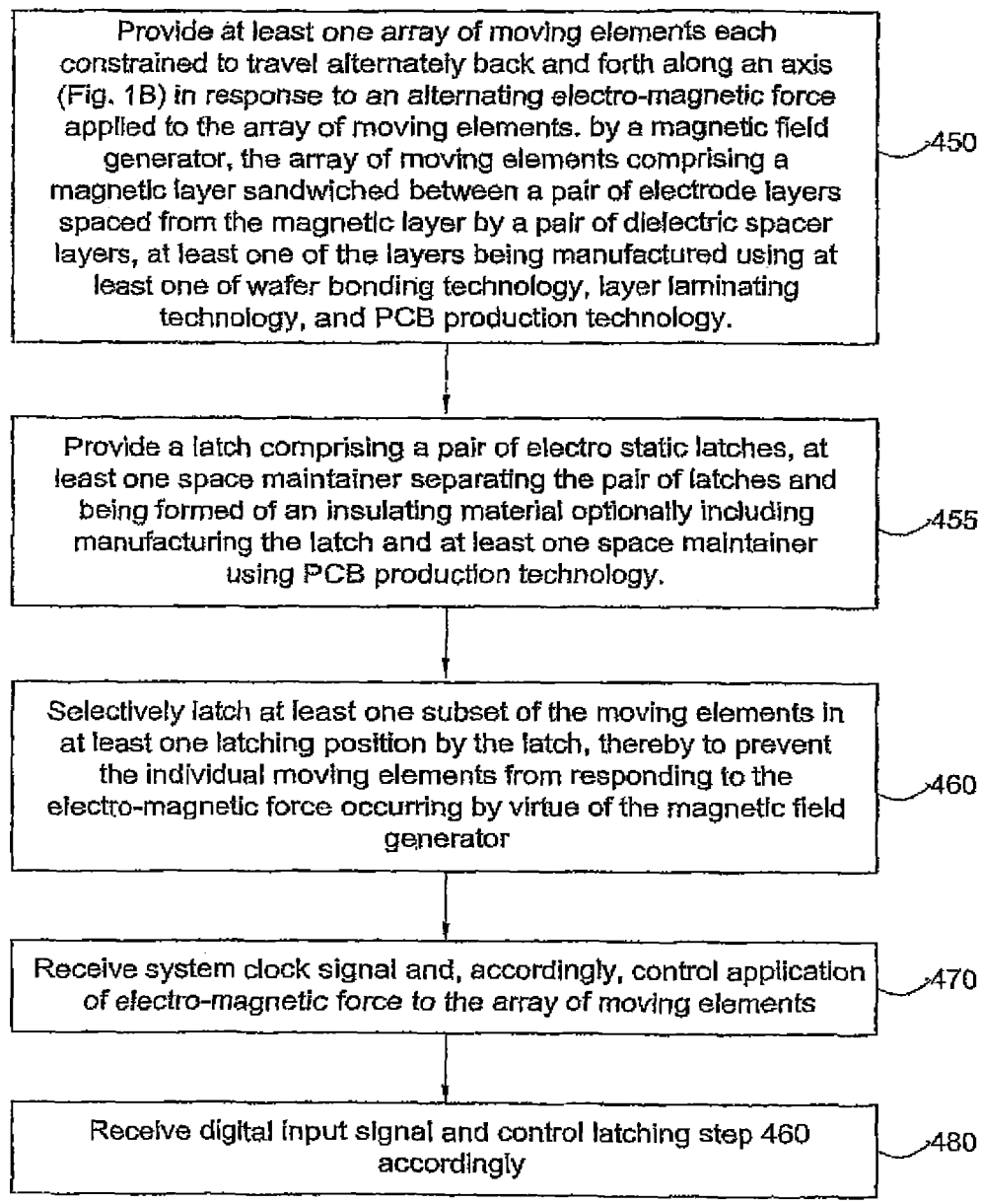
FIG. 16 is a simplified flowchart illustration of a suitable actuation method operative in accordance with certain embodiments of the present invention.

FIG. 16 is a simplified flowchart illustration of a suitable actuation method operative in accordance with certain embodiments of the present invention.

Figure 17A:
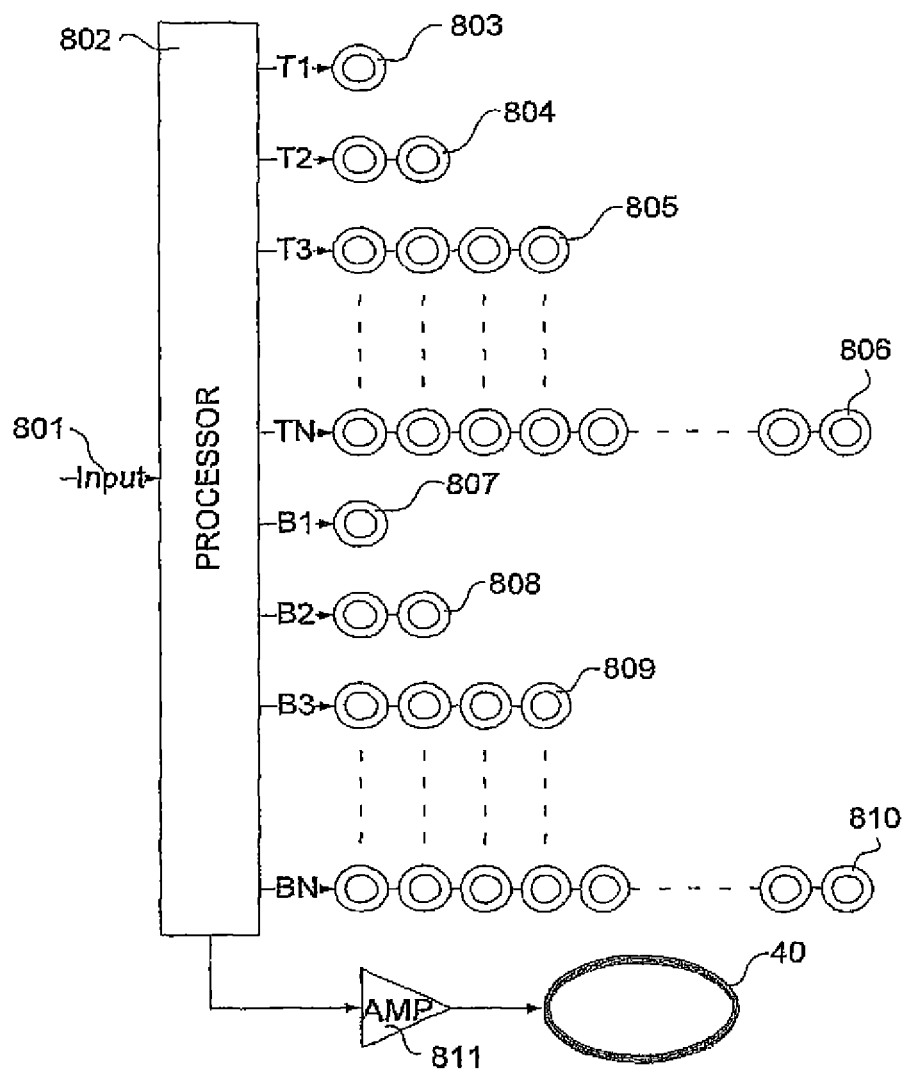
FIG. 17A is a control diagram illustrating control of the latches and of the coil-induced electromagnetic force for a particular example in which the moving elements are arranged in groups that can each, selectively, be actuated collectively, wherein each latch in the latching layer is associated with a permanent magnet, and wherein the poles of all of the permanent magnets in the latching layer are all identically disposed.
Figure 17B:
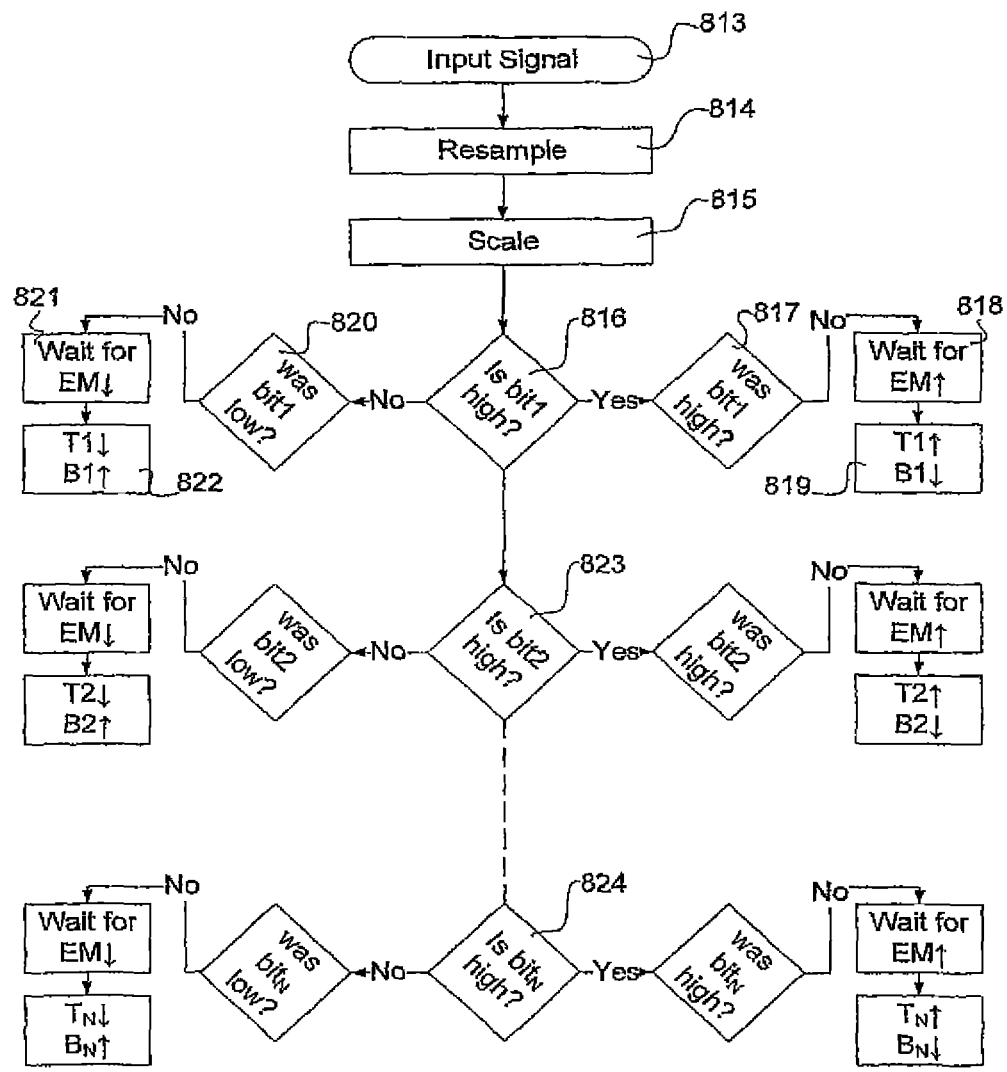
FIG. 17B is a flowchart illustrating a suitable method whereby a latching controller may process an incoming input signal and control moving elements' latches accordingly, in groups.

FIG. 17A is a block diagram of a speaker system constructed and operative in accordance with certain embodiments of the present invention. FIG. 17B is a flow diagram of the speaker system constructed and operative in accordance with certain embodiments of the present invention.

Figure 18A:
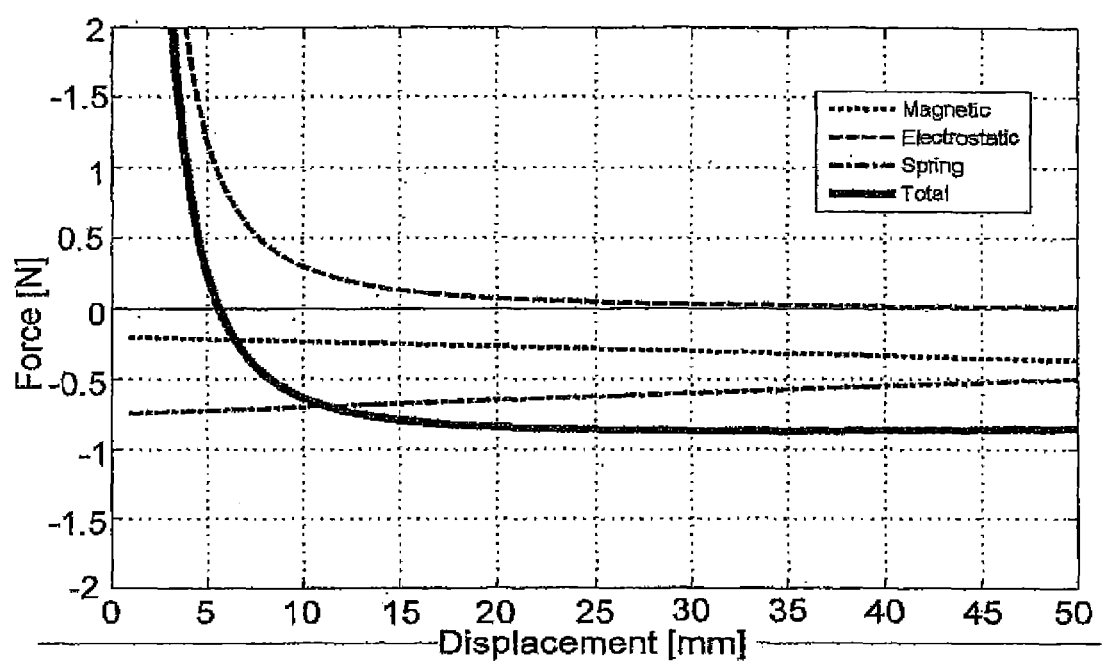
FIG. 18A is a graph summarizing certain, although typically not all, of the forces brought to bear on moving elements in accordance with certain embodiments of the present invention.

FIG. 18A illustrates a suitable relationship between the different forces applied to the moving elements.

Figure 19:
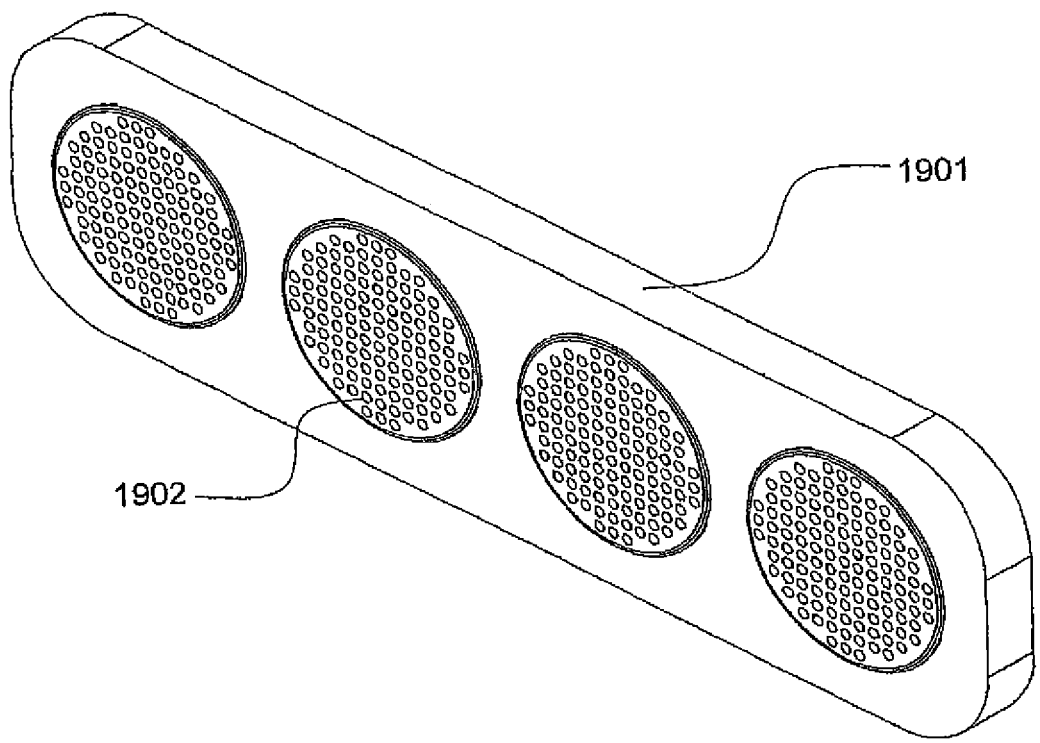
FIG. 19 is an isometric array of actuators supported within a support frame providing an active area which is the sum of the active areas of the individual actuator arrays.

Whereas FIG. 14 illustrates an array of elements in a honeycomb construction constructed and operative in accordance with certain embodiments of the present invention, FIG. 19 illustrates an apparatus using a plurality (array) of devices.

Effective addressing is typically achieved through unique patterns of interconnects between select electrodes and unique signal processing algorithms which typically effectively segments the total number of actuators in a single transducer, into N addressable actuator groups of different sizes, beginning with a group of one actuator followed by a group of double the number of actuators of its previous group, until all N actuators in the transducer have been so grouped.

To attain actuator strokes the transducer is typically encompassed with a wire coil, which, when electrical current is applied, creates an electromagnetic field across the entire transducer. The electromagnetic field causes the moving part of the membrane to move typically in a linear fashion through the actuator channels. If the current alternates its polarity, it causes the moving part of the membrane to vibrate. When electrostatic charge is applied to particular addressable electrode groups, it will typically cause all actuators in that group to lock at the end of the stroke, either on top or bottom of the support structure in accordance with the application requirement. Collectively the displacement provided by the transducer is achieved from the sum total of the N actuators that are not locked at any particular interval (super position).

The transducer construction is typically fully scalable in the number of actuators per transducer, the size of each actuator, and the length of stroke of each actuator, and the number of addressable actuator groups. In certain embodiments, the actuator elements may be constructed by etching various shapes into a particular material, or by using layered metallic disks that have been coated with a flexible material or by using free floating actuator elements The membrane (flexure) materials may include Silicon, Beryllium Copper, Copper Tungsten alloys, Copper Titanium alloys, stainless steel or any other low fatigue material. The addressable electrodes of the support structure may be grouped in any pattern as to attain addressing as appropriate for the transducer application. The addressable electrodes may be affixed such that contact is created with the membrane actuator or in such a manner that there is no physical contact with the membrane. The substrate material may be of any insulating material such as FR4, silicon, silicon dioxide, ceramic or any variety of plastics. In some embodiments the material may contain ferrite particles. The number of serpentine shapes etched into the membrane, or floating actuator elements may vary and the corresponding channels of the support structure may be round, square or any other shape. The electromagnetic field may be created by winding a coil around the entire transducer, around sections of the transducer or around each actuator element or by placing one or more coils placed next to one or more actuator elements.

In certain embodiments a direct digital method is used to produce sound using an array of micro-speakers. Digital sound reconstruction typically involves the summation of discrete acoustic pulses of pressure to produce sound-waves. These pulses may be based on a digital signal coming from audio electronics or digital media in which each signal bit controls a group of micro-speakers.

In one suitable embodiment of the current invention, the $n^{th}$ bit of the incoming digital signal controls $2^n$ micro-speakers in the array, where the most significant bit (MSB) controls about half of the micro-speakers and the least significant bit (LSB) controls at least a single micro-speaker. When the signal for a particular bit is high, all of the speakers in the group assigned to the bit are typically activated for that sample interval. The number of speakers in the array and the pulse frequency determine the resolution of the resulting sound-wave. In a typical embodiment, the pulse frequency may be the source-sampling rate. Through the post application of an acoustic low-pass filter from the human ear or other source, the listener typically hears an acoustically smoother signal identical to the original analog waveform represented by the digital signal.

According to the sound reconstruction method described herein, the generated sound pressure is proportional to the number of operating speakers. Different frequencies are produced by varying the number of speaker pulses over time. Unlike analog speakers, individual micro-speakers typically operate in a non-linear region to maximize dynamic range while still being able to produce low frequency sounds. The net linearity of the array typically results from linearity of the acoustic wave equation and uniformity between individual speakers. The total number of non-linear components in the generated sound wave is typically inversely related to the number of micro-speakers in the device.

In certain embodiments a digital transducer array is employed to implement true, direct digital sound reconstruction. The produced sound's dynamic range is proportional to the number of micro-speakers in the array. The maximal sound pressure is proportional to the stroke of each micro-speaker. It is therefore desirable to generate long stroke transducers and to use as many as possible. Several digital transducer array devices have been developed over the years. One worth mentioning is a CMOS-MEMS micro-speaker developed at Carnegie Mellon University. Using CMOS fabrication process, they designed an 8-bit digital speaker chip with 255 square micro-speakers, each micro-speaker 216 μm on a side. The membrane is composed of a serpentine Al—SiO2 mesh coated with polymer and can be electrostatically actuated by applying a varying electrical potential between the CMOS metal stack and silicon substrate. The resulting out of plane motion is the source of pressure waves that produce sound. Each membrane has a stroke of about 10 μm. Such short strokes are insufficient and the generated sound levels are too soft for a loudspeaker. Another issue is that the device requires a driving voltage of 40V. Such voltage requires complex and expensive switching electronics. Suitable embodiments of the device described herein overcome some or all of these limitations and generate much louder sound levels while eliminating the need for high switching voltages.

It is believed that the shape of each transducer has no significant effect on the acoustic performance of the speaker. Transducers may be packed in square, triangle or hexagonal grids, inter alia.

The current invention typically makes use of a combination of magnetic and electrostatic forces to allow sufficiently long stroke while avoiding the problems associated with traditional magnetic or electrostatic actuators.

The moving elements of the transducer array are typically made to conduct electricity and may be magnetized so that the magnetic poles are perpendicular to the transducer array surface. Moderate conduction is sufficient. A coil surrounds the entire transducer array or is placed next to each element and generates the actuation force. Applying alternating current or alternating current pulses to the coil creates an alternating magnetic field gradient that forces all the moving elements to move up and down at the same frequency as the alternating current. To control each moving element, two electrodes may be employed, one above and one below the moving elements.

The current applied to the coil typically drives the moving elements into close proximity with the top and bottom electrode in turn. A small electrostatic charge is applied to the moving elements. Applying an opposite charge to one of the electrodes generates an attracting force between the moving element and the electrode. When the moving element is very close to the electrode, the attracting force typically becomes larger than the force generated by the coil magnetic field and the retracting spring and the moving element is latched to the electrode. Removing the charge or some of it from the electrode typically allows the moving element to move along with all the other moving elements, under the influence of the coil magnetic field and the flexures.

In accordance with certain embodiments, the actuator array may be manufactured from 5 plates or layers:
Top electrode layer
Top spacers (together shown as layer 402)
Moving elements 403
Bottom spacers
Bottom electrode layer (together shown as layer 404)

In accordance with certain embodiments, the array is surrounded by a large coil 401. The diameter of this coil is typically much larger than that of traditional coils used in prior art magnetic actuators. The coil can be manufactured using conventional production methods.

In certain embodiments the moving element is made of a conductive and magnetic material. Moderate electrical conduction is typically sufficient. The moving element may be manufactured using many types of materials, including but not limited to rubber, silicon, or metals and their alloys. If the material cannot be magnetized or a stronger magnet is desired, a magnet may be attached to it or it may be coated with magnetic material. This coating is typically done by application, using a screen printing process or other techniques known in the art, by epoxy or another resin loaded with magnetic powder. In some embodiments, screen printing can be performed using a resin mask created through a photo-lithographic process. This layer is typically removed after curing the resin/magnetic powder matrix. In certain embodiments the epoxy or resin is cured while the device is subjected to a strong magnetic field, orienting the powder particles in the resin matrix to the desired direction. The geometry of the moving elements can vary. In yet other embodiments, part of the moving elements may be coated with the magnet and cured with a magnetic field oriented in one direction while the rest are coated later and cured in an opposite magnetic field causing the elements to move in opposite directions under the same external magnetic field. In one suitable embodiment, the moving element comprises a plate that has a serpentine shape surrounding it, typically cut out from thin foil. Alternatively, in certain embodiments it is possible to use a thick material thinned only in the flexure area or by bonding relatively thick plates to a thin layer patterned as flexures. This shape allows part of the foil to move while the serpentine shape serves as a compliant flexure. In certain other embodiments, the moving part is a cylinder or a sphere, free to move about between the top and bottom electrodes.

Referring again to FIGS. 14 and 15, in certain embodiments a coil 304 wrapped around the entire transducer array generates an electromagnetic field across the entire array structure, so that when current is applied, the electromagnetic field causes the pistons 302 to move up and down. FIG. 15 shows an exploded view of the device constructed and operative in accordance with certain embodiments of the invention. As shown, the exploded view of a transducer array structure reveals that it typically comprises the following:

(a) A coil surrounding the entire transducer array 401 generates an electromagnetic field across the entire array structure when voltage is applied to it. One possible embodiment for the coil is described herein with reference to FIGS. 18B-18D.

(b) In certain embodiments a top layer construction 402 may comprise a spacer layer and electrode layer. In a certain embodiment this layer may comprise a printed circuit board (herein after "PCB") layer with an array of accurately spaced cavities each typically having an electrode ring affixed at the top of each cavity.

(c) The moving elements ("pistons") 403 in the current embodiment may be comprised of a thin foil of conductive magnetized material cut or etched with many very accurate plates typically surrounded by "serpentine" shapes that serve as compliant flexures that impart the foils with a specific measure of freedom of movement.

(d) A bottom layer construction 404 may comprise a spacer layer and electrode layer. In a certain embodiment this layer may comprise a dielectric layer with an array of accurately spaced cavities each typically having an electrode ring affixed at the bottom of each cavity.

Reference is again made to FIGS. 17A-17B. FIG. 17A shows a block diagram of the speaker system in accordance with certain embodiments of the present invention. In certain embodiments the digital input signal (common protocols are I2S, I2C or SPDIF) 801 enters into a logic processor 802 which in turn translates the signal to define the latching mechanism of each grouping of moving elements. Group addressing is typically separated into two primary groups, one for latching the moving elements at the top, and one for latching the moving elements at the bottom of their strokes. Each group is typically then further separated into logical addressing groups typically starting with a group of at least one moving element, followed by another group that doubles the moving elements of the previous group, followed by a another group which again doubles the number of elements of the previous, and so on, until all moving elements of the entire array have been grouped. The Nth group comprises $2^{N-1}$ moving elements.

In the embodiment depicted in the block diagram of FIG. 17A, the top group of one element group 803, a two element group 804 and then a four element group 805 are shown and so on, until the total numbers of moving elements in the transducer array assembly have been addressed to receive a control signal from the processor 802.

The same grouping pattern is typically replicated for the bottom latching mechanisms where a one element group 807 may be followed by a two element group 808 and then a four element group 809 and so on, until the total numbers of moving elements in the transducer array assembly have been addressed to receive a control signal from the processor 802.

The processor 802 may also control an alternating current flow to the coil that surrounds the entire transducer array 812, thus creating and controlling the magnetic field across the entire array. In certain embodiments a power amplifier 811 may be used to boost current to the coil.

FIG. 17B illustrates a flow diagram of the speaker system. In certain embodiments where the sampling rate of the digital input signal 813 might be different from the device natural sampling rate, the resampling module 814 may re-sample the signal, so that it matches the device's sampling-rate. Otherwise, the resampling module 814 passes the signal through as unmodified. The scaling module 815 typically adds a bias level to the signal and scales it, assuming the incoming signal 813 resolution is M bits per sample, and the sample values X range between $-2^{(M-1)}$ and $2^{(M-1)}-1$.

It is also assumed that in certain embodiments the speaker array has N element groups (numbered 1 ... N), as described in FIG. 17A.

K is defined to be: K=N−M

Typically, if the input resolution is higher than the number of groups in the speaker (M>N), K is negative and the input signal is scaled down. If the input resolution is lower than the number of groups in the speaker (M<N), K is positive and the input signal is scaled up. If they are equal, the input signal is not scaled, only biased. The output Y of the scaling module 815 may be: $Y=2^{K}[X+2^{M-1}]$. The output Y is rounded to the nearest integer. The value of Y now ranges between 0 and 2N−1.

The bits comprising the binary value of Y are inspected. Each bit controls a different group of moving elements. The least significant bit (bit1) controls the smallest group (group 1). The next bit (bit2) controls a group twice as big (group 2). The next bit (bit3) controls a group twice as big as group 2 etc. The most significant bit (bitN) controls the largest group (group N). The states of all the bits comprising Y are typically inspected simultaneously by blocks 816, 823, . . . 824.

The bits are handled in a similar manner. Following is a suitable method for inspecting bit1:

Block 816 checks bit1 (least significant bit) of Y. If it is high, it is compared to its previous state 817. If bit1 was high previously, there is no need to change the position of the moving elements in group 1. If it was low before this, the processor waits for the magnetic field to point upwards, as indicated by reference numeral 818 and then, as indicated by reference numeral 819, the processor typically releases the bottom latching mechanism B1, while engaging the top latching mechanism T1, allowing the moving elements in group 1 to move from the bottom to the top of the device. If block 816 determines that bit1 of Y is low, it is compared to its previous state 820. If bit1 was low previously, there is no need to change the position of the moving elements in group 1. If its previous state was high, the processor waits for the magnetic field to point downwards, as indicated by reference numeral 821 and then, as indicated by reference numeral 822, the processor releases the top latching mechanism T1 while engaging the top latching mechanism B1, allowing the moving elements in group 1 to move from the top to the bottom of the device.

Referring again to FIG. 18A, typical relationships between the different major forces applied to moving elements are shown. The different forces being applied to the moving elements typically work in harmony to counterbalance each other in order to achieve the desired function. Forces toward the center are shown as negative forces, while forces driving the element further away from the center (either toward the up or down latching mechanisms) are shown as positive forces.

In the present embodiment the moving element is influenced by 3 major forces:

a. Magnetic force, created by the interaction of the magnetic field and the hard magnet. The direction of this force depends on the polarity of the moving element magnet, the direction of the magnetic field and the magnetic field gradient.

b. Electrostatic force, typically created by applying a certain charge to the electrode and an opposite charge to the moving element. The direction of this force is such as to attract the moving element to the electrode (defined as positive in this figure). This force increases significantly when the distance between the moving element and the electrode becomes very small, and/or where this gap comprises material with a high dielectric constant.

c. Retracting force created by the flexures, (which act as springs). The direction of this force is always towards the center of the device (defined as negative in this figure). This force is relatively small since the flexures are compliant, and is linear in nature.

The relationship between the forces shows that typically, as the moving element increasingly nears the end of its stroke, the electrostatic force (generated by the latching mechanism) increases, ultimately achieving sufficient force to attract and latch the moving element. When the latch is released, the retracting and magnetic forces are typically able to pull the moving element away from the latch toward the center, thereby inducing travel of the moving element. As the moving element travels to the center, typically, the retracting force of the flexure diminishes and ultimately is overcome, and is then controlled by the electromagnetic force and the kinetic energy of the moving element.

FIG. 19 shows an apparatus including a plurality (array) of devices. The structure shows the use of plurality in certain embodiments of array transducers 1902 as to create a device 1901 capable of generating louder sound pressure levels or use beam-forming techniques (which extend beyond the scope of this invention) to create directional sound waves.

The array may have any desired shape, and the round shapes in the description are only for illustrative purposes.

Figure 13:
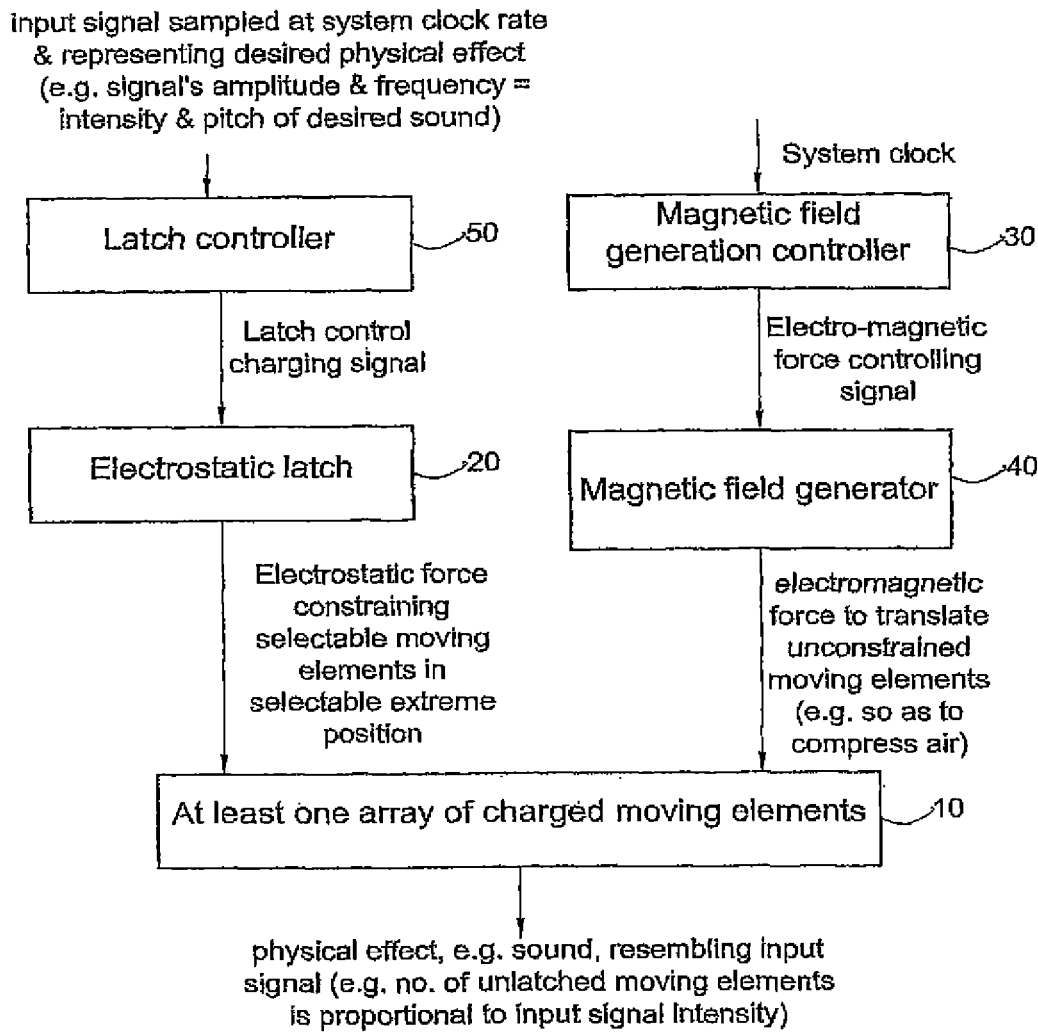
FIG. 13 is a simplified functional block diagram illustration of actuator apparatus constructed and operative in accordance with certain embodiments of the present invention.

The device constructed and operative in accordance with one embodiment of the present invention and described above with reference to FIGS. 14, 15, 17A-17B, and 19 inter alia, is now described both more generally, e.g. with reference to FIG. 13, and in further detail. Alternative embodiments are also described. Referring now to FIG. 13 which is a simplified functional block diagram illustration of actuator apparatus for generating a physical effect, it is appreciated that at least one attribute of the physical effect corresponds to at least one characteristic of a digital input signal sampled periodically in accordance with a clock. According to certain embodiments of the present invention, the apparatus of FIG. 13 comprises at least one actuator device, each actuating device including an array 10 of moving elements each typically constrained to travel alternately back and forth along a respective axis in response to an alternating electromagnetic force applied to the array 10 of moving elements. Each moving element is constructed and operative to be responsive to electromagnetic force. Each moving element may therefore comprise a conductor, may be formed of a ferro magnetic material, may comprise a permanent magnet and may comprise a current-bearing coil.

A latch 20 is operative to selectively latch at least one subset of the moving elements 10 in at least one latching position thereby to prevent the individual moving elements 10 from responding to the electromagnetic force. An electromagnetic field controller 30 is operative to receive the clock and, accordingly, to control application of the electromagnetic force by a magnetic field generator, 40, to the array of moving elements. A latch controller 50 is operative to receive the digital input signal and to control the latch accordingly. The latch controller 50, in at least one mode of latch control operation, is operative to set the number of moving elements 10 which oscillate freely responsive to the electromagnetic force applied by the magnetic field generator, e.g. coil 40 to be substantially proportional to the intensity of the sound, coded into the digital input signal it receives. Preferably, when the intensity of sound coded into the digital input signal is at a positive local maximum, all moving elements are latched into a first extreme position. When the intensity of sound coded into the digital input signal is at a negative local maximum, all moving elements are latched into a second, opposing, extreme position.

Preferably, a physical effect, e.g. sound, resembling the input signal is achieved by matching the number of moving elements in an extreme position e.g. a top position as described herein, to the digital sample value, typically after resampling and scaling as described in detail below. For example, if the digital sample value is currently 10, 10 moving elements termed herein ME1, . . . ME10 may be in their top positions. If the digital sample value then changes to 13, three additional moving elements termed herein ME11, ME12 and ME13 may be raised to their top position to reflect this. If the next sample value is still 13, no moving elements need be put into motion to reflect this. If the digital sample value then changes to 16, 3 different moving elements (since ME11, ME12 and ME13 are already in their top positions), termed herein M14, M15 and M16, may be raised to their top positions to reflect this.

In some embodiments, as described in detail below, moving elements are constructed and operative to be operated collectively in groups, such as a set of groups whose number of moving elements are all sequential powers of two, such as 31 moving elements constructed to be operated in groups having 1, 2, 4, 8, 16 moving elements, respectively, each. In this case, and using the above example, when the sample value is, say, 10, the two groups including 8 and 2 moving elements respectively are both, say, up i.e. all moving elements in them are in their top positions. When the sample value changes to 13, however, it is typically impractical to directly shift 3 moving elements from their bottom positions to their top positions since in this example, due to the binary grouping, this can only be done by raising the two groups including 1 and 2 moving elements respectively, however, the group including 2 moving elements is already raised. But the number of top pixels may be otherwise matched to the sample value, 13: Since 13=8+4+1, the two groups including 4 and 1 pixels may be raised, and the group including 2 pixels may be lowered, generating a net pressure change of +3, thereby to generate a sound resembling the input signal as desired, typically after resampling and scaling.

More generally, moving elements translated toward a first extreme position such as upward generate pressure in a first direction termed herein positive pressure. Moving elements translated toward the opposite extreme position such as downward generate pressure in the opposite direction termed herein negative pressure. A certain amount of positive or negative pressure may be obtained either by translating the appropriate number of moving elements in the corresponding direction, or by translating n moving elements in the corresponding direction and others, m in number, in the opposite direction, such that the difference n-m corresponds to e.g. equals the sampled signal value, typically after resampling and scaling.

The moving elements are typically formed of a material which is at least moderately electrically conductive such as silicon or silicon coated by a metal such as gold.

If the moving elements comprise permanent magnets, the permanent magnets are typically magnetized during production such that the magnetic poles are co-linear to the desired axes of motion. A coil that typically surrounds the entire transducer array generates the actuation force. To control each moving element, two latch elements (typically comprising electro static latches or "electrodes") are typically used, e.g. one above and one below the moving elements.

According to one embodiment, the actuator is a speaker and the array of moving elements 10 is disposed within a fluid medium. The controllers 30 and 50 are then operative to define at least one attribute of the sound to correspond to at least one characteristic of the digital input signal. The sound has at least one wavelength thereby to define a shortest wavelength present in the sound and each moving element 10 typically defines a cross section which is perpendicular to the moving element's axis and which defines a largest dimension thereof, the largest dimension of each cross-section typically being small relative to, e.g. an order of magnitude smaller than, the shortest wavelength.

Referring again to FIGS. 14-15, FIG. 14 is an isometric view of a skewed array of moving elements 10 each constrained to travel alternately back and forth along a respective axis in response to an alternating electromagnetic force applied to the array of moving elements 10 e.g. by a coil 40 wrapped around the array as shown. FIG. 15 is an exploded view of a layered actuator device including an array of moving elements 403 each constrained to travel alternately back and forth along a respective axis in response to an alternating electromagnetic force applied to the array of moving elements 403 by a coil 401, and a latch, formed as at least one layer, operative to selectively latch at least one subset of the moving elements 403 in at least one latching position thereby to prevent the individual moving elements 403 from responding to the electromagnetic force. Typically, the electromagnetic force is generated using a coil 401 that surrounds the array 403 as shown.

The latch typically comprises a pair of layers: a top latch layer 402 and bottom latch layer 404 which, when charged, and when the moving elements are in an appropriate electromagnetic field as described herein, latch the moving elements into top and bottom extreme positions respectively. Each of the latch layers 402 and 404 typically comprises an electrode layer and spacer layer. The spacer layers 402 and 404 may generally be formed from any suitable dielectric material. Optionally, ferrite or ferro-magnetic particles may be added to the dielectric material to decrease undesirable interaction between the magnets in the magnet layer.

FIG. 16 is a simplified flowchart illustration of a suitable actuation method operative in accordance with certain embodiments of the present invention. In FIG. 16, a physical effect is generated, at least one attribute of which corresponds to at least one characteristic of a digital input signal sampled periodically in accordance with a system clock signal. As shown, the method typically comprises (step 450) providing at least one array of moving elements 10 each constrained to travel alternately back and forth along an axis in response to an alternating electromagnetic force applied to the array of moving elements 10 e.g. by magnetic field generator 40. In step 460, at least one subset of the moving elements 10 is selectively latched in at least one latching position by a latch 20 thereby to prevent the individual moving elements 10 from responding to the electromagnetic force applied by magnetic field generator 40. In step 470, the system clock signal is received and, accordingly, application of the electromagnetic force to the array of moving elements is controlled. In step 480, the digital input signal is received, and the latching step 460 is controlled accordingly. Typically, as described above, the latch 20 comprises a pair of layers, each layer comprising an array of electrostatic latch elements and at least one space maintainer layer separates the electrostatic latch layers and is formed of an insulating material. Typically, the latch and at least one space maintainer are manufactured using PCB production technology (FIG. 16, step 450). The array of moving elements typically comprises a magnetic layer 403 sandwiched between a pair of electrode layers spaced from the magnetic layer by a pair of dielectric spacer layers. Typically, at least one of the layers is manufactured using wafer bonding technology, layer laminating technology, and/or PCB production technology and/or combination of these technologies (FIG. 16, step 455).

Referring again to FIGS. 17A-17B, FIG. 17A is a control diagram illustrating control of latch 20 by latch controller 50 of FIG. 13 and of the typically coil-induced electromagnetic force, by controller 30 of FIG. 13, for a particular example in which the moving elements 10 are arranged in groups G1, G2, . . . GN that can each, selectably, be actuated collectively, wherein each latch in the latching layer is typically associated with a permanent magnet, and wherein the poles of all of the permanent magnets in the latching layer are all identically disposed. The latch typically comprises, for each group or each moving element in each group, a top latch and a bottom latch. The top and bottom latches for group Gk (k=1, . . . , N) are termed Tk and Bk respectively. In FIG. 17A the two controllers are both implemented in processor 802.

FIG. 17B is a flowchart illustrating a suitable method whereby latching controller 50 of FIG. 13 may process an incoming input signal 801 and control latches 20 of moving elements 10 accordingly, in groups. The abbreviation "EM" indicates electromagnetic force applied upward or downward, depending on the direction of the associated arrow, to a relevant group of moving elements. In the embodiment illustrated in FIG. 17B, if at time t, the LSB of the re-sealed PCM signal is 1 (step 816), this indicates that the speaker elements in group G1 may be in the selected end-position. If (step 817) group G1 is already in the selected end-position, no further action is required, however if the group G1 is not yet in the selected end-position, the latching controller 50 waits (step 818) for the electromagnetic field to be upward and then (step 819) releases the bottom latches in set B1 and engages the top latches in set T1. This is also the case, mutatis mutandis, for all other groups G2, . . . GN.

In FIG. 17B, the notation Tk or Bk followed by an upward pointing or downward pointing arrow indicates latching or releasing (upward or downward arrow respectively) of the top or bottom (T or B respectively) latch of the k'th group of moving elements.

Figure 17C:
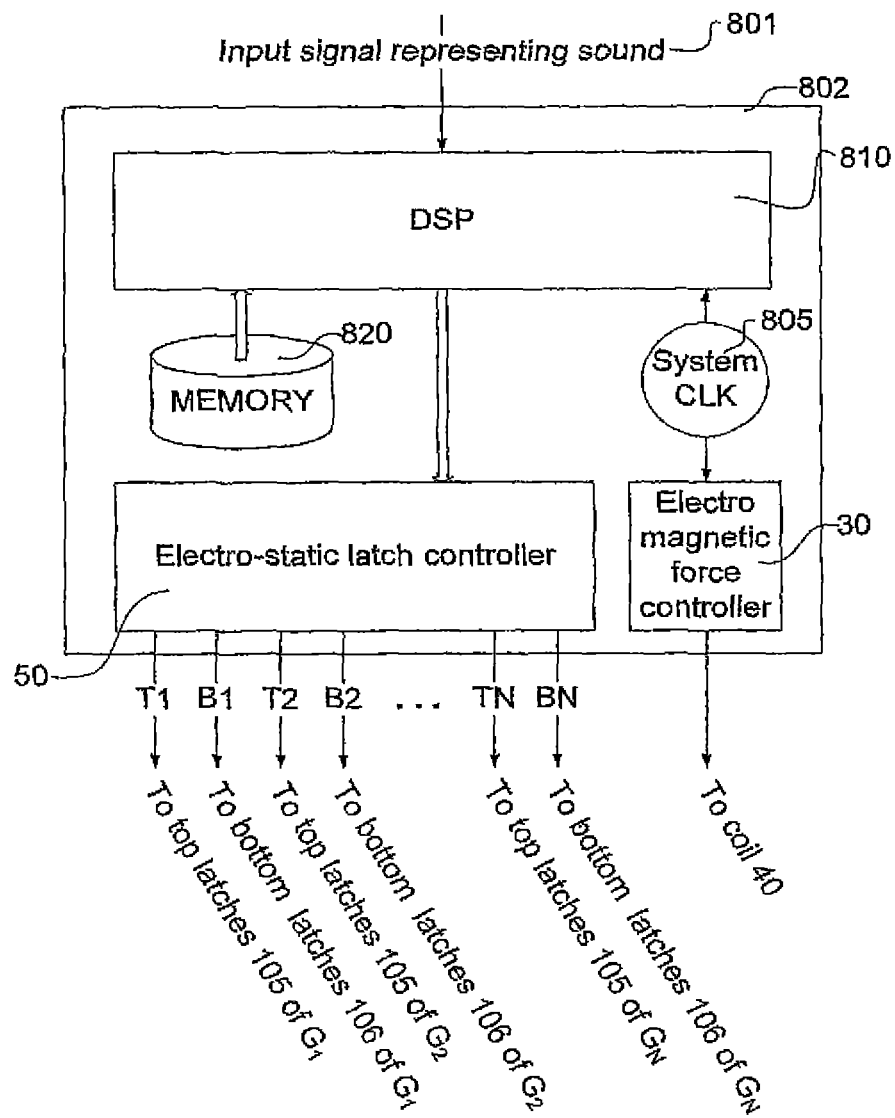
FIG. 17C is a simplified functional block diagram illustration of a processor, such as the processor 802 of FIG. 17A, which is useful in controlling substantially any of the actuator devices with electrostatic latch mechanisms shown and described herein.

FIG. 17C is a simplified functional block diagram illustration of a processor, such as the processor 802 of FIG. 17A, which is useful in controlling substantially any of the actuator devices with electro-static latch mechanisms shown and described herein. A single processor, in the embodiment of FIG. 17C, implements both electromagnetic field controller 30 and latch controller 50. The electromagnetic field controller 30 typically receives the system clock 805 which is typically a square wave and generates a sine wave with the same frequency and phase, providing this to the coil 40 as an actuating signal. The DSP 810 may for example comprise a suitably programmed TI 6000 digital signal processor commercially available from Texas Instruments. The program for the DSP 810 may reside in a suitable memory chip 820 such as a flash memory. The latch controller 50, in at least one mode of latch control operation, is operative to set the number of moving elements which oscillate freely responsive to the electromagnetic force applied by the coil 40 to be substantially proportional to the intensity sound coded in the digital input signal.

The electromagnetic field controller 30 typically controls an alternating current flow to the coil 40 that typically surrounds the entire array of moving elements 10, thus creating and controlling the magnetic field across the entire array. In certain embodiments a power amplifier 811 may be used to boost current to the coil 40. The electromagnetic field controller 30 typically generates an alternating electromagnetic force whose alternation is synchronous with the system clock 805.

The latch controller 50 is operative to receive the digital input signal 801 and to control the latching mechanism 20 accordingly. Typically, each individual moving element 10 performs at most one transition per clock i.e. during one given clock, each moving element may move from its bottom position to its top position, or move from its top position to its bottom position, or remain at one of either of those two positions. According to certain embodiments of the present invention, retention of moving elements 10 in their appropriate end positions is affected by the latching controller 50.

Preferably, the latching controller 50 operates on the moving elements in groups, termed herein "controlled groups". All moving elements in any given group of moving elements are selectably either latched into their top positions, or into their bottom positions, or are unlatched. Preferably, the "controlled groups" form a sequence G1, G2, . . . and the number of speaker elements in each controlled group Gk is an integer, such as 2, to the power of (k−1), thereby allowing any desired number of speaker elements to be operated upon (latched upward, downward or not at all) since any given number can be expressed as a sum of powers of, for example, two or ten or another suitable integer. If the total number of speaker elements is selected to be one less than an integral power (N) of 2 such as 2047, it is possible to partition the total population of speaker elements into an integral number of controlled groups namely N. For example, if there are 2047 speaker elements, the number of controlled groups in the sequence G1, G2, . . . is 11.

In this embodiment, since any individual value of the re-scaled PCM signal can be represented as a sum of integral powers of 2, a suitable number of speaker elements can always be placed in the selected end-position by collectively bringing all members of suitable controlled groups into that end-position. For example, if at time t the value of the re-scaled PCM signal is 100, then since 100=64+32+4, groups G3, G6 and G7 together include exactly 100 speaker elements and therefore, at the time t, all members of these three groups are collectively brought to the selected end position such as the "up" or "top" position and, at the same time, all members of all groups other than these three groups are collectively brought to the un-selected end position such as the "down" or "bottom" position. It is appreciated that each moving element has bottom and top latches, each typically generated by selectively applying suitable local electrostatic forces, associated therewith to latch it into its "down" and "up" positions respectively. The set of bottom and top latches of the speaker elements in group Gk are termed Bk and Tk latches respectively.

Figure 17D:
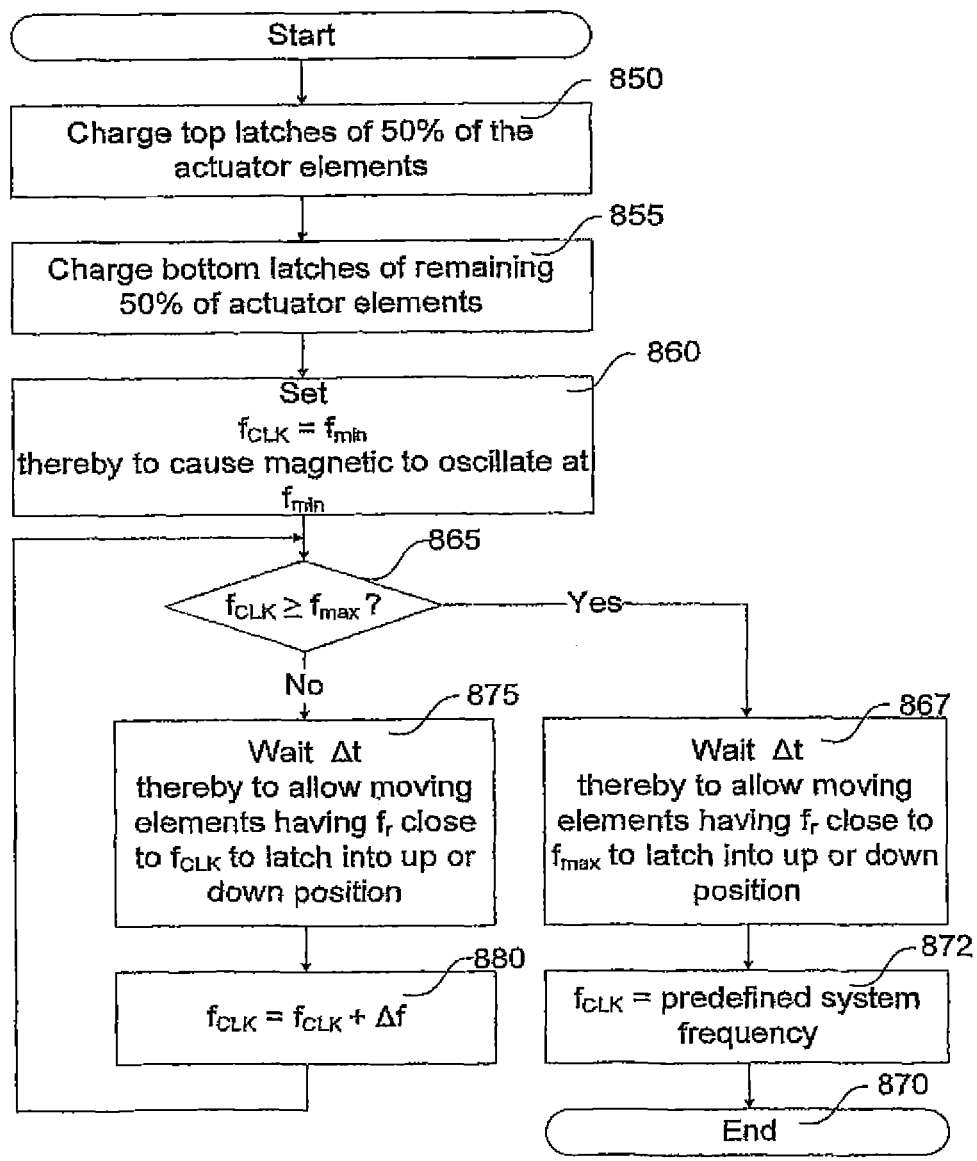
FIG. 17D is a simplified flowchart illustration of a suitable method for initializing the apparatus of FIGS. 13-17C.

FIG. 17D is a simplified flowchart illustration of a suitable method for initializing the apparatus of FIGS. 13-17C. According to the method of FIG. 17D, the array of moving elements 10 is put into initial motion including bringing each moving element 10 in the array of moving elements into at least one latching position. As described herein, both top and bottom latching positions are typically provided for each moving element 10 in which case the step of bringing each moving element in the array into at least one latching position typically comprises bringing a first subset of the moving elements in the array into their top latching positions and a second subset, comprising all remaining elements in the array, into their bottom latching positions. The first and second subsets are preferably selected such that when the moving elements in the first and second subsets are in their top and bottom latching positions respectively, the total pressure produced by fluid such as air displaced by the moving elements 10 in the first subset is equal in magnitude and opposite in direction to the total pressure produced by fluid such as air displaced by the moving elements in the second subset.

The moving elements 10 typically bear a charge having a predetermined polarity and each of the moving elements defines an individual natural resonance frequency which tends to differ slightly from that of other moving elements due to production tolerances, thereby to define a natural resonance frequency range, such as 42-46 KHz, for the array of moving elements. As described herein, typically, first and second electrostatic latching elements are provided which are operative to latch the moving elements 10 into the top and bottom latching positions respectively and the step of putting the array of moving elements into motion comprises (FIG. 17D):

Step 850: Charge the first (top or bottom) electrostatic latch of each moving element included in the first subset with a polarity opposite to the pole, on the moving element, facing that latch. The first and second subsets may each comprise 50% of the total number of moving elements.

Step 855: Charge the second (bottom or top) electrostatic latch of each moving element included in the second subset with a polarity opposite to the pole, on the moving element, facing that latch.

Step 860: As described above, the moving elements are designed to have a certain natural resonance frequency, $f_r$. Design tools may include computer aided modeling tools such as finite elements analysis (FEA) software. In step 860, $f_{CLK}$, the frequency of the system clock, which determines the timing of the alternation of the electromagnetic field in which the moving elements are disposed, is set to the natural resonance frequency of the moving element in the array which has the lowest natural resonance frequency, referred to as $f_{min}$ and typically determined experimentally or by computer-aided modeling.

Steps 865-870: The system clock frequency may then be monotonically increased, from an initial value of $f_{min}$ to subsequent frequency values separated by $\Delta f$ until the system clock frequency has reached the natural resonance frequency of the moving element in the array which has the highest natural resonance frequency, referred to as $f_{max}$ and typically determined experimentally or by computer-aided modeling. It is appreciated however that alternatively the system clock frequency might be monotonically decreased, from $f_{max}$ to $f_{min}$, or might be varied non-monotonically.

It is appreciated that when a moving element 10 is excited at its natural resonance frequency, $f_r$, the moving element increases its amplitude with every cycle, until reaching a certain maximal amplitude termed hereinafter $A_{max}$. Typically, the duration $\Delta t$ required for the moving element to reach $A_{max}$ is recorded during set-up and the magnetic force applied during the initialization sequence is selected to be such that $A_{max}$ is twice as large as the gap the moving element needs to travel from its idle state to either the top or bottom latch.

The Q factor or quality factor is a known factor which compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency. Preferably, the Q factor of the moving elements is determined either computationally or experimentally. The Q factor as determined describes how far removed the frequency $f_{CLK}$ needs to be from $f_r$ (two possible values, one below $f_r$ and one above $f_r$) before the amplitude drops to 50% of $A_{max}$. The difference between the two possible values is $\Delta f$.

As a result of the above steps, a sequence of electromagnetic forces of alternating polarities is now applied to the array of moving elements. The time interval between consecutive applications of force of the same polarity varies over time due to changes induced in the system clock, thereby to define a changing frequency level for the sequence. This results in an increase, at any time t, of the amplitude of oscillation of all moving elements whose individual natural resonance frequency is sufficiently similar to the frequency level at time t. The frequency level varies sufficiently slowly (i.e. only after a suitable interval $\Delta t$, which may or may not be equal in all iterations) to enable the set S, of all moving elements whose natural resonance frequency is similar to the current frequency level, to be latched before the electromagnetic field alternation frequency level becomes so dissimilar to their natural resonance frequency as to cease increasing the amplitude of oscillation of the set S of moving elements. The extent of variation of the frequency level corresponds to the natural resonance frequency range. Typically, at the end of the initiation sequence (step 872), the system clock $f_{CLK}$ is set to the predefined system frequency, typically being the average or median natural resonance frequency of the moving elements in the array, i.e. 44 KHz.

One method for determining the range of the natural resonance frequencies of the moving elements is to examine the array of moving elements using a vibrometer and excite the array at different frequencies.

Figure 18B:
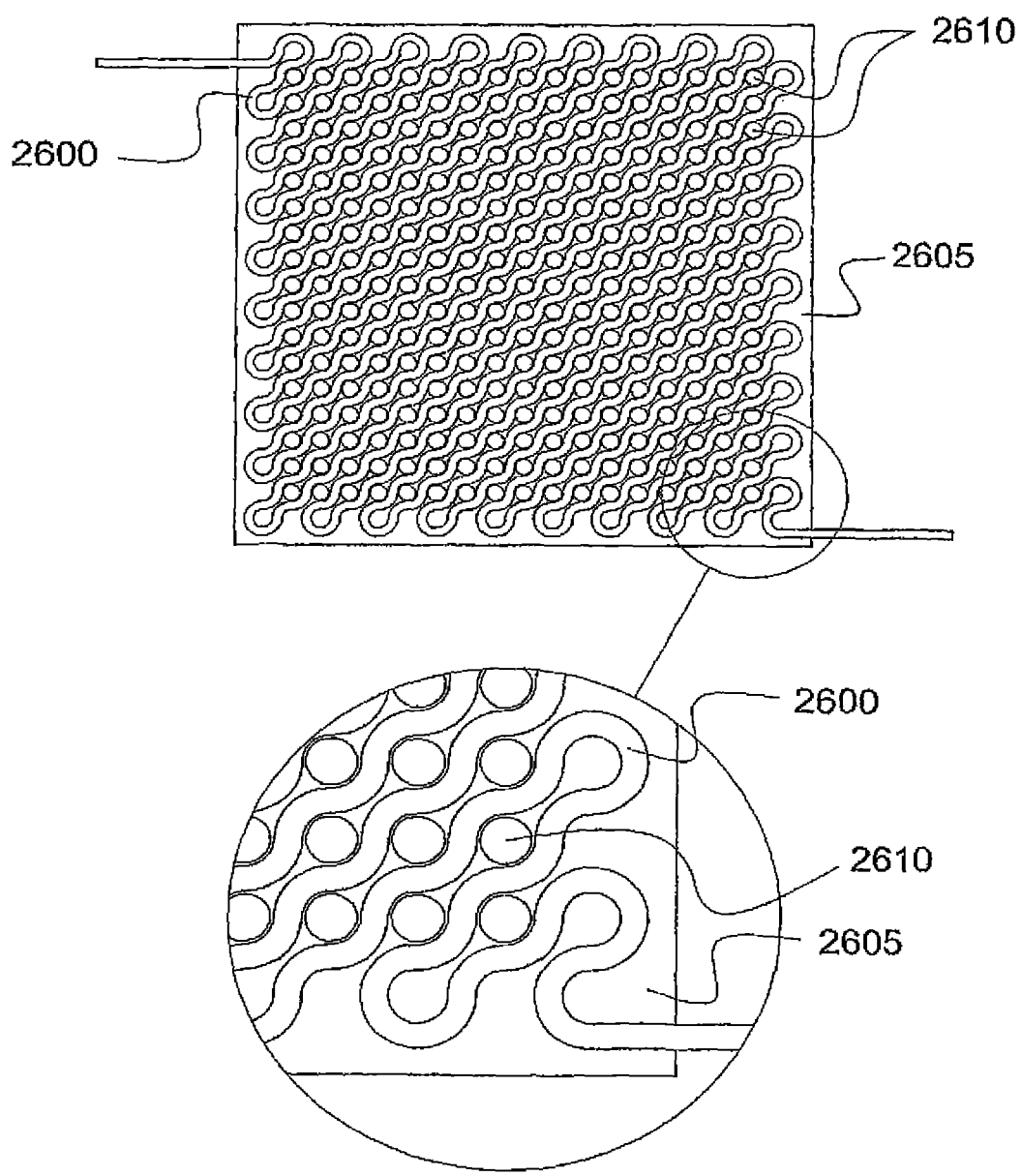
FIG. 18B is a simplified pictorial illustration of a magnetic field gradient inducing layer constructed and operative in accordance with certain embodiments of the present invention.

Referring again to FIGS. 18A-18D, FIG. 18A is a graph summarizing the various forces brought to bear on moving elements 10 in accordance with certain embodiments of the present invention. FIG. 18B is a simplified pictorial illustration of a magnetic field gradient inducing layer constructed and operative in accordance with certain embodiments of the present invention and comprising at least one winding conductive element 2600 embedded in a dielectric substrate 2605 and typically configured to wind between an array of channels 2610. Typically, there are no channels 2610 along the perimeter of the conductive layer of FIG. 18B so that the gradient induced within channels adjacent the perimeter is substantially the same as the gradient induced in channels adjacent the center of the conductive layer.

If the layer of FIG. 18B is separate from the spacer layers described above, then the channels in the layer of FIG. 18B are disposed opposite and as a continuation of the channels in the spacer layers described in detail above. The cross-sectional dimensions, e.g. diameters, of channels 2610 may be different than the diameters of the channels in the spacer layer. Alternatively, the layer of FIG. 18B may serve both as a spacer layer and as a magnetic field inducing layer in which case the channels 2610 of FIG. 18B are exactly the spacer layer channels described hereinabove. It is appreciated that, for simplicity, the electrodes forming part of the spacer layer are not shown in FIG. 18B.

Figure 18C:
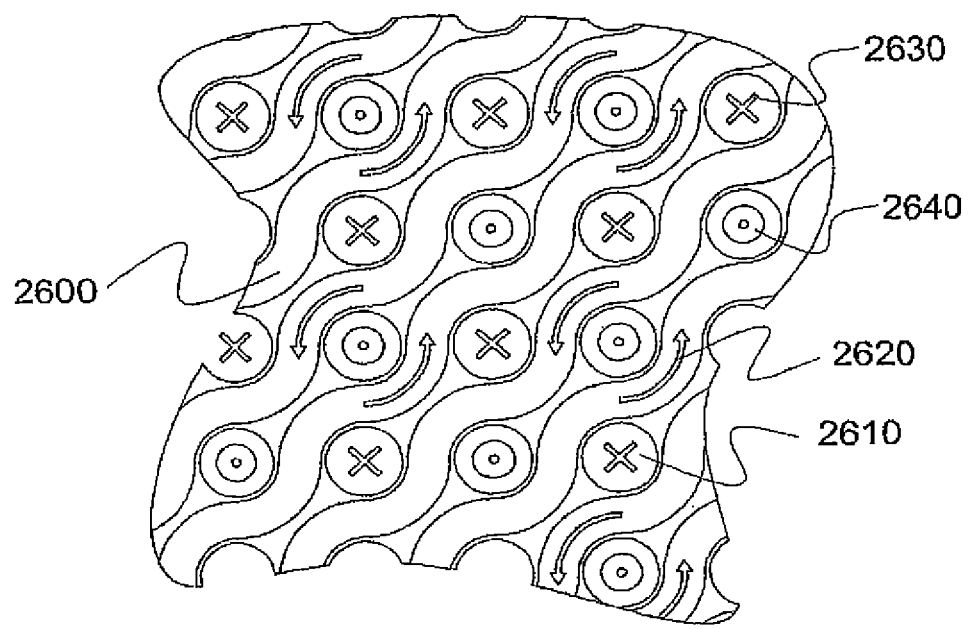
FIGS. 18C-18D illustrate the magnetic field gradient induction function of the conductive layer of FIG. 18B.
Figure 18D:
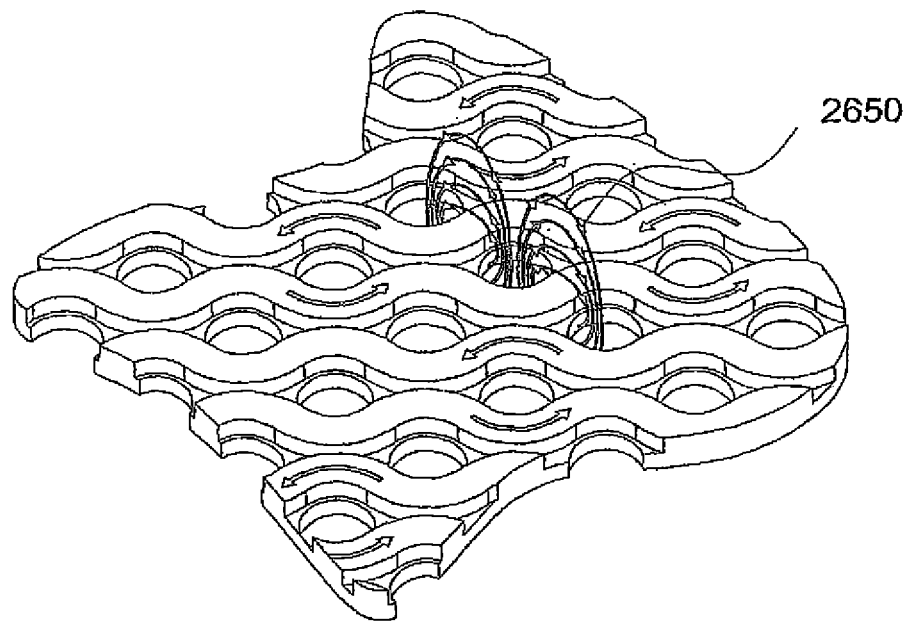

FIGS. 18C and 18D illustrate the magnetic field gradient induction function of the conductive layer of FIG. 18B. In FIG. 18C, the current flowing through the winding element 2600 is indicated by arrows 2620. The direction of the resulting magnetic field is indicated by X's 2630 and encircled dots 2640 in FIG. 18C, indicating locations at which the resulting magnetic field points into and out of the page, respectively.

Referring again to FIG. 19, an isometric array of actuators supported within a support frame provide an active area which is the sum of the active areas of the individual actuator arrays. In other words, in FIG. 19, instead of a single one actuating device, a plurality of actuating devices is provided. The devices need not be identical and can each have different characteristics such as but not limited to different clock frequencies, different actuator element sizes and different displacements. The devices may or may not share components such as but not limited to coils 40 and/or magnetic field controllers 30 and/or latch controller 50.

The term "active area" refers to the sum of cross-sectional areas of all actuator elements in each array. It is appreciated that generally, the range of sound volume (or, for a general actuator other than a speaker, the gain) which can be produced by a speaker constructed and operative in accordance with certain embodiments of the present invention is often limited by the active area. Furthermore, the resolution of sound volume which can be produced is proportional to the number of actuator elements provided, which again is often limited by the active area. Typically, there is a practical limit to the size of each actuator array e.g. if each actuator array resides on a wafer.

If the speaker is to serve as a headphone, only a relatively small range of sound volume need be provided. Home speakers typically require an intermediate sound volume range whereas public address speakers typically have a large sound volume range, e.g. their maximal volume may be 120 dB. Speaker applications also differ in the amount of physical space available for the speaker. Finally, the resolution of sound volume for a particular application is determined by the desired sound quality. e.g. cell phones typically do not require high sound quality, however space is limited.

According to certain embodiments of the present invention, layers of magnets on the moving elements may be magnetized so as to be polarized in directions other than the direction of movement of the element to achieve a maximum force along the electromagnetic field gradient aligned with the desired element moving direction.

A particular feature of certain embodiments of the present invention is that the stroke of motion performed by the moving elements is relatively long because the field applied thereto is magnetic hence decays at a rate which is inversely proportional to the distance between the moving elements and the current producing the magnetic field. In contrast, an electrostatic field decays at a rate which is inversely proportional to the square of the distance between the moving elements and the electric charge producing the electrostatic field. As a result of the long stroke achieved by the moving elements, the velocity achieved thereby is increased hence the loudness that can be achieved increases because the air pressure generated by the high velocity motion of the moving elements is increased.

It is appreciated that the embodiments specifically illustrated herein are not intended to be limiting e.g. in the sense that the moving elements need not all be the same size, the groups of moving elements, or individual moving elements if actuated individually, need not operate at the same resonance nor with the same clock, and the moving elements need not have the same amplitude of displacement.

The speaker devices shown and described herein are typically operative to generate a sound whose intensity corresponds to intensity values coded into an input digital signal. Any suitable protocol may be employed to generate the input digital signal such as but not limited to PCM or PWM (SACD) protocols. Alternatively or in addition the device may support compressed digital protocols such as ADPCM, MP3, AAC, DTS, or AC3 in which case a decoder typically converts the compressed signal into an uncompressed form such as PCM.

Design of digital loudspeakers in accordance with any of the embodiments shown and described herein may be facilitated by application-specific computer modeling and simulations. Loudness computations may be performed conventionally, e.g. using fluid dynamic finite-element computer modeling and empiric experimentation.

Generally, as more speaker elements (moving elements) are provided, the dynamic range (difference between the loudest and softest volumes that can be produced) becomes wider, the distortion (the less the sound resembles the input signal) becomes smaller and the frequency range becomes wider. On the other hand, if less speaker elements are provided, the apparatus is smaller and less costly.

Generally, if the moving elements have large diameters, the ratio between active and inactive areas (the fill factor) improves, and there is less stress on the flexures if any, assuming that the vibration displacement remains the same, which translates into longer life expectancy for the equipment. On the other hand, if the moving elements have small diameters, more elements are provided per unit area, and due to the lesser mass, less power is required to generate the desired movement. Generally, if the vibration displacement of the moving elements is large, more volume is produced by an array of a given size, whereas if the same quantity is small, there is less stress on the flexures, if any, and the power requirements are lower.

Generally, if the sample rate is high, the highest producible frequency is high and the audible noise is reduced. On the other hand, if the sample rate is low, accelerations, forces, stress on flexures if any and power requirements are lower.

Figure 20A:
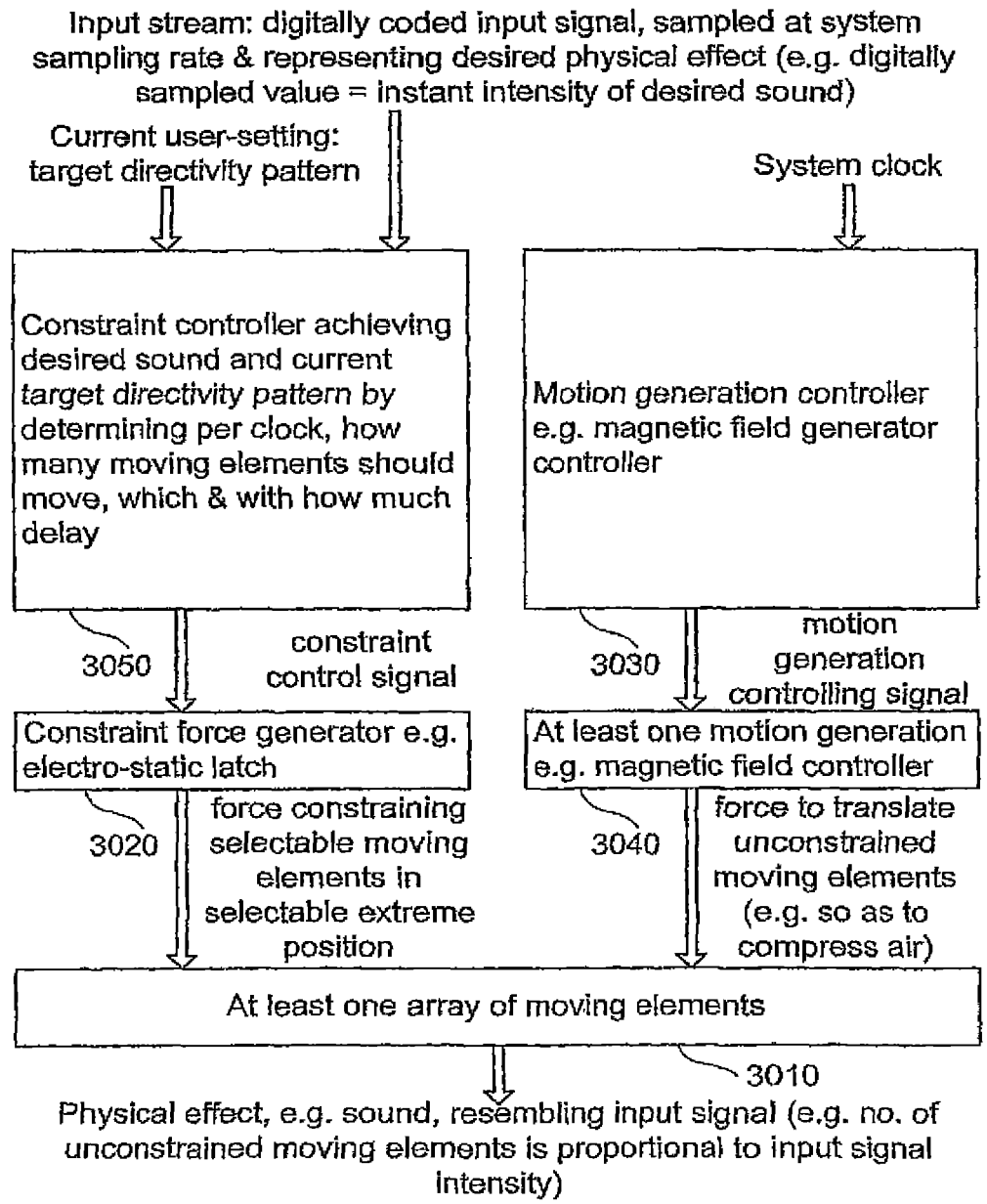
FIG. 20A is a simplified generally self-explanatory functional block diagram illustration of a suitable system for achieving a desired directivity pattern for a desired sound stream using a direct digital speaker with characteristics as indicated in FIG. 20A e.g. that shown and described herein in FIGS. 13-19.
Figure 20B:
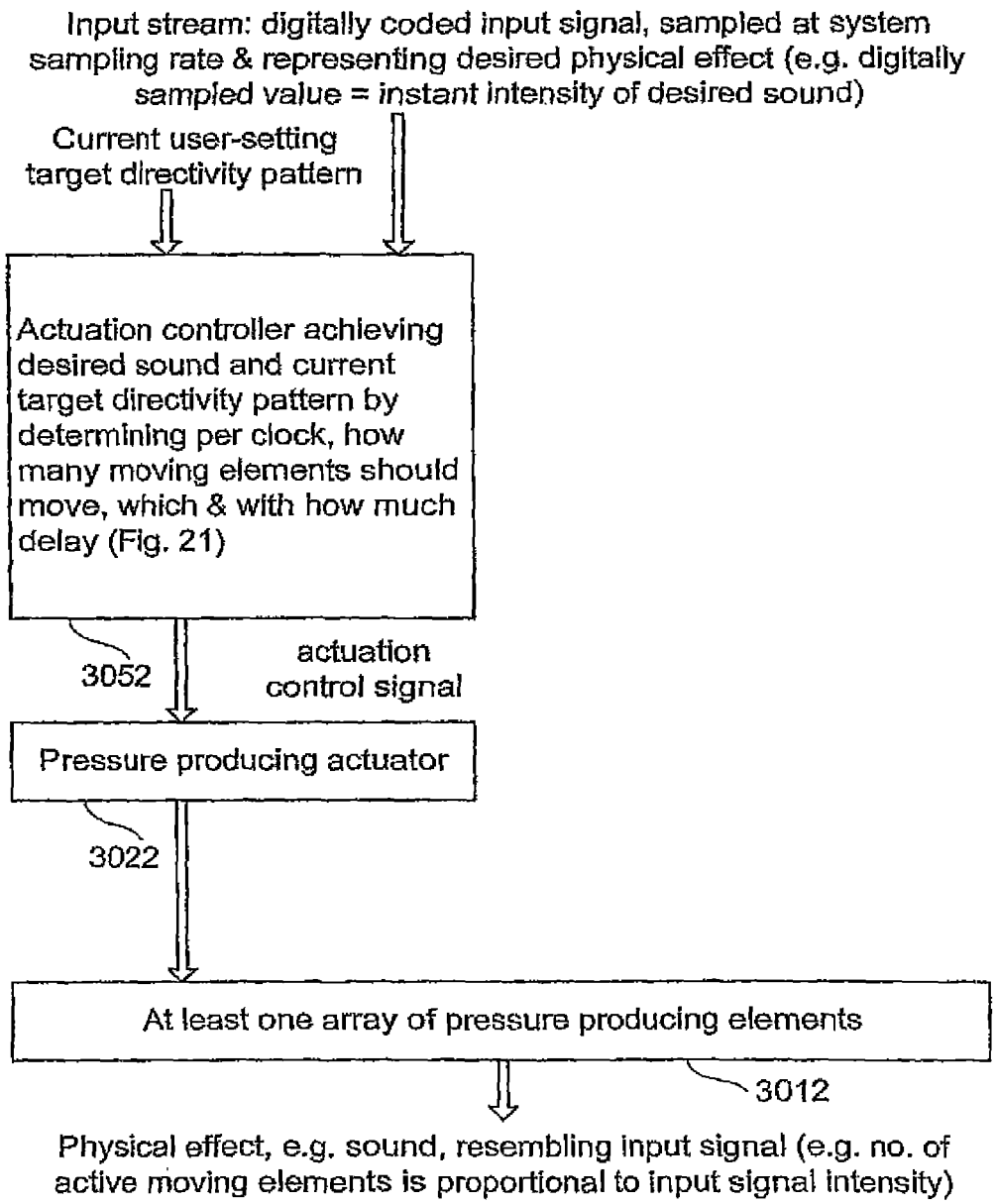
FIG. 20B is a simplified generally self-explanatory functional block diagram illustration of a suitable system for achieving a desired directivity pattern for a desired sound stream which is of general applicability in that it need not employ a direct digital speaker with characteristics as indicated in FIG. 20A e.g. that shown and described herein in FIGS. 13-19 and may instead employ any suitable direct digital speaker.

Reference is now made to FIGS. 20A-20B which is are simplified generally self-explanatory functional block diagram illustrations of suitable systems for achieving a desired directivity pattern for a desired sound stream using a direct digital speaker such as any of those shown herein in FIGS. 13-19 or such as a conventional direct digital speaker which may, for example comprise that shown and described in U.S. Pat. No. 6,403,995 to David Thomas, assigned to Texas Instruments and issued 11 Jun. 2002, or in Diamond Brett M., et al, "Digital sound reconstruction using array of CMOS-MEMS micro-speakers", Transducers '03, The $12^{th}$ International Conference on Solid State Sensors, Actuators and Microsystems, Boston, Jun. 8-12, 2003.

If the direct digital speaker of FIG. 13 is used to achieve a desired directivity pattern for a desired sound stream, then typically, blocks 3020, 3030 and 3040 in FIG. 20A comprise blocks 20, 30 and 40 of FIG. 13 respectively and block 3050 comprises latch controller 50 of FIG. 13, programmed to implement the per-clock operation of block 3050 e.g. as shown and described herein with reference to FIG. 21.

FIG. 21 is a simplified flowchart illustration of per-clock operation of the moving element constraint controller 3050 of FIGS. 20A-20B, in accordance with certain embodiments of the present invention.

Step 3100 determines how many moving elements should move during the current clock. Typically, and as described in detail above with reference to FIGS. 13-19, the number of moving elements which are to move during a given clock is generally proportional to the intensity of the input signal during that clock, suitably normalized e.g. as described above with reference to resampler 814 and scaler 815 of FIG. 17B.

Step 3200 determines which moving elements should move during the current clock, using, in some embodiments, a suitable moving element selection LUT which is typically loaded into the memory of the constraint controller 3050 of FIGS. 20A-20B during factory set-up. Each such LUT is typically built for a specific moving element array taking into account, inter alia, the array size and whether or not the array is skewed. Each directivity pattern which it is desired to achieve typically requires its own LUT.

Step 3300 determines the amount of delay with which to operate each of the moving elements of moving element array 3010 or 3012 of FIGS. 20A-20B.

Step 3200 is now described in detail. A suitable method for performing step 3200 is now described. Step 3200 typically employs a LUT (look up table) which has cells which correspond one-to-one to the pressure producing elements in the array. For example, if the array comprises a rectangle of 100×200 pressure producing elements then the LUT may have 100×200 cells. Each cell holds a uniquely appearing integer between 1 and the total number of pressure producing elements such as 20000 in the illustrated example. Therefore, the LUT assigns an ordinal number to each pressure producing element in the array. Associated in memory with the LUT is a integer parameter P which stores an indication of the number of pressure producing elements currently in a first operative configuration from among two operative configurations, characterized in that transition of the pressure producing elements therebetween produces pressure in the medium, such as air, in which the apparatus of the invention is disposed. In some embodiments, pressure in opposite directions is obtained when the elements move from the first configuration to the second, as opposed to when the elements move from the second configuration to the first. In other embodiments, pressure is obtained as long as the elements are in the first configuration, and no pressure is obtained when the elements are in the second configuration.

Typically, P is initialized during set-up as described below, and is then assigned a current value in each clock by step 3100. In the immediately following step 3200 in the same clock, P pressure producing elements are brought to their first operative configuration and N-P pressure producing elements are brought to their second operative configuration where N is the number of pressure producing elements in the array. The P elements selected to be in their first operative configuration are those whose ordinal number as determined by the LUT is smaller than P. The N-P elements selected to be in their second operative configuration are those whose ordinal number as determined by the LUT is greater than or equal to P.

One of these configurations, say the first, is typically arbitrarily considered the "positive" configuration whereas the other configuration, say the second, is then considered the "negative" configuration. Alternatively, in some applications there may be a physical reason to select a specific one of the configurations to be the positive configuration. The pressure generated when a pressure producing element moves from the second configuration to this first configuration is termed "positive pressure" whereas the pressure generated when a pressure producing element moves from the second configuration to this first configuration is termed "positive pressure". The pressure generated by a single transition from one configuration to the other is termed herein a pressure "pulse".

During set-up, the parameter P is typically given an initial value equal to half of the number of pressure producing elements in the array such as 10000 in the present example. The array is then initialized such that each pressure producing element whose ordinal number as determined by the LUT is less than P is brought to its first configuration and the remaining pressure producing elements are brought to their second configuration.

A suitable LUT (look up table), which has cells which correspond one-to-one to the N pressure producing elements in the array, storing integers from 1 to N, may be generated as follows:
A criterion for LUT quality is first determined, which may be application-specific. One suitable criterion for LUT quality is now described.

A list is prepared of all possible subsets of consecutive integers ranging between 1 and N. In the present example, the first subset, termed hereinafter $S2_1$, includes 2 integers: 1 and 2; the second subset, $S2_2$ includes the integers 2 and 3, and so on for all subsets containing two integers. The last two-element subset, $S2_{19999}$, contains the integers 19999 and 20000. The list also includes all possible three element subsets, namely, to continue the example, $S3_1$ (which includes integers 1, 2, 3), $S3_2$ (which includes integers 2, 3, 4), . . . $S3_{19998}$ (which includes integers 19998, 19999, 20000). The list also includes all 4 element subsets, 5 element subsets and so on and so forth. The last subset, $S20000_1$ contains all 20000 elements. In general, a subset containing K integers, starting at i is labeled $SK_i$. It is appreciated that for a LUT containing N cells, the number of possible subsets M equals $M=(N-1)*N/2$.

For each subset $SK_i$, a set of coordinates is defined $(X_i, Y_i), (X_{i+1}, Y_{1+1}), \ldots (X_{i+K-1}, Y_{i+K-1})$ such that the coordinates represent the position of the pressure-producing elements whose ordinal numbers are i, i+1, . . . i+k-1 according to the current LUT.

For each subset $SK_i$, a propagation angle $\theta K_i$ is computed e.g. using analytic or numeric computation methods, typically using suitable computer simulation applications such as Matlab, MatCAD or Mathematica. The sound waves' propagation angles are computed for K coherent sound sources, disposed at positions $(X_i, Y_i), (X_{i+1}, Y_{i+1}), \ldots (X_{i+K-1}, Y_{i+K-1})$, all producing sinusoidal waves at the same phase and at a frequency equal to the system sampling rate, e.g. 44100 Hz.

A "propagation angle of a subset" is defined as follows: Each subset corresponds to a subset of pressure producing elements. A reference axis is defined passing through the center of mass of the array of pressure producing elements and perpendicular to its main surface. The intensity of sound generated by the subset of pressure producing elements approaches a maximum as one retreats from the array of pressure producing elements along the reference axis. Therefore, a maximal intensity for the subset may be defined by measuring the intensity at a location L which is on the reference axis and sufficiently distant from the array so as to ensure that the differences between the distance of location L and each of the pressure producing elements in the subset are sufficiently, e.g. an order of a magnitude, smaller than the wavelength λ associated with the system clock. At least one reference plane is defined which includes the reference axis. It is appreciated that an infinite number of such reference planes exists. For cylindrical propagation applications in which a focal axis is defined, select a reference plane which includes the focal axis. It is appreciated that a LUT constructed on this basis would typically also be suitable for omnidirectional applications. For propagation applications in which a focal point is defined as described herein, select a reference plane which includes the focal point. If more than one such reference plane exists, select two such reference planes which are mutually perpendicular.

The propagation angle of the subset, termed herein $\theta K_i$, is defined for each reference plane selected for that subset, as follows: Define an imaginary circle within the reference plane whose center is at the point of intersection between the reference axis and the main surface of the array and whose radius is the distance between L and the main surface of the array. Select two locations on the circumference of the circle on both sides of the reference axis respectively, in which the sound intensity generated by the subset of pressure producing elements is half of the maximal intensity measured at L. The angle defined between two radii connecting the center of the circle to these two locations respectively is termed the propagation angle of the subset for that reference plane. If the subset has two perpendicular reference planes as described above, simple or weighted average of the two propagation angles may be computed to obtain a single propagation angle $\theta K_i$ for the subset. If the directivity pattern across a certain reference plane, e.g. a vertical plane, is more important than that across the other, perpendicular reference plane, greater weight is assigned to the more important plane. For example, in certain applications the most important consideration may be to prevent unwanted noise from reaching locations on different floors in which case a vertical reference plane would be more heavily weighted than the horizontal reference plane. An example of a suitable criterion for the "best-ness" of a specific LUT is:

$$LUT_{score}=1/[(\text{average of all } \theta K_i) \times (\text{standard deviation of all } \theta K_i)]$$

To determine the most suitable LUT, one may use a computer simulation to test and score all possible permutations i.e. all possible N-cell LUTs, and selecting the best one thereof.

It is appreciated that the number of LUTs, each containing N cells, is N! (N factorial). If N is sufficiently large, it becomes impractical to test and evaluate all possible LUTs i.e. all possible permutations of integers into LUT cells. If such is the case, a smaller number of LUT permutations may be selected, e.g. randomly, and the best one thereof is selected.

It is appreciated that alternatively, step 3200 may be performed without resort to a fixed LUT stored during set-up. Instead, the set of $P_t$-$P_{t-1}$ pressure producing elements to be activated may be selected by selecting the best subset of $P_t$-$P_{t-1}$ elements from among the set of pressure producing elements which are currently in the second operative configuration. This may be done by estimating the propagation angle $\theta$ for each possible subset of $P_t$-$P_{t-1}$ elements and selecting that subset which best matches the desired propagation pattern.

$P_t$ refers to the current value of P whereas $P_{t-1}$ refers to the value of P in the previous system clock.

Furthermore, it is appreciated that in those applications in which the directivity pattern is not important, any set of pressure producing elements may be employed to achieve a temporal pressure pattern dictated by the input signal.

Step 3300, in which the amount of delay with which to operate each of the moving elements of moving element array 3010 or 3012 of FIGS. 20A-20B, is computed, determines the directionality of the sound generated by the speaker. Suitable methods and formulae for optionally positioning the moving element array as a function of desired directionality of propagation, if possible, and for computing delays also as a function of desired directionality of propagation, are now described, for three example propagation patterns termed herein omni-directional, cylindrical and uni-directional. It is appreciated that the three propagation patterns discussed particularly herewithin are discussed merely by way of example.

Figure 22A:
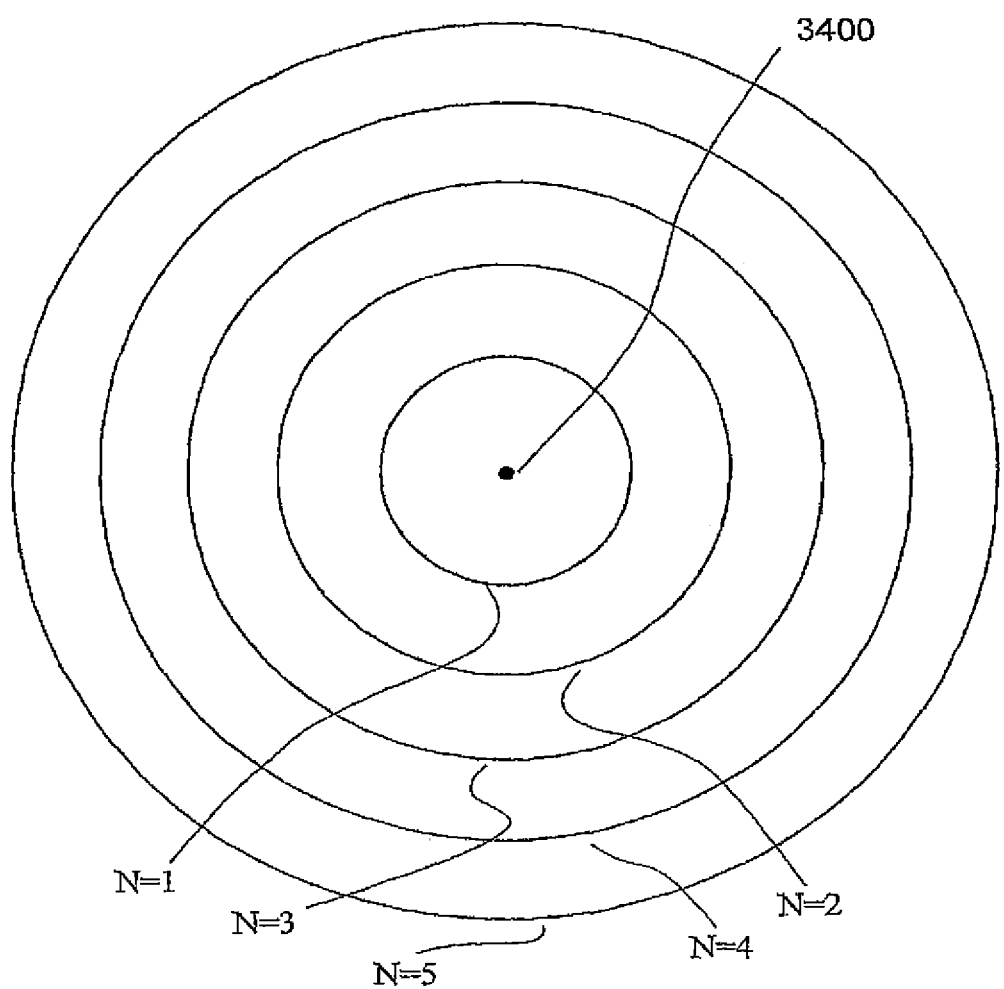
FIG. 22A is a simplified diagram of an omni-directional propagation pattern.
Figure 22B:
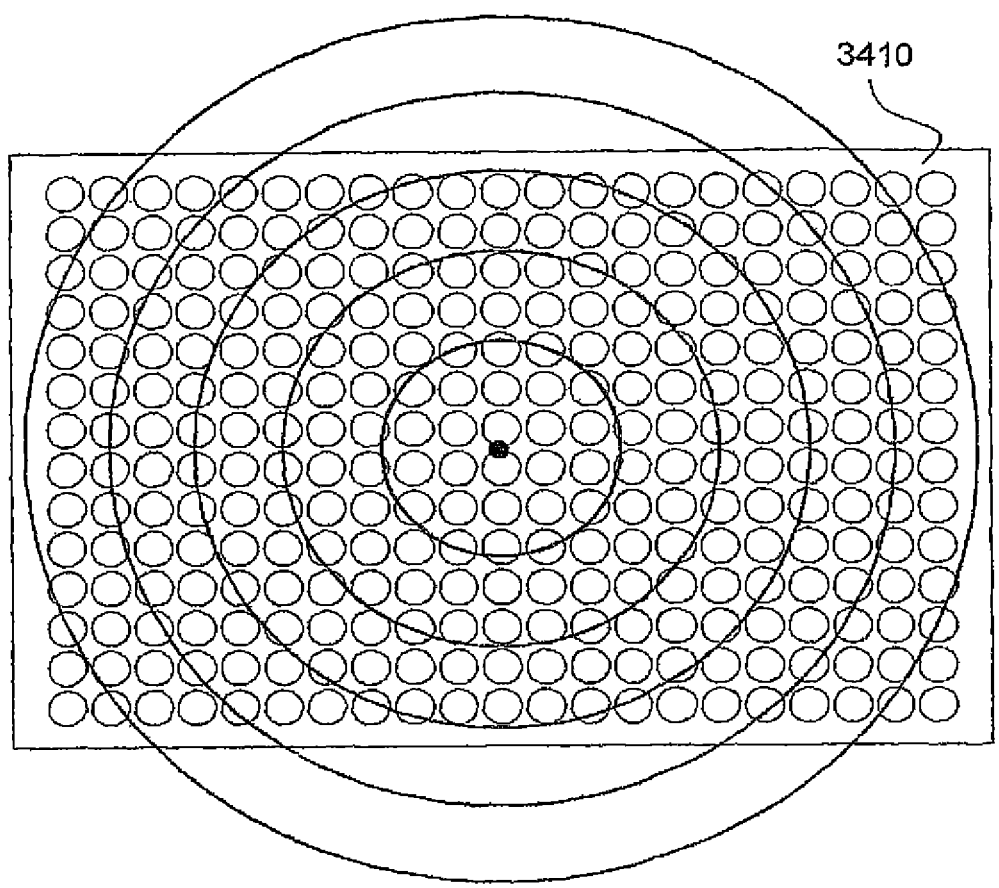
FIG. 22B is a diagram of a suitable positioning of a moving element array relative to the focal point of the desired omni-directional sound propagation pattern of FIG. 22A.

FIGS. 22A-22B, taken together, describe a simplified example of a solution for performing step 3300 when it is desired to achieve omni-directional sound i.e. sound which propagates outward through three dimensional space from a given point location termed herein the "focal point" of the omni-directional sound. Specifically, FIG. 22A is a simplified diagram of an omni-directional propagation pattern having a focal point 3400 and FIG. 22B is a diagram of a suitable positioning of a moving element array relative to the focal point of the desired omni-directional sound propagation pattern of FIG. 22A. In the illustrated embodiment, the array of moving elements referenced generally 3010 or 3012 in FIGS. 20A-20B comprises, merely by way of example, a typically non-skewed array 3410 of 14×21 moving elements. As shown, the array of moving elements is preferably although not necessarily positioned, as illustrated in FIG. 22B, such that its geometric center (located between the $7^{th}$ and $8^{th}$ rows, at the $11^{th}$ column) of the array of moving elements coincides with the focal point 3400 of the omni-directional pattern, located at the center of the concentric circles representing the omni-directional pattern as shown in FIG. 22A. The center of the array may also be positioned at the projection of the focal point of the omni-directional pattern onto the plane of the moving element array 3410. It is appreciated that the array need not be positioned as illustrated and may instead be positioned at any suitable location, such as a fixed location independent of the particular propagation pattern currently selected by a user.

It is appreciated that the array need not be of the specified dimensions or shape. In fact suitable embodiments of direct digital speakers are comprised of thousands to hundreds of thousands of pressure-producing elements. The shape of the array may change according to application and/or use.

It is also appreciated that the focal point referred to herein need not be positioned on the main surface defined by the array of pressure-producing elements. Changing the distance between the focal point and the main surface of the array of the pressure-producing elements changes the directionality pattern of the device. e.g. placing the focal point on the surface (zero distance) would produce true omni-directional directivity pattern where sounds intensity remain essentially equal regardless of the angle in which the sound propagates. Placing the focal point at a certain distance, d behind the surface of pressure-producing elements defines a projection cone (in the case of a round array) or a projection pyramid (in the case of a square or rectangular array) that is characterized by a head angle narrower than 180 degrees. Placing the focal point at an infinite distance behind the main surface of the pressure producing elements (given that the sound produced by the pressure producing elements is produced in front of the main surface) typically defines a projection cone or a projection pyramid that is very narrow and would produce a true unidirectional directivity pattern. Typically, the sound intensity throughout the projection cone or projection pyramid remains essentially equal while the intensity outside the cone or pyramid is significantly lower. It is appreciated that d may be either 0 or infinity in certain applications. In certain applications, d may be determined as a function of a user control.

Referring back to FIG. 22A, each circle shown represents half a phase and has a radius r which is computed using the following formula:

$$r=(Nd\lambda/2+N^2\lambda^2/4)^{0.5}$$

where:
N=the serial number of the circle, counting outward from the center and starting from 1,
d=the distance of the plane of the non-skewed array from the focal point of the omni-directional sound
$\lambda$=c T, where c=the speed of sound through the medium in which the speaker is operating, typically air, and T=the period of the system clock of FIG. 20A or 20B (not shown).

It is appreciated that specific delay values for the moving elements in array 3410, suitable for achieving the omni-directional pattern of FIG. 22A, may be determined as follows:
(a) Any moving element which coincides with a circle whose serial number is N is assigned a delay value of N T/2.

(b) Any moving element which does not coincide with a circle, and instead falls between a pair of circles whose serial numbers are N and N+1 is assigned a delay value by interpolating e.g. linearly between the following two values: NT/2 and (N+1)T/2.

Alternatively, a suitable formula for determining delays is described in detail below.

The scope of the present invention includes but is not limited to a method for controlling direct digital speaker apparatus receiving a digital input signal and generating sound accordingly, the method comprising providing an array of pressure-producing elements, and computing a timing pattern determining if and when each pressure-producing element is operative to produce pressure pulses so as to achieve a desired directivity pattern. The array is then operated in accordance with the timing pattern in order to achieve sound having the desired directivity pattern.

Optionally, the providing and computing steps are performed a plurality of times thereby to obtain a corresponding plurality of arrays and a corresponding plurality of timing patterns defining a corresponding plurality of directivity patterns. The method then also comprises the step of operating the plurality of arrays simultaneously in accordance with the corresponding plurality of timing patterns respectively thereby to obtain a single directivity pattern comprising a combination of the directivity patterns corresponding to the plurality of timing patterns. The plurality of arrays may in fact comprise portions of a single larger array. So, for example, a single array of pressure producing elements such as any of those shown and described herein may be partitioned into regions, e.g. quarters, and the pressure producing elements in each region may be operated in accordance with its own particular timing pattern or delay pattern. For example, this allows a pattern of several, say four, different unidirectional beams to be achieved. Alternatively, to give another example, this allows, say, omni-directional background sound to be superimposed on one or more different foreground sound streams each respectively having its own, say, uni-directional, cylindrical or omni-directional propagation pattern. It is appreciated that in multi-directional embodiments, each of the unidirectional beams may produce a different digital input signal, e.g. the left and right channels of a stereophonic signal.

It is appreciated that the electromagnetic field controller 30 is preferably designed to ensure that the alternating current flowing through the coil maintains appropriate magnetic field strength at all times and under all conditions so as to allow sufficient proximity between the moving elements 10 and the electrostatic latches 20 to enable latching, while preventing the moving elements 10 from moving too fast and damaging themselves or the latches 20 as a result of impact.

In some applications, a small displacement (typically up to 5 microns) of translating elements is sufficient for appropriate operation. In such speakers, the electromagnetic driving coil may be eliminated. In this case set-up may be affected by the same electrodes which are designed to function as latching elements. This is possible because in short stroke translating elements, the electrostatic forces between flexures and electrode elements, even in the initial flexure position in which maximal air gaps occur, are sufficient to swing the flexures under resonance conditions.

Figure 23A:
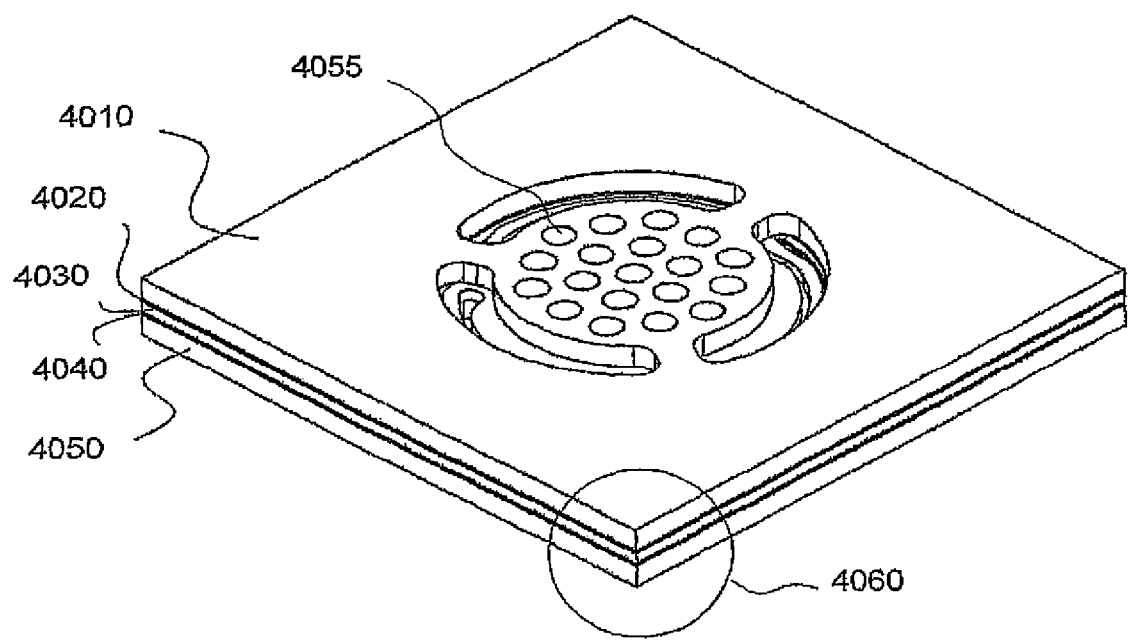
FIG. 23A is an isometric view of small-stroke actuator apparatus, constructed and operative in accordance with certain embodiments of the present invention and having translating elements which requires no electromagnetic force for its operation because electrostatic forces are employed both to generate motion of the translating elements and to latch them.
Figure 23B:
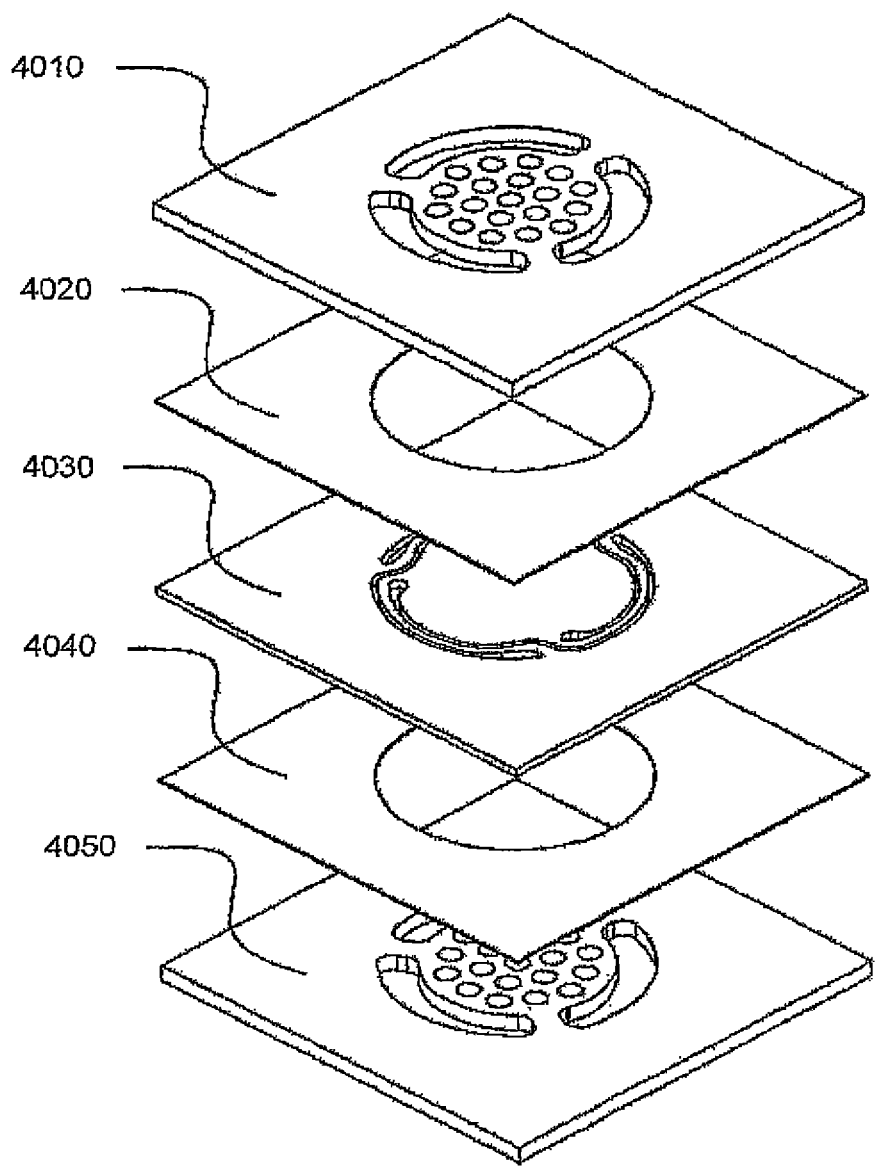
FIG. 23B is an exploded view of the apparatus of FIG. 23A.
Figure 23C:
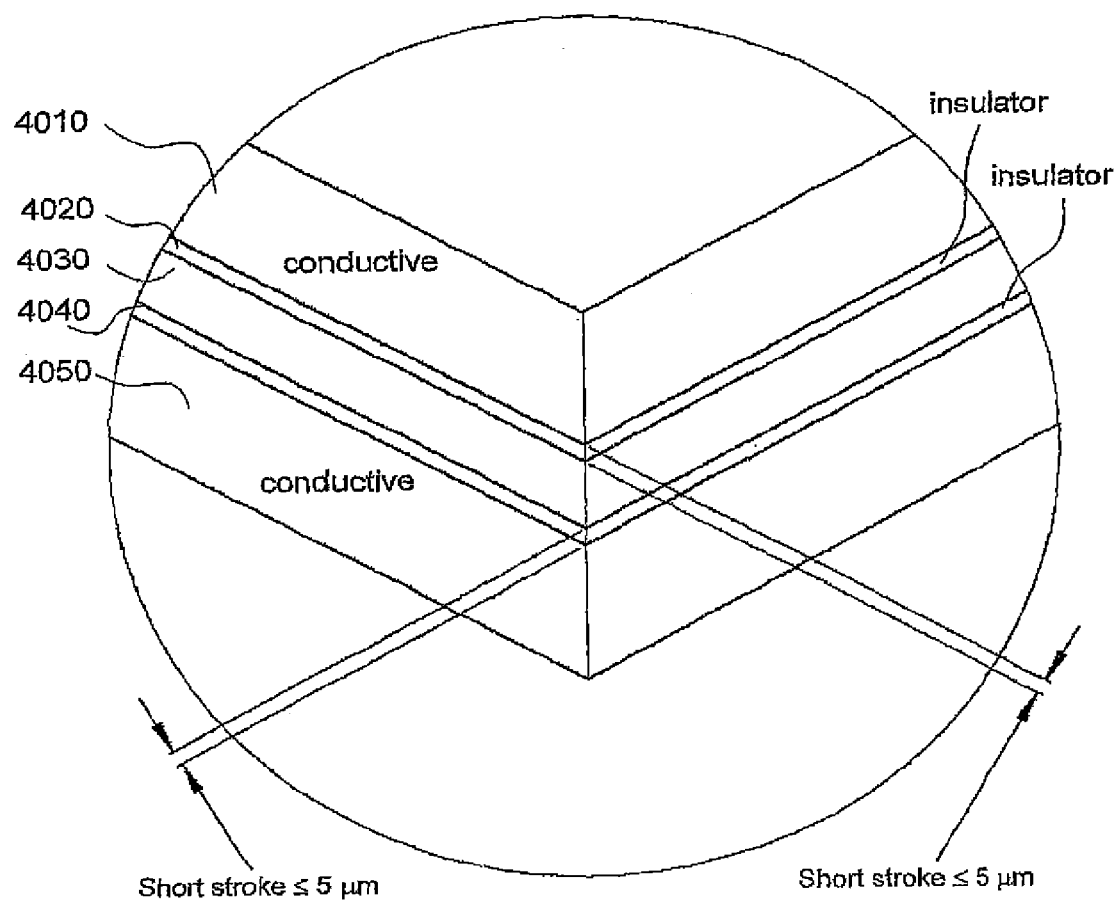
FIG. 23C is an enlarged illustration of the bubble of FIG. 23A.

FIG. 23A is an isometric view of small-stroke translating element apparatus as described above. FIG. 23B is an exploded view of the apparatus of FIG. 23A. FIG. 23C is an enlarged illustration of the bubble of FIG. 23A. A flexure 4030 is interposed between two rigid electrodes 4010 and 4050 which are separated from flexure 4030 by insulator layers 4020 and 4040. To provide appropriate operation, the electrodes comprise an array of through-holes 4055 providing sufficient air passing through, to generate sound as required by the application.

As shown, the apparatus is a short stroke apparatus in which the stroke, typically determined by the thickness of the insulating layers 4020 and 4040, falls within the operative range of the electrostatic force generated by the voltage applied between the electrodes 4010 and 4050 and the translating element layer 4030. In particular, the apparatus of FIGS. 23A-23C is constructed such that the electrostatic force is capable of inducing translation of the translating elements wherever they may be located rather than only when the translating elements have been previously caused to approach the relevant electrode. As is well known, one characteristic of an insulator (and of air) is the "breakdown voltage" of each which defines the maximum voltage difference that can be applied across the material before the insulator collapses and conducts. Therefore, the voltage that can be applied between the translating element layer 4030 and the electrode layers 4010 and 4050 is limited by the breakdown voltage of the insulating layers 4020 and 4040 and surrounding air. Consequently, the stroke is selected to be small enough to allow the limited voltage that can be applied to induce translation of the translating elements 4030 irrespective of their location.

Figure 24A:
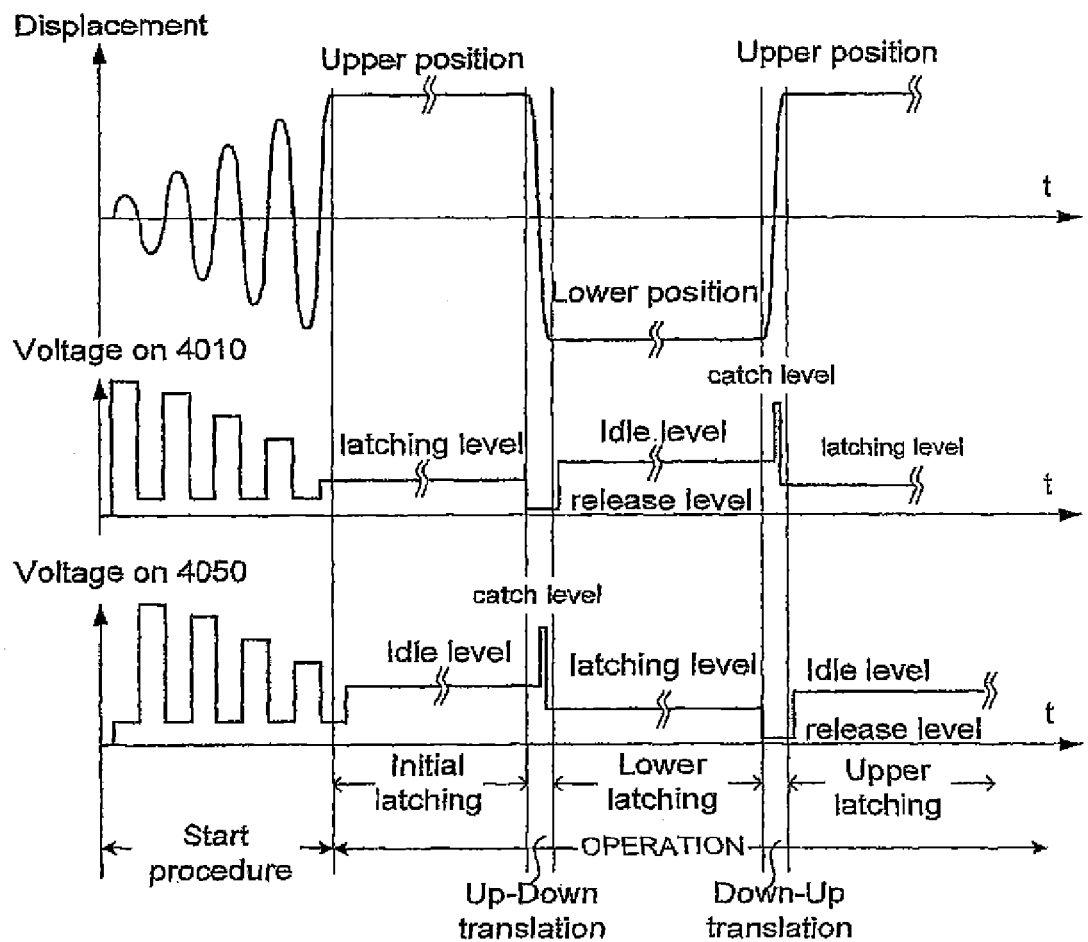
FIG. 24A is a simplified composite graph illustration of a suitable displacement (top graph) of a translating element in the actuator apparatus of FIG. 23A and of voltage patterns which if applied to the top (middle graph) and bottom (bottom graph) electrode layers of the actuator apparatus respectively, result in the desired displacement shown in the top graph, all in accordance with certain embodiments of the present invention.
Figure 24B:
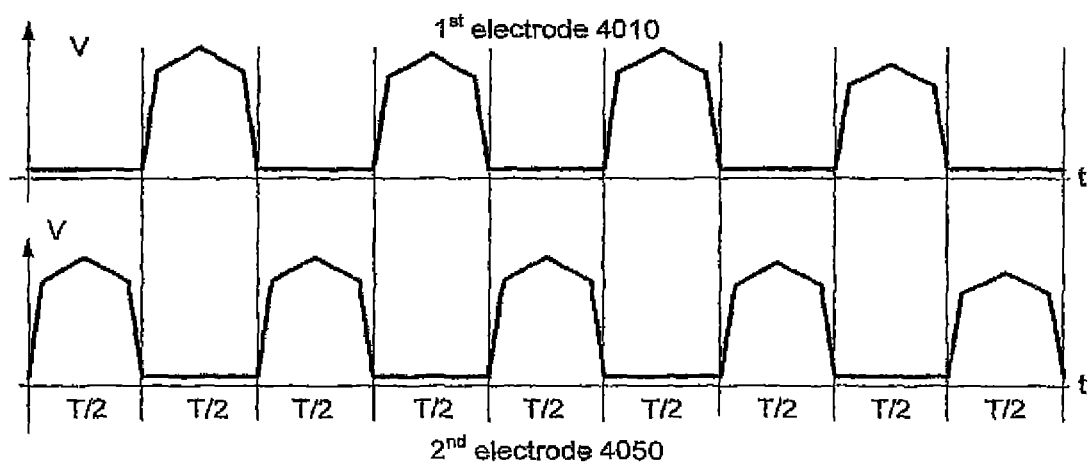
FIG. 24B is a detailed graph illustration of voltages applied to the top (top graph) and bottom (bottom graph) electrode layers of the actuator apparatus, during the "start procedure" phase shown in FIG. 24A in which translating elements are put into motion, all according to certain embodiments of the present invention in which the "roof" of the pulses is not flat but rather inclines upward and then downward e.g. as shown.

Suitable voltages to be applied to the electrodes in these translating elements, when the apparatus is in start procedure and in normal operation mode, are now described. In start procedure, as shown in FIG. 24A, two electrodes operate synchronously at resonance frequencies which are mutually shifted by half a period. As shown in FIG. 24B, a periodical voltage is applied to each electrode which may vary from zero up to a maximal level. Optionally, zero or essentially zero voltage may be maintained for half the period.

Figure 24C:
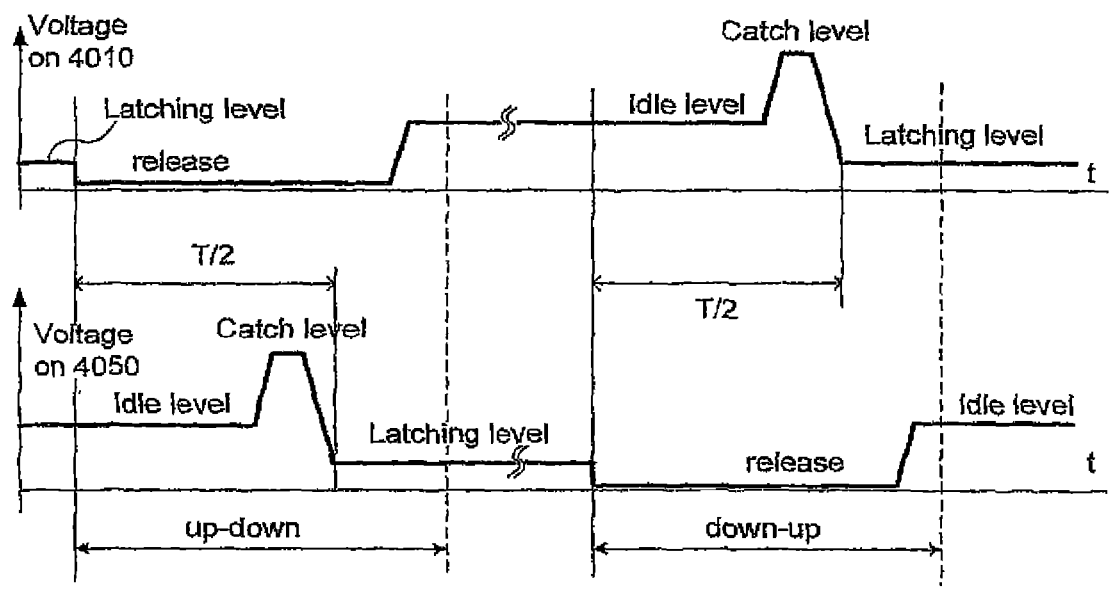
FIG. 24C is a detailed graph illustration of voltages applied to the top (top graph) and bottom (bottom graph) electrode layers of the actuator apparatus, during the "up-down translation" and "down-up translation" phases shown in FIG. 24A, all according to certain embodiments of the present invention.

Responsive to a "position translation" command issued by a suitable controller at time t_0, the latching electrode 4010 is shorted to the flexure for a short time (the "release" period on the top graph of FIG. 24C) and then reverts to a low "idle" voltage. About half way through this idle period, as shown in the bottom graph in FIG. 24B, electrode 4050 is connected to a high voltage for a short duration, which duration is also termed herein the "catching" duration. The first electrode 4010 then transmits to a latching voltage to provide latching.

Instead of shorting the latching electrode 4010 to the flexure during the "release" period, it may be desirable to apply a voltage, typically lower than the voltage during the "hold" period, between the flexure and the latching electrode 4010, perhaps even one of opposite polarity, thus expediting dissipation of charge from the latching electrode 4010.

According to certain embodiments of the present invention, a suitable electronic circuit may be provided to transfer the charge from the electrode to a suitable charge storage device (e.g. a capacitor) rather than disposing of the charge. The stored charge may be reused at a later stage rather than generating a new charge, thus improving the electrical efficiency of the system.

Also, instead of storing the charge in a charge storing device, it may be desirable to transfer the charge from the "release" stage electrode to a different latching electrode that may be at a "catch" stage at the time, e.g. the latching electrode 4050 disposed at the latching position opposite to the one from which the charge is removed.

The top graph of FIG. 24A is a graph of displacement of the resiliently translating elements 4030 of FIGS. 23A,-23B vs. time. The middle graph of FIG. 24A is a graph of the voltage, versus time, between the flexure and first electrode 4010. The bottom graph of FIG. 24A is a graph of the voltage, versus time, between the flexure and second electrode layers 4050.

In normal operation mode, as shown in FIG. 24A, initially the translating element is latched to the latching electrode 4010 by a relatively low latching voltage (latching voltage) to such as 10-20% of the maximal voltage (top graph). The other electrode 4050 (bottom graph) may be kept under a rather low voltage (idle level).

Following receipt of an "up-down translation" command from a suitable controller, a very low "release" voltage is typically applied to the first latching electrode for a short time, typically 10% to 60% of the period. The first latching electrode may even be shortened to the translating element layer 4030. This voltage then increases to an "idle" level typically comprising about 30-40% of the maximal voltage. In parallel the voltage at the second electrode, initially at idle level, jumps up to a maximal "catch" level for a very short time, about half a period after initiation of the release voltage on the first electrode. After the "catch" plateau, the voltage at the second electrode then decreases to a relatively low latching voltage as shown. Following receipt of an "up-down translation" command from a suitable controller, the sequence is just the opposite of that described above as occurring following receipt of a "down-up translation" command: A very low "release" voltage is applied to the second electrode for a short time, typically for 10% to 60% of the period. The voltage at the second electrode then increases to an "idle" level which is typically about 30-40% of the maximal voltage. In parallel the voltage at the first electrode, maintained at an idle level, jumps up to a maximal "catch" level for a very short time about half a period after the release occurs, and subsequently decreases down to a relatively low latching voltage.

As shown, typically the up-down translation time interval and the down-up translation time interval are equal in length. The up-down translation typically terminates well before T time has elapsed (counting from receipt of the up down translation command), typically at close to 0.5 T, such as approximately 0.53-0.55 T, from receipt of the up down translation command. The same is true, mutatis mutandis, for the down-up translation.

It is appreciated that the graphs of FIGS. 24A and 24B inter alia are simplifications, e.g. because the start procedure typically comprises up to several hundred pulses of voltage and not only a few as shown. Any suitable number of pulses can be provided in the start procedure, assuming that the number of pulses is capable of bringing the translating elements into their extreme positions. The number of pulses may be determined, inter alia, based upon some or all of the maximal voltage level, stroke length, and acoustic impedance of the translating element. Generally, the higher the voltage level the less pulses need be employed; the larger the stroke the greater number of pulses need be employed; and the higher the acoustic impedance the more pulses need be employed. As an example, for a translating element having a 400 um diameter circular active surface, each translating element distanced 2 um from its electrode (i.e. having a 2 um stroke) and a voltage level of 120 V, a few dozen to pulses, e.g. approximately 20 pulses, might be employed.

The "roof" of each pulse during the start procedure need not be flat as in FIG. 24A nor need it incline upward and then downward specifically linearly as shown for simplicity in FIG. 24B.

Figure 25:
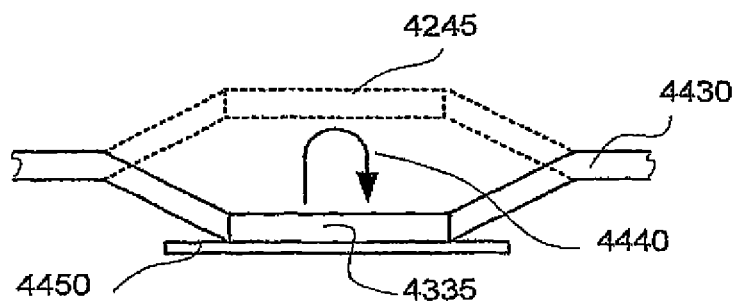
FIG. 25 is a simplified pictorial diagram of actuator apparatus having only one latch to latch its translating elements, the apparatus being constructed and operative in accordance with certain embodiments of the present invention.
Figure 26:
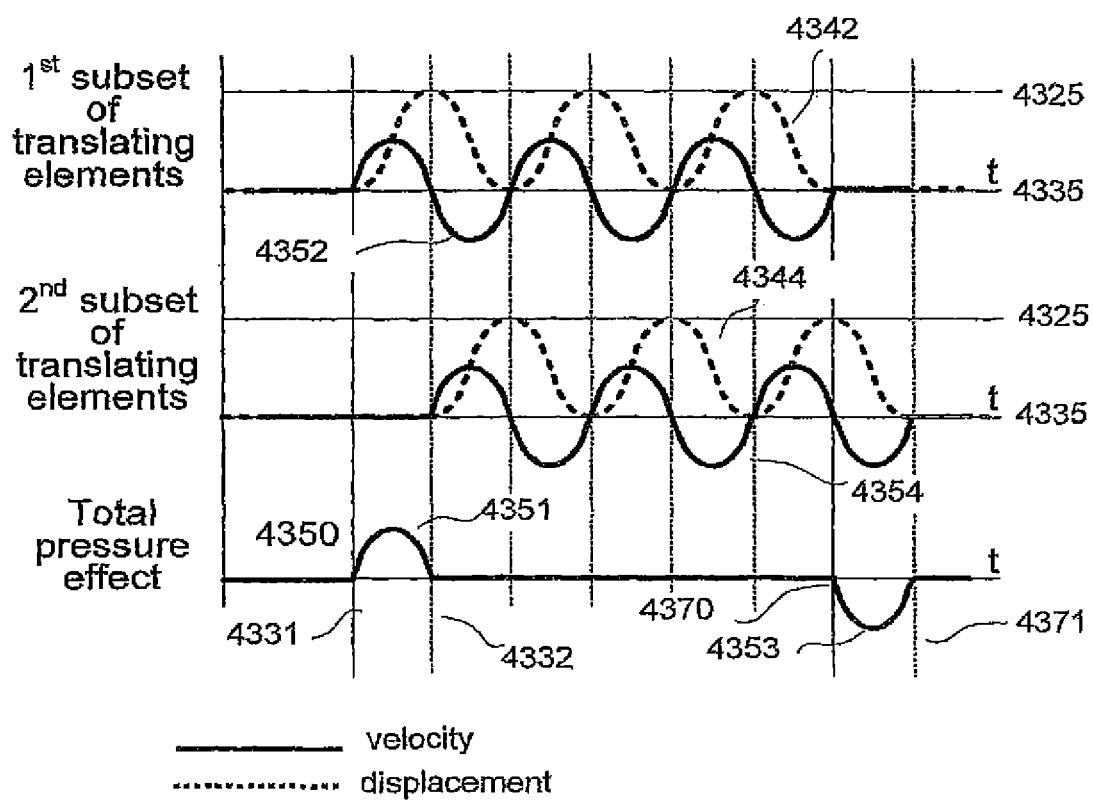
FIG. 26 is a composite graph illustration of the velocity (solid line) and displacement (dashed line) for a cooperating pair of subsets of translating elements in the actuator apparatus of FIG. 25, according to certain embodiments of the present invention, for an embodiment in which a command to generate negative total pressure pulse is received when a first subset of translating elements is close to the latching electrode and is latched following the command, while the second subset of translating elements continues to move.
Figure 27:
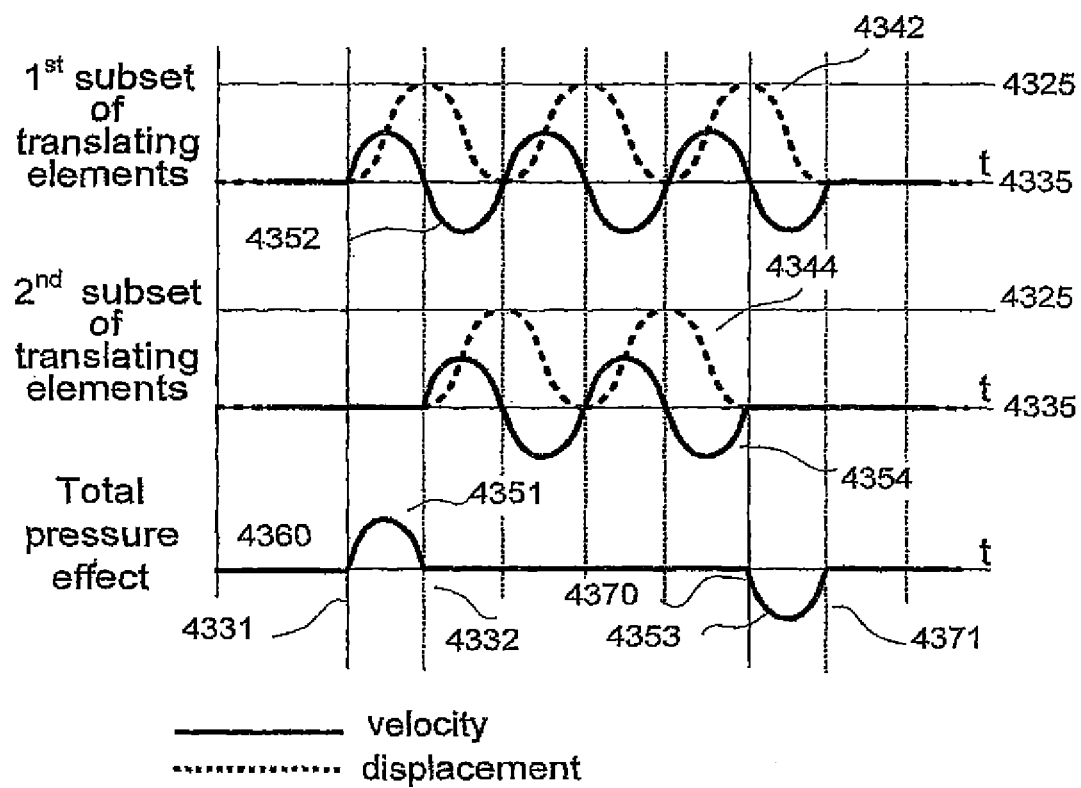
FIG. 27 is a composite graph illustration of the velocity (solid line) and displacement (dashed line) for a cooperating pair of translating elements in the actuator apparatus of FIG. 25, according to certain embodiments of the present invention, for an embodiment in which a command to generate a negative total pressure pulse is received when a second subset of translating elements is close to the latching electrode and is latched following the command while the first subset of translating elements continues to move.

FIG. 25 is a simplified pictorial diagram of actuator apparatus having only one latch to latch its translating elements, the apparatus being constructed and operative in accordance with certain embodiments of the present invention. In FIG. 25 each translating element comprises only one latching electrode 4450 such that flexure 4230 may be latched into only a single "latched" position 4335. When released, flexure 4430 moves back and forth as indicated by arrow 4440 arriving at the opposite extreme position 4245 without latching. To provide the same acoustic effect as in previous embodiments, two identical subsets of translating elements may be provided which operate synchronously and in accordance with a common algorithm. Suitable velocity and displacement vs. time sequences for the two subsets and total pressure effect for the two subsets of translating elements respectively are illustrated in FIGS. 26-27.

Prior to the translation command all translating elements are latched in their single latching positions 4335. Upon receiving a "translate forward" command in time 4331, translating elements in the first subset are released whereas release of translating elements in the second subset lags, relatively, by half a period (one clock). After their respective releases from time 4332, both subsets move harmonically between their extreme positions without latching. Upon receiving a "translate back" command in time 4370, translating elements belonging to the subset which at that moment is close to the latching position, are latched. FIG. 26 illustrates a situation when the first subset is about to be latched whereas FIG. 27 illustrates a situation when the second subset is about to be latched. In FIG. 26, once translating elements in the first subset are latched, translating elements in the second subset are latched after a half period (one clock) lag at time-point 4371. In FIG. 27 once translating elements in the second subset are latched, translating elements in the first subset are latched after a half period (one clock) lag at time-point 4371. After their respective latches, both subsets remain static until a new "translate forward" command has been received.

Curves 4342 and 4344 represent the displacements of the first and second subsets of translating elements respectively. Curves 4352 and 4354 represent the velocities (pressures) of the first and second subsets of translating elements respectively. As a result, at a time clock between points 4331 and 4332 a positive total pressure pulse 4351 is formed; at a time clock between points 4370 and 4371 a negative total pressure pulse 4371 is formed; and between time points 4332 and 4370 a zero (ni) total pressure effect is obtained.

Figure 28A:
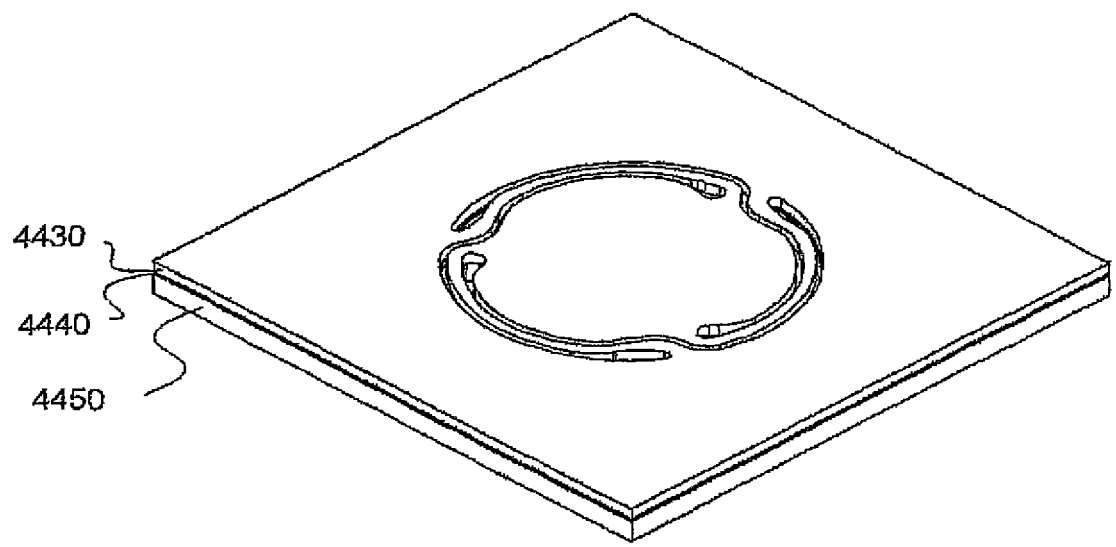
FIGS. 28A and 28B are isometric illustrations of the actuator apparatus of FIG. 25, constructed and operative in accordance with certain embodiments of the present invention.
Figure 28B:
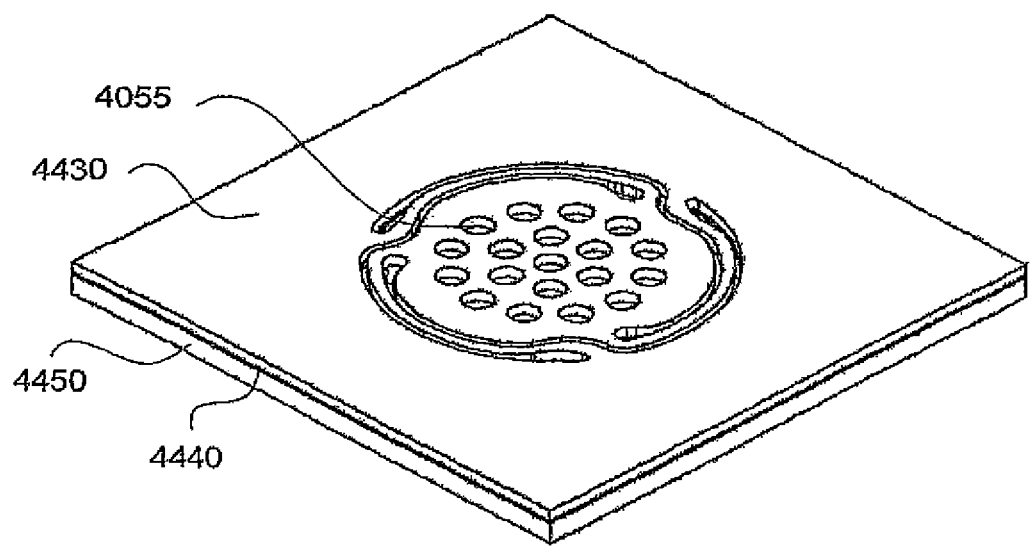
Figure 29A:
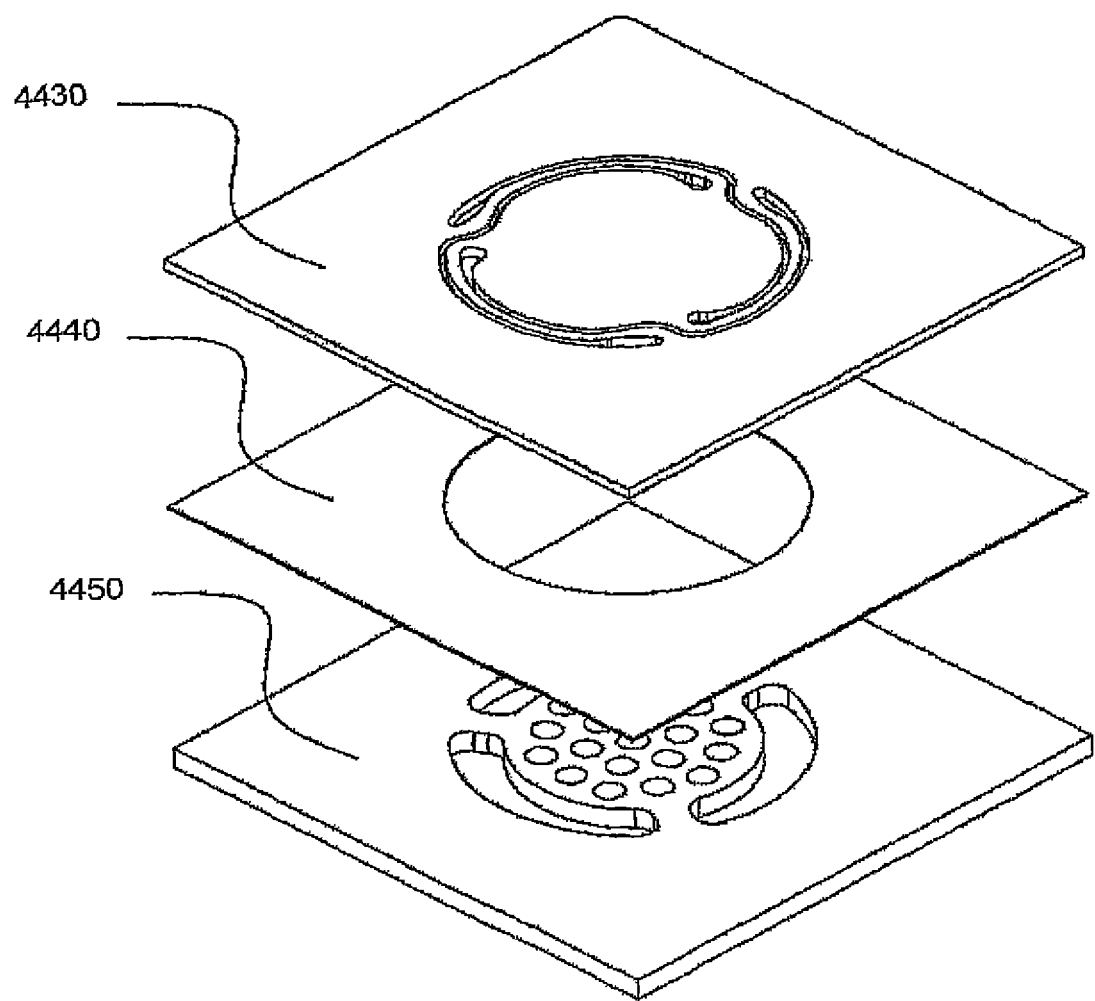
FIGS. 29A and 29B are exploded illustrations of the actuator apparatus of FIGS. 28A and 28B respectively.
Figure 29B:
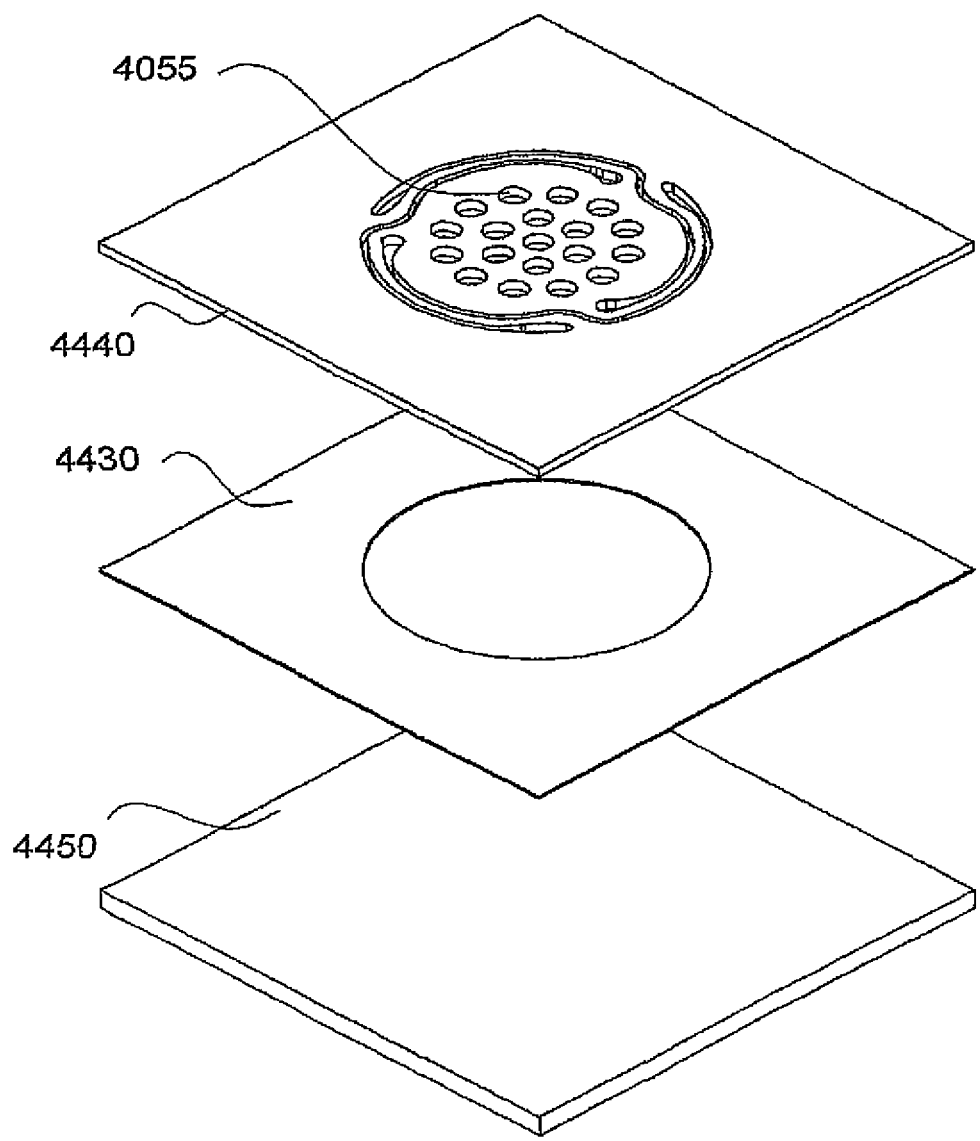

FIGS. 28A and 28B are isometric views of example embodiments of actuator apparatus designed to operate with only one latch. In FIG. 28A through-holes are provided in the electrode whereas in FIG. 28B the holes are in the membrane. FIGS. 29A and 29B are exploded views of the devices of FIGS. 28A and 28B respectively. The driving force in these embodiments need not be electrostatic, and may be of any other type such as but not limited to an electromagnetic force, or a combination of electrostatic and electromagnetic forces. The actuator apparatus of FIG. 28 typically comprises a flexure 4030 and an electrode 4050 separated from flexure 4430 by an insulation layer 4040 as shown.

EXAMPLE

Figures 30, 31:
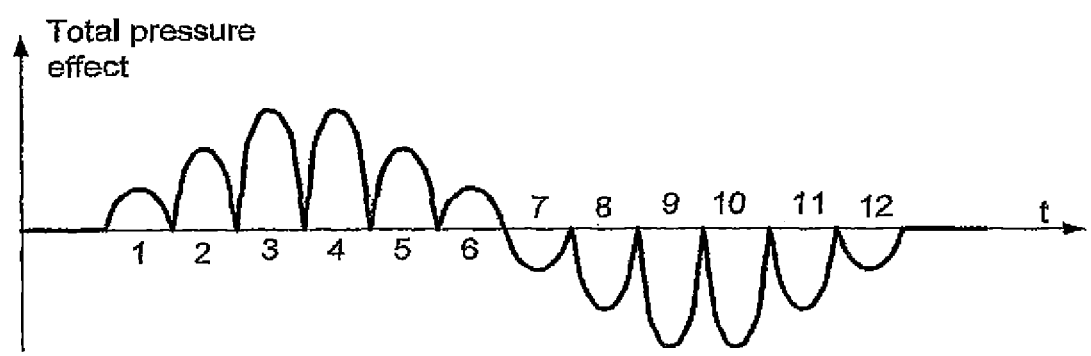
FIG. 30 is a diagram of an array of translating elements to be used, in pairs, to generate a sound.
FIG. 31 is a pressure vs. time graph for a sound to be generated using the array of FIG. 30 and using a scheme in which the controller selectably latches (or not) all of the translating elements in the array into a single extreme position e.g. the first extreme position, as opposed to schemes in which the controller selectably latches (or not) some of the translating elements into the first extreme position and others of the translating elements into the second extreme position.

FIG. 30 is a diagram of an array of translating elements to be used, in pairs, to generate a sound. It is appreciated that the array of FIG. 30, for simplicity, is shown as including only a relatively small number of elements such as 24 elements yielding 12 pairs of elements. In practice, quality of sound considerations usually demands that the array includes many more pairs of elements such as one or more thousands of elements.

FIG. 31 is a pressure vs. time graph for a sound to be generated using the array of FIG. 30 and using a scheme in which the controller selectably latches (or not) all of the translating elements in the array into a single extreme position e.g. the first extreme position.

Figure 32:
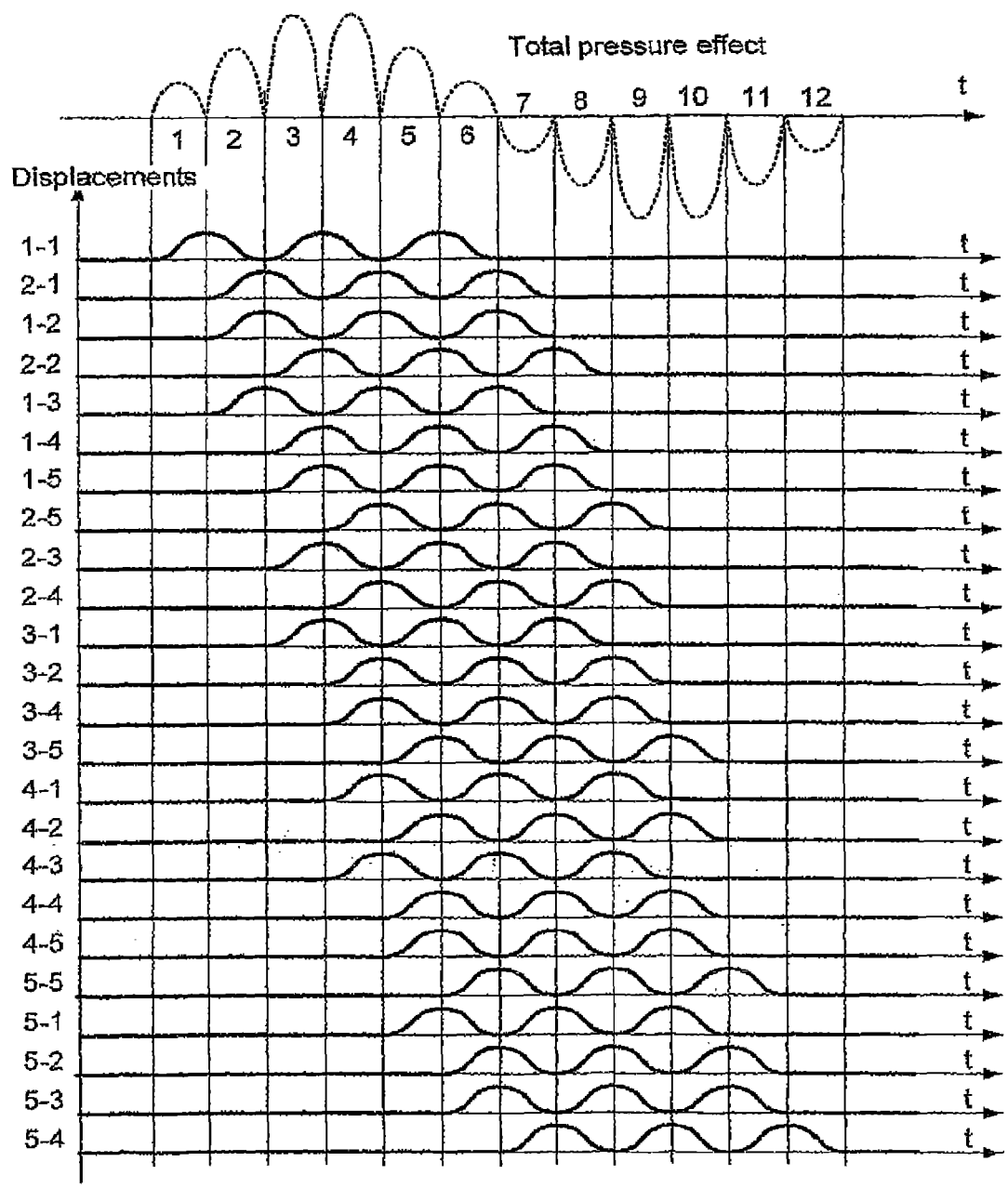
FIG. 32 is a composite graph including graphs of translations of each of the elements in the array of FIG. 30, as a function of time, such translations being able to yield the sound depicted in FIG. 31.

FIG. 32 is a composite graph including graphs of translations of each of the elements in the array of FIG. 30, as a function of time, which translations can yield the sound depicted in FIG. 31.

It is appreciated that in the example of FIGS. 30-32, each two translating elements are permanently paired together. For example, element 1-1 in the above example is always paired with element 1-2. However, in certain applications, it may be desired to have a fluctuating pairing system including even a random pairing system, in which element 1-1 (say) may be paired initially with element 1-2 but subsequently with other elements e.g. as a result of an on-the-fly decision as to the current capabilities of various adjacent translating elements.

Operation according to certain embodiments of the present invention is described by way of example, for actuator apparatus including 24 translating elements arranged in a 5×5 matrix whose central element is missing as shown in FIG. 30. The 24 active translating elements 1-1, . . . 3-2 and 3-4, . . . 5-5 are partitioned into the following 12 cooperating pairs: (1-1,2-1), (1-2,2-2), (1-3,1-4), (1-5,2-5), (2-3,2-4), (3-1,3-2), (3-4,3-5), (4-1,4-2), (4-3,4-4), (4-5, 5-5), (5-1,5-2), (5-3,5-4). It is appreciated that alternatively, any other pairs might have been defined.

FIG. 31 is a graph of a sound pressure wave to be created using the actuator apparatus of FIG. 30. The sound pressure wave to be created, a sinusoidal wave with a period equal to 12 time clocks, may be approximated by 12 pressure pulses distributed through the 12 time clocks respectively.

FIG. 32 is a composite graph of the respective displacements of the translating elements 1-1, . . . 3-2 and 3-4, . . . 5-5 of FIG. 30 which, in combination, provide the total pressure effect shown in the top graph of FIG. 32. In the specific example shown, elements (1-1,2-1) are used to create pulses 1 and 7 in the total pressure effect. At the beginning of time clock "1" translating element 1-1 is released and starts to oscillate; after one clock translating element 2-1 (which has been "assigned" to be the cooperating element for element 1-1) is released and starts to oscillate simultaneously with translating element 1-1. At the beginning of time clock "7" translating element 1-1 is latched and after one clock translating element 2-1 is latched.

In order to create pulses 2 and 8 which are double the height of pulses 1 and 7 respectively, 2 pairs of cooperating translating elements (1-2,2-2) and (1-3,1-4) are used. At the beginning of time clock "2" translating elements 1-2 and 1-3 are released and start to oscillate; after one clock the cooperating translating elements 2-2 and 1-4 are released and start to oscillate simultaneously with translating elements 1-2 and 1-3 respectively. At the beginning of time clock "8" translating elements 1-2 and 1-3 are latched and after one clock the translating elements 2-2 and 2-4 are latched. Pulse pairs 3 and 9, 4 and 10, 5 and 11, and 6 and 12, are created similarly.

Built-in fuses may be added to the flexure design irrespective of whether the embodiment of FIGS. 24A-24B is employed or not. Such fuses allow any translating element which has suffered a breakdown to be disconnected immediately. If group operation of certain translating elements is provided, a particular advantage of fuse provision is that appropriate operation of the remaining translating elements belonging to the same group, all of which are typically connected to one another in parallel, is maintained despite breakdowns.

Figure 33:
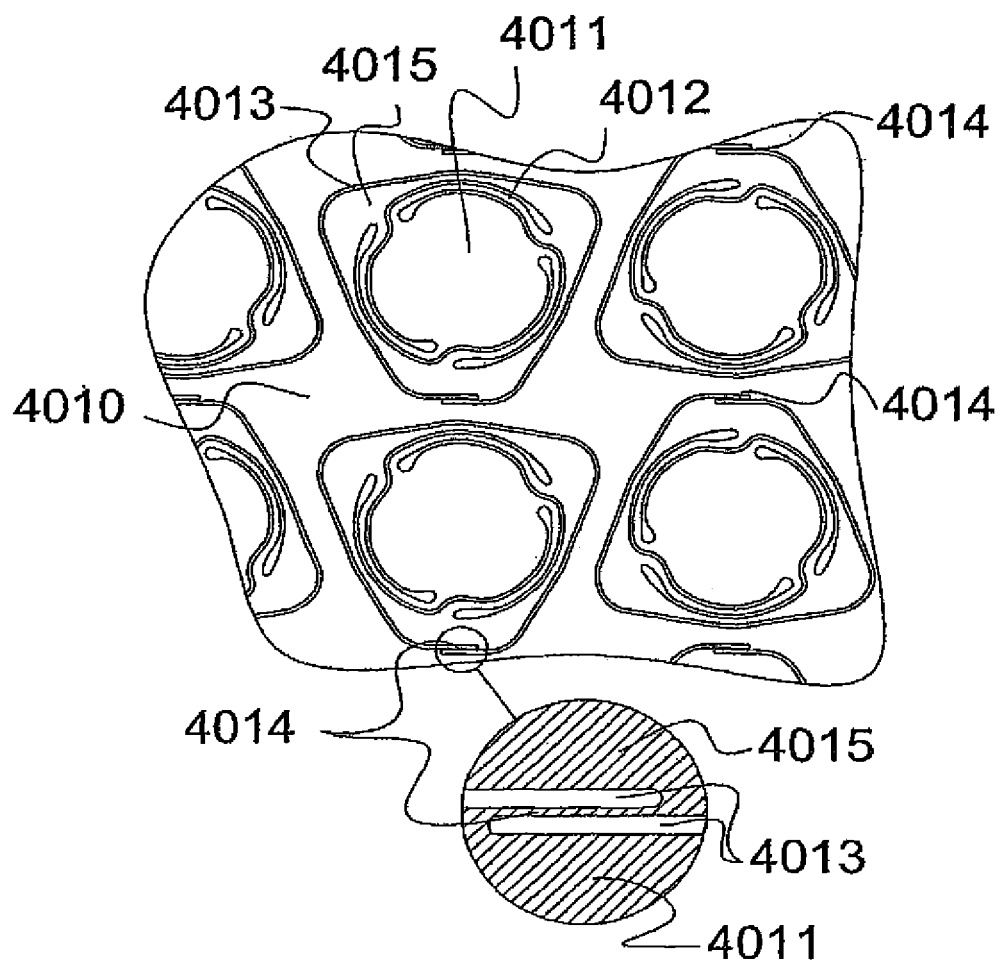
FIG. 33 is a top cross-sectional illustration of actuator apparatus including a plurality of translating elements formed from a layer of suitable conductive material such as silicon, each having a fuse element comprising an isthmus of silicon, all constructed and operative in accordance with certain embodiments of the present invention.

Reference is now made to FIG. 33 which is a top-view illustration of an improved speaker apparatus flexure layer characterized in that translating element flexures 4011 are surrounded by a non-closed narrow gap 4013 so as to form a narrow isthmus 4014 conducting a charging current. In the event of a fault in the insulating layer separating the translating element and any one of its respective electrodes, resulting in insulation breakdown and short circuit to an electrode to which a working voltage has been applied, shorting current flows through isthmus 4014 and burns it out, disconnecting the problematic translating element and affording appropriate operation of the remaining translating elements in the same group.

The dimensions (width, length and/or thickness) of the isthmus 4014 may be selected such that under normal operating conditions, in which no breakdown of the insulating layer has occurred, the charging current flowing through the isthmus 4014 is substantially (e.g. an order of magnitude) smaller than the current required to burn the isthmus, whereas the breakdown current flowing through the isthmus 4014 in case of insulation fault is substantially (e.g. an order of magnitude) larger than the current required to assure burning of the isthmus 4014.

It is appreciated that the term "stroke" is used herein to refer to half of the peak-to-peak distance defined by a translating element.

It is appreciated that the term "adjacent" refers to translating elements whose distance from one another is small relative to the wavelength of sound generated by the elastic translation of any one of the elements. Therefore, "adjacent elements" may comprise, but do not necessarily comprise, neighboring elements in the array. Typically, the adjacent translating elements are as near as possible to one another. The distance between the adjacent translating elements may for example, depending on the application, be 1 to 10 percent of the wavelength of sound generated by the elastic translation of any one of the elements.

It is appreciated that sound as used herein refers to vibration transmitted through a solid, liquid, or gas such as but not limited to those vibrations whose frequencies are capable of being detected by human ears.

It is appreciated that the latching device typically includes several or many latches each of which provide the two operative states either individually for a single translating element or collectively for a subset of the totality of elastically translating elements in the array. According to one embodiment of the present invention, one individual latch may latch its corresponding translating element or elements into the first position, whereas another individual latch may latch its corresponding translating element or elements into the second position. It may even be the case, that the latches for the first and second elements in an individual pair, include a first latch latching the first element into the first extreme position and a second latch which latches the second element into the second extreme position. Alternatively, the latch/es for the first and second elements in an individual pair, include one or two latches latching both of the first and second elements into the same one of the two extreme positions e.g. the first extreme position. According to another embodiment of the present invention, all of the latches latch their respective corresponding translating element or elements into the same one of the two extreme positions e.g. the first extreme position.

With specific reference to the Figures, it is stressed that the particulars shown are by way of example and for purposes of illustrative discussion of the suitable embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Features of the present invention which are described in the context of separate embodiments may also be provided in combination in a single embodiment. Conversely, features of the invention which are described for brevity in the context of a single embodiment may be provided separately or in any suitable subcombination. For example, moving elements may be free floating, or may be mounted on filament-like flexures or may have a surrounding portion formed of a flexible material. Independently of this, the apparatus may or may not be configured to reduce air leakage therethrough as described above. Independently of all this, the moving element may for example comprise a conductor, coil, ring- or disc-shaped permanent magnet, or ring- or disc-shaped ferromagnet and the magnets, if provided, may or may not be arranged such that the poles of some e.g. 50% thereof are oppositely disposed to the poles of the remaining e.g. 50% of the magnets.

Independently of all this, the latch shape may, in cross-section, be solid, annular, perforated with or without a large central portion, or notched or have any other suitable configuration. Independently of all this, control of latches may be individual or by groups or any combination thereof. Independently of all this, there may be one or more arrays of actuator elements which each may or may not be skewed and the cross-section of each actuator element may be circular, square, triangular, hexagonal or any other suitable shape.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

The present invention also includes computer program products, comprising a computer usable medium having a computer readable program code embodied therein, the computer readable program code adapted to be executed to implement any or all of the methods shown and described herein.

The present invention has been described with a certain degree of particularity, but those versed in the art will readily appreciate that various alterations and modifications may be carried out to include the scope of the following Claims:

The invention claimed is:

1. An actuator array for generating sound, the actuator array comprising one or more actuator devices, each actuator device comprising:
    (a) a first electrode and a second electrode;
    (b) a membrane interposed between the first and second electrodes, the membrane comprising a peripheral flexure and a central portion configured to travel back and forth along a respective axis towards the first and second electrodes in response to an electrostatic force generable by applying a voltage between at least one of the first and second electrodes and the membrane;
    wherein at least one of the first and second electrodes comprises at least one partial annular opening facing the peripheral flexure of the membrane.

2. The actuator array according to claim 1, wherein at least one of the first and second electrodes further comprises an array of through holes.

3. The actuator array according to claim 2, wherein the array of through holes faces the central portion of the membrane.

4. The actuator array according to claim 1, further comprising insulator layers separating the membrane from the first and second electrodes.

5. The actuator array according to claim 1, wherein the first and second electrodes are designed to function as latching elements for the membrane.

6. An actuation system for generating sound, the system comprising:
    (a) an actuator array comprising one or more actuator devices, said one or more actuator devices comprising:
    i) a first electrode and a second electrode;
    ii) a membrane interposed between the first and second electrodes, the membrane comprising a peripheral flexure and a central portion configured to travel back and forth along a respective axis towards the first and second electrodes in response to an electrostatic force generable by applying a voltage between at least one of the first and second electrodes and the membrane;
    wherein at least one of the first and second electrodes comprises one or more partial annular openings facing the peripheral flexure of the membrane; and
    (b) a controller configured to selectively apply voltages between the membrane and at least one of the first and second electrodes of the one or more actuator devices so as to generate electrostatic forces enabling the central portion of the membranes of the one or more actuator devices to travel back and forth along a respective axis towards the first and second electrodes of the one or more actuator devices.

7. The actuator system according to claim 6, wherein said electrostatic forces are employed both to generate motion of the membranes and to latch the membranes.

8. An actuator array for generating sound, the actuator array comprising one or more actuator devices, each actuator device comprising:
    (a) a first electrode and a second electrode;
    (b) a membrane interposed between the first and second electrodes, the membrane comprising a peripheral flexure and a central portion configured to travel back and forth along a respective axis towards the first and second electrodes in response to an electrostatic force generable by applying a voltage between at least one of the first and second electrodes and the membrane.

9. The actuator array according to claim 8, further comprising insulator layers separating the membrane from the first and second electrodes.

10. The actuator array of claim 8, wherein at least one of the first and second electrodes comprises one or more partial annular openings facing the peripheral flexure of the membrane.

11. The actuator array according to claim 8, wherein at least one of the first and second electrodes further comprises an array of through holes.

12. The actuator array according to claim 11, wherein the array of through holes faces the central portion of the membrane.

* * * * *